US012559847B2

(12) United States Patent
Alshaiba Saleh Ghannam Almazrouei et al.

(10) Patent No.: US 12,559,847 B2
(45) **Date of Patent: *Feb. 24, 2026**

(54) SYSTEMS FOR GENERATING HYDROGEN

(71) Applicant: SHAHEEN INNOVATIONS HOLDING LIMITED, Abu Dhabi (AE)

(72) Inventors: Mohammed Alshaiba Saleh Ghannam Almazrouei, Abu Dhabi (AE); Sajid Bhatti, Abu Dhabi (AE); Daniel Charaf Eddine Chehayeb, Abu Dhabi (AE)

(73) Assignee: Shaheen Innovations Holding Limited, Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,394

(22) Filed: Jan. 31, 2025

(65) Prior Publication Data

US 2025/0179652 A1 Jun. 5, 2025

Related U.S. Application Data

(63) Continuation of application No. 18/662,629, filed on May 13, 2024, now Pat. No. 12,320,015.

(Continued)

(51) Int. Cl.
*C25B 1/04* (2021.01)
*B06B 1/02* (2006.01)

(Continued)

(52) U.S. Cl.
CPC .............. *C25B 1/04* (2013.01); *B06B 1/0215* (2013.01); *C25B 9/19* (2021.01); *C25B 9/65* (2021.01);

(Continued)

(58) Field of Classification Search
CPC .... C25B 1/02; C25B 1/04; C25B 9/19; C25B 9/65; C25B 13/08; C25B 15/02; C25B 15/029; C25B 15/083
See application file for complete search history.

(56) References Cited

U.S. PATENT DOCUMENTS 11,325,094 B2 5/2022 Peshkovsky
11,653,152 B1 5/2023 Lahoud
(Continued)

FOREIGN PATENT DOCUMENTS

CN 111286747 A 6/2020
CN 113549943 10/2021
(Continued)

OTHER PUBLICATIONS

Heilscher Ultrasonics. *Efficient Hydrogen Production with Ultrasonics*. https://www.hielscher.com/efficient-hydrogen-production-with-ultrasonics.htm.
(Continued)

*Primary Examiner* — Luan V Van
*Assistant Examiner* — Mofoluwaso S Jebutu
(74) *Attorney, Agent, or Firm* — Amedeo F. Ferraro, Esq.

(57) ABSTRACT

A system (1) for generating hydrogen gas comprises a reaction vessel (101) containing an aqueous solution (102) and a cathode (105) and an anode (107) each positioned at least partly in the reaction vessel (101). The system (1) comprises first and second ultrasonic transducers (215-220) which emit ultrasonic waves in the direction of the cathode (105) and the anode (107) respectively. Each ultrasonic transducer (215-220) is driven by a respective transducer driver (202) to optimise the operation of the system (1) for generating hydrogen gas by sonoelectrolysis.

18 Claims, 27 Drawing Sheets

Related U.S. Application Data

(60) Provisional application No. 63/599,898, filed on Nov. 16, 2023, provisional application No. 63/466,201, filed on May 12, 2023.

(51) Int. Cl.

| | |
|---|---|
| ***C25B 9/19*** | (2021.01) |
| ***C25B 9/65*** | (2021.01) |
| ***C25B 13/08*** | (2006.01) |
| ***C25B 15/023*** | (2021.01) |
| ***C25B 15/029*** | (2021.01) |
| ***C25B 15/08*** | (2006.01) |

(52) U.S. Cl.

CPC ............ *C25B 13/08* (2013.01); *C25B 15/023* (2021.01); *C25B 15/029* (2021.01); *C25B 15/083* (2021.01); *B06B 2201/55* (2013.01)

(56) References Cited

U.S. PATENT DOCUMENTS

| | | | | |
|---|---|---|---|---|
| 11,665,483 | B1 | 5/2023 | Lahoud | |
| 2012/0058405 | A1 | 3/2012 | Kirchoff | |
| 2022/0105284 | A1 * | 4/2022 | Lahoud | A24F 40/48 |
| 2022/0316075 | A1 | 10/2022 | Harada | |

FOREIGN PATENT DOCUMENTS

| | | | | | |
|---|---|---|---|---|---|
| CN | 215440699 | U | | 1/2022 | |
| CN | 115287680 | A | | 11/2022 | |
| DE | 102018219373 | A1 | | 5/2020 | |
| KR | 10-2436026 | B1 | | 8/2022 | |
| WO | WO-2010084358 | A2 | * | 7/2010 | C25B 9/19 |
| WO | WO 2017/090431 | A1 | | 6/2017 | |
| WO | WO 2018/070061 | A1 | | 4/2018 | |
| WO | WO 2022/129906 | | | 6/2022 | |

OTHER PUBLICATIONS

Sheng-De Li, Cheng-Chien Wang, Chuh-Yung Chen, Water electrolysis in the presence of an ultrasonic field, Electrochimica Acta, vol. 54, Issue 15, 2009, pp. 3877-3883 (Year: 2009).

Sherif S. Rashwan, Ibrahim Dincer, Atef Mohany, Bruno G. Pollet, The Sono-Hydro-Gen process (Ultrasound induced hydrogen production): Challenges and opportunities, International Journal of Hydrogen Energy, vol. 44, Issue 29, 2019, pp. 14500-14526 (Year: 2019)*.

Islam MD H et al: “Sonochemical and sonoelectrochemical production of hydrogen”, Ultrasonics Sonochemistry, Butterworth-Heinemann, GB, vol. 51, Sep. 22, 2018 (Sep. 22, 2018), pp. 533-555, XP085545818, ISSN: 1350-4177, DOI: 10.1016/J.ULTSONCH.2018.08.024; pp. 540-553; figures 10,19.

International Search Report mailed Sep. 18, 2024 for International Application No. PCT/GB2024/051240; 16 pages.

* cited by examiner

FIG. 7
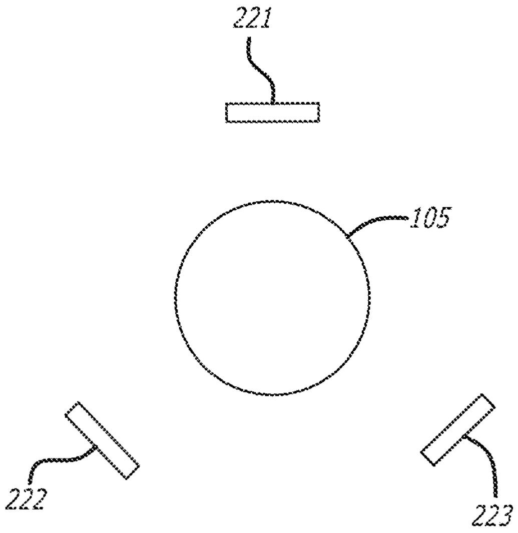
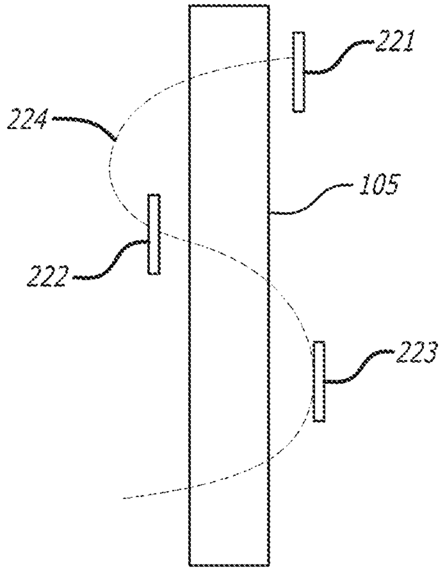
FIG. 8

| Item No. | Part | Parameter | Symbol | value/ relationship |
|---|---|---|---|---|
| 1 | Vessel | height | $h_v$ | 1:1 |
| 2 | | Diameter | $D_v$ | |
| 3 | | height of aqueous solution | $h_e$ | 75% - 85% of $h_v$ |
| 4 | electrode | length | $l_e$ | 110% - 120% of $h_v$ |
| 5 | | diameter | $D_e$ | 7% - 20% of $D_v$ |
| 6 | electrode placement | distance of electrode center from center of vessel | $E_s$ | (20% - 30% of $D_v$) + ($0.5*D_e$) |
| 7 | | immersed length of electrode | $l_i$ | 70% - 80% of $l_e$ |
| 8 | Transducer | Diameter of Transducer | $D_t$ | 2cm - 5cm |
| 9 | | thickness | t | dependant on frequency |
| 10 | transducer placement | space between transducer & electrode | $S_{t-e}$ | 1 x wavelength for 20kHz - 40kHz =37mm - 74mm |
| 11 | | space between transducers | $S_t$ | 1 x $D_t$ |

FIG. 11

| Port # | Primary Function | Secondary Function |
|---|---|---|
| GPIO.0 | digital GPIO | used for chip test |
| GPIO.1 | digital GPIO | ADC channel 0 |
| GPIO.2 | digital GPIO | ADC channel 1 |
| GPIO.3 | rms current | digital GPIO |
| GPIO.4 | digital GPIO | used for chip test |
| GPIO.5 | digital GPIO | I2C address select ADR0 |
| GPIO.6 | digital GPIO | I2C address select ADR1 |
| GPIO.7 | digital GPIO | I2C address select ADR2 |

*FIG. 23*

SYSTEMS FOR GENERATING HYDROGEN

CROSS-REFERENCES TO RELATED APPLICATIONS

This is a continuation of U.S. application Ser. No. 18/662,629, filed May 13, 2024; which application claims the benefit of priority to provisional patent application Ser. No. 63/599,898 filed Nov. 16, 2023; and provisional patent application No. 63/466,201, filed May 12, 2023, all of which are incorporated by reference herein.

BACKGROUND

The present invention relates to systems for generating hydrogen. The present invention more particularly relates to systems for generating hydrogen from a non-carbon contain source using electrolysis of an aqueous solution in combination with ultrasound waves.

Today, most hydrogen production in the United States (and other countries) uses natural gas reforming, which contributes to both $CO_2$ and methane emissions, and almost all hydrogen use is in industrial settings. The Hydrogen Shot™ initiative by the US Department of Energy addresses the challenge of clean hydrogen production, seeking to reduce the cost of clean hydrogen by 80% to $1 per kilogram in one decade. Clean hydrogen is critical for reaching net-zero by 2050. However, additional research and development in clean hydrogen is needed to achieve this goal.

With current trends of using environmentally friendly energy to reduce carbon footprint in every power-consuming industry, moving towards green energy production is the focus of various energy producing industries, academic institutions and even governments. However, renewable, green energy production comes with a heap of challenges of its own. The innovative and educated ideas presented herein are potential solutions to some of these challenges within the energy industry.

Currently, the world is heavily reliant on fossil fuels to fulfil its energy needs, and reducing the carbon footprint would require use of alternate sources of energy to these fossil fuels. One of the alternatives to fossil fuels is Hydrogen, however, its production, storage, transport, and consumption have a variety of complications.

Hydrogen can be produced by splitting the molecules of water into hydrogen and oxygen. They are collected on separate electrodes using the process of electrolysis. Electrolysis is the process that involves passing electric current through an aqueous solution resulting in a chemical reaction. The process separates the solution into its constituent elements or produces a desired chemical product.

Two electrodes are immersed in an aqueous solution, such as an electrolyte solution (a solution comprising an electrically conductive substance). Electrodes are usually made of inert materials (graphite, platinum, stainless steel, etc.) that are connected to a power source, such as a DC current source. The elements of a solution are split into positive and negative ions that can be collected at the electrodes; the positive ions collect at the negative electrode (cathode) and the negative ions collect at the positive electrode (anode). The electrolysis of water results in a decomposition reaction in which individual water molecules break down into hydrogen and oxygen ions.

An oxidation reaction occurs at the anode. The oxidation 'half reaction' is:

$$4OH^- \Rightarrow 2H_2O + O_2 + 4e^-$$

A reduction reaction occurs at the cathode. The reduction 'half reaction' is:

$$2H_2O + 2e^- \Rightarrow H_2 + 2OH^-$$

The reaction for water electrolysis is therefore:

$$2H_2O \Rightarrow 2H_2 + O_2$$

The hydrogen ions (H+) collect at the cathode (−), whereas hydroxide ions (OH−) collect at the anode (+). Electrolysis of water ($H_2O$) therefore produces hydrogen ($H_2$) and oxygen ($O_2$) gases. An ionic solution (electrolyte) although not required, is preferably dissolved into the water to facilitate the electrolysis reaction. An electrolyte is a solution that is electrically conductive and contains ions. Composition of the electrolyte depends on the specific application of the electrolytic process.

In conventional aqueous electrolysis, the electrolyte used is a solution of a salt or an acid dissolved in water. In conventional electrolysis of water, the electrolyte may be either a dilute sulfuric acid solution ($H_2SO_4$) or sodium hydroxide (NaOH) in water.

Since the anode is connected to the positive terminal of the power source, the anode is positively charged. Conversely, since the cathode is connected to the negative terminal of the power source, the cathode is negatively charged. An electric field is formed between the anode and the cathode in a direction from the anode to the cathode.

Inside the electric field, a positive charge is subjected to a force that accelerates the positive charge in the direction of the electric field and a negative charge is subjected to a force that accelerates the negative charge in an opposite direction to the electric field. These forces cause ions in the aqueous solution to flow towards the anode and cathode and inherently accelerate the electrolysis reaction.

For example, in a sodium hydroxide (NaOH) solution, the positively charged Sodium ions ($Na^+$) will experience a force accelerating the positive ions towards the cathode, whereas the Hydroxide ($OH^-$) negative ions will be accelerated towards the anode. The Hydroxide ions, on contact with the anode, are oxidised by giving up the extra electrons, causing the electrons to flow through the external circuit and resulting in production and release of Oxygen gas ($O_2$) at the anode. At the cathode, H+ ions discharge instead of Sodium ($Na^+$) because H+ ions discharge more easily than Nations. Therefore, water molecules' reduction is a more favoured reaction and H+ ions are reduced to Hydrogen gas ($H_2$). Within water molecules, covalent bonds are formed by sharing electrons between atoms. Each water molecule consists of two hydrogen atoms, individually covalently bonded to an oxygen atom. These covalent bonds involve the sharing of electrons between the oxygen and hydrogen atoms, creating a stable molecular structure. The polar covalent bonds between the oxygen atom and hydrogen atoms in each water molecule is shown in solid line in FIG. 1 of the accompanying drawings.

The energy stored within covalent bonds, known as bond dissociation energy, represents the amount of energy required to break the bond and separate the atoms. For water molecules, the bond dissociation energy for each O—H covalent bond is approximately 460 kilojoules per mole (KJ/mol), indicating the strength of the bond and the energy required to weaken/break it.

To break down a water molecule ($H_2O$) into its constituent elements, the bond dissociation energy is approximately 460 KJ/mol for each O—H bond. Since water has two O—H bonds, the total energy required to break down one water molecule into hydrogen and oxygen is approximately 920 KJ/mol. One mol of water weighs 18 grams.

On the other hand, hydrogen bonds form between the partially positive hydrogen atoms of one water molecule and the partially negative oxygen atoms of neighbouring water molecules. Due to the highly electronegative nature of oxygen, the oxygen atom attracts the shared electrons in the O—H bonds, creating a partial negative charge on the oxygen atom and a partial positive charge on the hydrogen atoms. This polarity allows water molecules to form high surface tension and cohesion. The hydrogen bonds between the water molecules are shown in dotted line in FIG. 1.

The energy required to break a hydrogen bond in water can range from 5 KJ/mol to 30 KJ/mol. This energy requirement is significantly lower than the approximately 460 KJ/mol needed to break a covalent O—H bond within a water molecule.

The conventional production of Hydrogen gas, although a simple theoretical process, in the past has been slow and energy-consuming, and albeit being a clean burning fuel, makes the product (Hydrogen gas) expensive and not sustainable as an economically viable alternative to fossil fuels. Prior electrolysis processes consume high amounts of energy in breaking down water into hydrogen and oxygen ions. Methods to reduce energy consumptions are required to achieve a sustainable and consistent availability of hydrogen as fuel.

Ultrasound can be used in some electrolysis applications to enhance the process. This is known as sonoelectrolysis or ultrasonic-assisted electrolysis. While ultrasound improves the efficiency of electrolysis, conventional systems that use ultrasound are often not optimized to take into account different temperatures and properties of the aqueous solution.

Moreover, the electrodes, used in the hydro-electrolysis process, deteriorate as the reaction progresses, needing for downtime while the electrodes are replaced, and incurring frequent replacement of metal electrodes. This increases the overall running cost of the process, rendering it economically inviable. The deterioration of the electrode material also results in increased energy being consumed to produce similar amounts of hydrogen gas as compared to new electrodes.

Therefore, improvements in the materials, in terms of their durability to withstand the harsh electrolytic conditions, of the components used in the electrolysis process for Hydrogen are needed to reduce the cost and the energy required to achieve a sustainable and consistent supply of hydrogen as fuel.

Thus, a need exists in the art for more environmentally friendly systems for generating hydrogen gas which seek to address at least some of the problems described herein.

SUMMARY

The systems of examples of this disclosure have a significant environmental benefit by reducing the energy required to generate hydrogen gas. This in turn reduces the cost of producing hydrogen gas.

A further benefit of systems of examples of this disclosure is that the systems are capable of using waste water or sea water directly as the aqueous solution, without the sea water needing to be desalinated. This avoids the need for energy intensive and costly desalination.

An embodiment of system for generating hydrogen gas comprises:

a reaction vessel containing an aqueous solution;

a cathode positioned at least partly within the reaction vessel with a portion of the cathode having an exterior surface submersed in and in electrical contact with the aqueous solution to create an interface for a reduction reaction for reducing H+ ions to produce hydrogen gas at the cathode;

an anode positioned at least partly within the reaction vessel with a portion of the anode submersed in and in electrical contact with the aqueous solution to create an interface for an oxidation reaction for oxidizing OH− ions to produce oxygen gas at the anode, wherein the cathode and the anode are configured to receive power from a power source;

a polymer-electrolyte membrane (PEM) positioned between the cathode and the anode to segregate the H+ ions and the OH− ions in the aqueous solution to create divided areas in the reaction vessel, wherein the aqueous solution in a divided area proximate the cathode has a greater concentration of H+ ions than OH− ions;

a first ultrasonic transducer positioned at least partly in the reaction vessel, the first ultrasonic transducer positioned at a predetermined distance from the cathode and oriented such that the first ultrasonic transducer emits ultrasonic waves at least partly towards the exterior surface of the cathode to agitate the aqueous solution proximate to the exterior surface of the cathode to clear any bubbles of the hydrogen gas formed at the exterior surface of the cathode to expose the exterior surface of the cathode to additional H+ ions for generation of hydrogen gas;

a second ultrasonic transducer positioned at least partly in the reaction vessel, the second ultrasonic transducer positioned at a predetermined distance from the anode and oriented such that the second ultrasonic transducer emits ultrasonic waves at least partly towards the exterior surface of the anode to cause cavitation in the aqueous solution proximate to the exterior surface of the anode, wherein the cavitation weakens hydrogen bonds between water molecules of the aqueous solution to separate individual water molecules available for interaction with the anode to undergo the oxidation reaction at the anode to oxidize OH− ions and form oxygen gas at the anode; and a plurality of transducer drivers each coupled electrically to a respective one of the first ultrasonic transducer or the second ultrasonic transducer to drive the ultrasonic transducer to generate the ultrasonic waves, wherein the transducer driver comprises:

an H-bridge circuit connected to the ultrasonic transducer, wherein the H-bridge circuit generates an AC drive signal to drive the ultrasonic transducer to generate and transmit the ultrasonic waves;

a microchip connected to the H-bridge circuit to control the H-bridge circuit to generate the AC drive signal, the microchip comprising:

an oscillator which generates:

- a main clock signal,
- a first phase clock signal which is high for a first time during the positive half-period of the main clock signal and low during the negative half-period of the main clock signal, and
- a second phase clock signal which is high for a second time during the negative half-period of the main clock signal and low during the positive half-period of the main clock signal, wherein the phases of the first phase clock signal and the second phase clock signal are centre aligned;

a pulse width modulation (PWM) signal generator subsystem comprising:

a delay locked loop which generates a double frequency clock signal using the first phase clock signal and the second phase clock signal, the double frequency clock signal being double the frequency of the main clock signal, wherein the delay locked loop synchronizes the first phase clock signal and the second phase clock signal, and wherein the delay locked loop adjusts the frequency and the duty cycle of the first phase clock signal and the second phase clock signal in response to a driver control signal to produce a first phase output signal and a second phase output signal, wherein the first phase output signal and the second phase output signal are configured to drive the H-bridge circuit to generate the AC drive signal to drive the ultrasonic transducer;

a first phase output signal terminal which outputs the first phase output signal to the H-bridge circuit;

a second phase output signal terminal which outputs the second phase output signal to the H-bridge circuit;

a feedback input terminal which receives a feedback signal from the H-bridge circuit, the feedback signal being indicative of a parameter of the operation of the H-bridge circuit or the AC drive signal when the H-bridge circuit is driving the ultrasonic transducer with the AC drive signal;

an analogue to digital converter (ADC) subsystem comprising:

at least one ADC input terminal which receives an analogue signal, wherein the ADC input terminal is connected to the feedback input terminal such that the ADC subsystem receives the feedback signal from the H-bridge circuit, and wherein the ADC subsystem samples analogue signals received at the ADC input terminal at a sampling frequency which is proportional to the frequency of the main clock signal and the ADC subsystem generates ADC digital signals using the sampled analogue signal;

a digital processor subsystem which receives the ADC digital signals from the ADC subsystem and processes the ADC digital signals to generate the driver control signal, wherein the digital processor subsystem communicates the driver control signal to the PWM signal generator subsystem to control the PWM signal generator subsystem;

a digital to analogue converter (DAC) subsystem comprising:

a digital to analogue converter (DAC) which converts a digital control signal generated by the digital processor subsystem into an analogue voltage control signal to control a voltage regulator circuit which generates a voltage for modulation by the H-bridge circuit; and a DAC output terminal which outputs the analogue voltage control signal to control the voltage regulator circuit to generate a predetermined voltage for modulation by the H-bridge circuit to drive the ultrasonic transducer to control the cavitation in the aqueous solution in response to feedback signals which are indicative of the operation of the ultrasonic transducer.

An embodiment of the system for generating hydrogen gas comprises:

a reaction vessel containing an aqueous solution;

a cathode positioned at least partly within the reaction vessel with a portion of the cathode having an exterior surface submersed in and in electrical contact with the aqueous solution to create an interface for a reduction reaction for reducing H+ ions to produce hydrogen gas at the cathode;

an anode positioned at least partly within the reaction vessel with a portion of the anode submersed in and in electrical contact with the aqueous solution to create an interface for an oxidation reaction for oxidizing OH− ions to produce oxygen gas at the anode, wherein the cathode and the anode are configured to receive power from a power source;

a plurality of first ultrasonic transducers positioned at least partly in the reaction vessel, each first ultrasonic transducer positioned at a predetermined distance from the cathode and oriented such that each first ultrasonic transducer emits and conducts ultrasonic waves through the aqueous solution at least partly towards the exterior surface of the cathode to agitate the aqueous solution proximate to the exterior surface of the cathode to clear any bubbles of the hydrogen gas formed at the exterior surface of the cathode to expose the exterior surface of the cathode to additional H+ ions for generation of hydrogen gas;

a plurality of second ultrasonic transducers positioned at least partly in the reaction vessel, the second ultrasonic transducers positioned at a predetermined distance from the anode and oriented such that the second ultrasonic transducers emit ultrasonic waves at least partly towards the exterior surface of the anode to cause cavitation in the aqueous solution proximate to the exterior surface of the anode, wherein the cavitation weakens hydrogen bonds between water molecules of the aqueous solution to separate individual water molecules available for interaction with the anode to undergo the oxidation reaction at the anode to oxidize OH− ions and form oxygen gas at the anode; and a plurality of transducer drivers each coupled electrically to a respective one of the ultrasonic transducers to drive the ultrasonic transducers to generate the ultrasonic waves, wherein each transducer driver comprises:

an H-bridge circuit connected to the respective one of the ultrasonic transducers, wherein the H-bridge circuit generates an AC drive signal to drive the ultrasonic transducer to generate and transmit the ultrasonic waves;

a microchip connected to the H-bridge circuit to control the H-bridge circuit to generate the AC drive signal, the microchip comprising:

an oscillator which generates:

a main clock signal, a first phase clock signal which is high for a first time during the positive half-period of the main clock signal and low during the negative half-period of the main clock signal, and a second phase clock signal which is high for a second time during the negative half-period of the main clock signal and low during the positive half-period of the main clock signal, wherein the phases of the first phase clock signal and the second phase clock signal are centre aligned;

a pulse width modulation (PWM) signal generator subsystem comprising:

a delay locked loop which generates a double frequency clock signal using the first phase clock signal and the second phase clock signal, the double frequency clock signal being double the frequency of the main clock signal, wherein the delay locked loop synchronizes the first phase clock signal and the second phase clock signal, and wherein the delay locked loop adjusts the frequency and the duty cycle of the first phase clock signal and the second phase clock signal in response to a driver control signal to produce a first phase output signal and a second phase output signal, wherein the first phase output signal and the second phase output signal are configured to drive the H-bridge circuit to generate the AC drive signal to drive the ultrasonic transducer;

a first phase output signal terminal which outputs the first phase output signal to the H-bridge circuit;

a second phase output signal terminal which outputs the second phase output signal to the H-bridge circuit;

a feedback input terminal which receives a feedback signal from the H-bridge circuit, the feedback signal being indicative of a parameter of the operation of the H-bridge circuit or the AC drive signal when the H-bridge circuit is driving the respective one of the ultrasonic transducers with the AC drive signal;

an analogue to digital converter (ADC) subsystem comprising:

at least one ADC input terminal which receives an analogue signal, wherein the ADC input terminal is connected to the feedback input terminal such that the ADC subsystem receives the feedback signal from the H-bridge circuit, and wherein the ADC subsystem samples analogue signals received at the ADC input terminal at a sampling frequency which is proportional to the frequency of the main clock signal and the ADC subsystem generates ADC digital signals using the sampled analogue signal;

a digital processor subsystem which receives the ADC digital signals from the ADC subsystem and processes the ADC digital signals to generate the driver control signal, wherein the digital processor subsystem communicates the driver control signal to the PWM signal generator subsystem to control the PWM signal generator subsystem;

a digital to analogue converter (DAC) subsystem comprising:

a digital to analogue converter (DAC) which converts a digital control signal generated by the digital processor subsystem into an analogue voltage control signal to control a voltage regulator circuit which generates a voltage for modulation by the H-bridge circuit; and a DAC output terminal which outputs the analogue voltage control signal to control the voltage regulator circuit to generate a predetermined voltage for modulation by the H-bridge circuit to drive the respective one of the ultrasonic transducers to control the cavitation in the aqueous solution in response to feedback signals which are indicative of the operation of the respective one of the ultrasonic transducers.

An embodiment of the system further comprises a polymer-electrolyte membrane (PEM) positioned within the reaction vessel between the cathode and the anode to segregate the H+ ions and the OH− ions in the aqueous solution to create divided areas in the reaction vessel, wherein the aqueous solution in a divided area proximate the cathode has a greater concentration of H+ ions than OH− ions.

An embodiment of the system further comprises the transducer driver driving the ultrasonic transducer at a frequency of 20 kHz to 40 KHz.

An embodiment of the system further comprises each first ultrasonic transducer positioned at a distance from the exterior surface of the cathode which equates to one wavelength of the ultrasonic waves emitted by the ultrasonic transducer.

An embodiment of the system further comprises each first ultrasonic transducer positioned at a distance from the exterior surface of the cathode which equates to a plurality of wavelengths of the ultrasonic waves emitted by the ultrasonic transducer.

An embodiment of the system further comprises each second ultrasonic transducer positioned at a distance from the exterior surface of the anode which equates to one wavelength of the ultrasonic waves emitted by the ultrasonic transducer.

An embodiment of the system further comprises each second ultrasonic transducer positioned at a distance from the exterior surface of the anode which equates to a plurality of wavelengths of the ultrasonic waves emitted by the ultrasonic transducer.

An embodiment of the system further comprises each first ultrasonic transducer oriented to emit ultrasonic waves in a direction that is transverse to a longitudinal length of the cathode.

An embodiment of the system further comprises each second ultrasonic transducer oriented to emit ultrasonic waves in a direction that is transverse to a longitudinal length of the anode.

An embodiment of the system further comprises a main controller which controls the power applied across the anode and the cathode, wherein the main controller is coupled to each transducer driver to control the operation of each transducer driver to optimize the efficiency of hydrogen gas generation.

An embodiment of the system further comprises a hydrogen gas collector positioned at least partly within the reaction vessel to collect hydrogen gas produced within the reaction vessel; and a hydrogen gas pressure sensor which senses the pressure of hydrogen gas within the hydrogen gas collector, the hydrogen gas pressure sensor being electrically coupled to the main controller to provide a hydrogen gas pressure signal to the main controller in a feedback loop.

An embodiment of the system further comprises an oxygen gas collector positioned at least partly within the reaction vessel to collect oxygen gas produced within the reaction vessel; and an oxygen gas pressure sensor which senses the pressure of oxygen gas within the oxygen gas collector, the oxygen gas pressure sensor being electrically coupled to the main controller to provide an oxygen gas pressure signal to the main controller in a feedback loop.

An embodiment of the system wherein the transducer driver comprises a frequency divider which is connected to the oscillator to receive the main clock signal from the oscillator, the frequency divider dividing the main clock signal by a predetermined divisor amount and outputting the frequency reference signal to the delay locked loop.

An embodiment of the system wherein the delay locked loop comprises a plurality of delay lines connected end to end, wherein the total delay of the delay lines is equal to the period of the main clock signal.

An embodiment of the system wherein the delay locked loop adjusts the duty cycle of the first phase clock signal and the second phase clock signal in response to the driver control signal by varying the delay of each delay line in the delay locked loop.

An embodiment of the system wherein the feedback input terminal receives a feedback signal from the H-bridge circuit in the form of a voltage which indicative of a rms current of the AC drive signal which is driving the ultrasonic transducer.

An embodiment of the system wherein the ADC subsystem comprises at least one further ADC input terminal which receives feedback signals which are indicative of at least one of the voltage of a battery connected to the system or the voltage of a battery charger connected to the system.

An embodiment of q system for generating hydrogen gas comprising:

a housing comprising a first internal chamber and a second internal chamber;

an anode positioned at least partly within the first internal chamber, a portion of the anode in electrical contact with water within the first internal chamber to create an interface for an oxidation reaction for oxidizing OH− ions to produce oxygen gas at the anode, wherein the anode is porous;

a cathode positioned at least partly within the second internal chamber, wherein the cathode is porous, and wherein the cathode and the anode are configured to receive power from a power source;

a polymer-electrolyte membrane (PEM) positioned between the cathode and the anode, wherein the PEM permits H+ ions to traverse from the anode to the cathode and the PEM prevents OH− ions traversing from the anode to the cathode;

an ultrasonic transducer positioned at least partly in the first internal chamber, the ultrasonic transducer positioned at a predetermined distance from the anode and oriented such that the ultrasonic transducer emits ultrasonic waves at least partly towards a surface of the anode to cause cavitation in the water proximate to the exterior surface of the anode, wherein the cavitation weakens hydrogen bonds between water molecules to separate individual water molecules available for interaction with the anode to undergo the oxidation reaction at the anode to oxidize OH− ions and form oxygen gas at the anode;

a transducer driver coupled electrically to the ultrasonic transducer to drive the ultrasonic transducer to generate the ultrasonic waves; and a hydrogen gas outlet to allow hydrogen gas generated in the second internal chamber as the H+ ions are reduced at the cathode to generate the hydrogen gas.

An embodiment of the system further comprising:

a transducer driver which is coupled to the ultrasonic transducer, the transducer driver comprising:

an H-bridge circuit connected to the ultrasonic transducer, wherein the H-bridge circuit generates an AC drive signal to drive the ultrasonic transducer to generate and transmit the ultrasonic waves;

a microchip connected to the H-bridge circuit to control the H-bridge circuit to generate the AC drive signal, the microchip comprising:

an oscillator which generates:

a main clock signal, a first phase clock signal which is high for a first time during the positive half-period of the main clock signal and low during the negative half-period of the main clock signal, and a second phase clock signal which is high for a second time during the negative half-period of the main clock signal and low during the positive half-period of the main clock signal, wherein the phases of the first phase clock signal and the second phase clock signal are centre aligned;

a pulse width modulation (PWM) signal generator subsystem comprising:

a delay locked loop which generates a double frequency clock signal using the first phase clock signal and the second phase clock signal, the double frequency clock signal being double the frequency of the main clock signal, wherein the delay locked loop synchronizes the first phase clock signal and the second phase clock signal, and wherein the delay locked loop adjusts the frequency and the duty cycle of the first phase clock signal and the second phase clock signal in response to a driver control signal to produce a first phase output signal and a second phase output signal, wherein the first phase output signal and the second phase output signal are configured to drive the H-bridge circuit to generate the AC drive signal to drive the ultrasonic transducer;

a first phase output signal terminal which outputs the first phase output signal to the H-bridge circuit;

a second phase output signal terminal which outputs the second phase output signal to the H-bridge circuit;

a feedback input terminal which receives a feedback signal from the H-bridge circuit, the feedback signal being indicative of a parameter of the operation of the H-bridge circuit or the AC drive signal when the H-bridge circuit is driving the ultrasonic transducer with the AC drive signal;

an analogue to digital converter (ADC) subsystem comprising:

at least one ADC input terminal which receives an analogue signal, wherein the ADC input terminal is connected to the feedback input terminal such that the ADC subsystem receives the feedback signal from the H-bridge circuit, and wherein the ADC subsystem samples analogue signals received at the ADC input terminal at a sampling frequency which is proportional to the frequency of the main clock signal and the ADC subsystem generates ADC digital signals using the sampled analogue signal;

a digital processor subsystem which receives the ADC digital signals from the ADC subsystem and processes the ADC digital signals to generate the driver control signal, wherein the digital processor subsystem communicates the driver control signal to the PWM signal generator subsystem to control the PWM signal generator subsystem;

a digital to analogue converter (DAC) subsystem comprising:

a digital to analogue converter (DAC) which converts a digital control signal generated by the digital processor subsystem into an analogue voltage control signal to control a voltage regulator circuit which generates a voltage for modulation by the H-bridge circuit; and a DAC output terminal which outputs the analogue voltage control signal to control the voltage regulator circuit to generate a predetermined voltage for modulation by the H-bridge circuit to drive the ultrasonic transducer to control the cavitation in the aqueous solution in response to feedback signals which are indicative of the operation of the ultrasonic transducer.

An embodiment of a system for generating hydrogen comprising:

a reaction vessel containing an aqueous solution;

a first electrode positioned at least partly within the reaction vessel;

a second electrode positioned at least partly within the reaction vessel, wherein the first electrode and the second electrode are configured to receive power from a DC power source;

a first gas collector positioned at least partly within the reaction vessel to collect hydrogen gas produced at the first electrode due to an electrolysis reaction at the first electrode;

an ultrasonic transducer at a predetermined distance from the first electrode and oriented such that ultrasonic transducer emits ultrasonic waves at least partly towards the first electrode; and a driver device coupled electrically to the ultrasonic transducer to drive the ultrasonic transducer at a frequency to generate ultrasonic waves which cause cavitation in the electrolyte solution, wherein the cavitation increases the rate of the electrolysis reaction and increases the volume of hydrogen gas produced at the first electrode.

An embodiment of a system for generating hydrogen gas comprising:

a reaction vessel containing an aqueous solution;

a cathode positioned at least partly within the reaction vessel with a portion of the cathode having an exterior surface submersed in and in electrical contact with the aqueous solution to create an interface for a reduction reaction for reducing H+ ions to produce hydrogen gas at the cathode;

an anode positioned at least partly within the reaction vessel with a portion of the anode submersed in and in electrical contact with the aqueous solution to create an interface for an oxidation reaction for oxidizing OH− ions to produce oxygen gas at the anode, wherein the cathode and the anode are configured to receive power from a power source;

a polymer-electrolyte membrane (PEM) positioned between the cathode and the anode to segregate the H+ ions and the OH− ions in the aqueous solution to create divided areas in the reaction vessel, wherein the aqueous solution in a divided area proximate the cathode has a greater concentration of H+ ions than OH− ions;

a first ultrasonic transducer positioned at least partly in the reaction vessel, the first ultrasonic transducer positioned at a predetermined distance from the cathode and oriented such that the first ultrasonic transducer emits ultrasonic waves at least partly towards the exterior surface of the cathode to agitate the aqueous solution proximate to the exterior surface of the cathode to clear any bubbles of the hydrogen gas formed at the exterior surface of the cathode to expose the exterior surface of the cathode to additional H+ ions for generation of hydrogen gas; and a second ultrasonic transducer positioned at least partly in the reaction vessel, the second ultrasonic transducer positioned at a predetermined distance from the anode and oriented such that the second ultrasonic transducer emits ultrasonic waves at least partly towards the exterior surface of the anode to cause cavitation in the aqueous solution proximate to the exterior surface of the anode, wherein the cavitation weakens hydrogen bonds between water molecules of the aqueous solution to separate individual water molecules available for interaction with the anode to undergo the oxidation reaction at the anode to oxidize OH− ions and form oxygen gas at the anode.

An embodiment of a system for generating hydrogen gas comprising:

a reaction vessel containing an aqueous solution;

a cathode positioned at least partly within the reaction vessel with a portion of the cathode having an exterior surface submersed in and in electrical contact with the aqueous solution to create an interface for a reduction reaction for reducing H+ ions to produce hydrogen gas at the cathode;

an anode positioned at least partly within the reaction vessel with a portion of the anode submersed in and in electrical contact with the aqueous solution to create an interface for an oxidation reaction for oxidizing OH− ions to produce oxygen gas at the anode, wherein the cathode and the anode are configured to receive power from a power source;

at least one first ultrasonic transducers positioned at least partly in the reaction vessel, each first ultrasonic transducer positioned at a predetermined distance from the cathode and oriented such that each first ultrasonic transducer emits and conducts ultrasonic waves through the aqueous solution at least partly towards the exterior surface of the cathode to agitate the aqueous solution proximate to the exterior surface of the cathode to clear any bubbles of the hydrogen gas formed at the exterior surface of the cathode to expose the exterior surface of the cathode to additional H+ ions for generation of hydrogen gas; and at least one second ultrasonic transducers positioned at least partly in the reaction vessel, each second ultrasonic transducer positioned at a predetermined distance from the anode and oriented such that each second ultrasonic transducer emits ultrasonic waves at least partly towards the exterior surface of the anode to cause cavitation in the aqueous solution proximate to the exterior surface of the anode, wherein the cavitation weakens hydrogen bonds between water molecules of the aqueous solution to separate individual water molecules available for interaction with the anode to undergo the oxidation reaction at the anode to oxidize OH− ions and form oxygen gas at the anode.

Representative features set out above, stand alone or may be combined, in any combination, with one or more features disclosed in the text and/or drawings of the specification.

BRIEF DESCRIPTION OF THE FIGURES

In order that the present disclosure may be more readily understood, preferable embodiments thereof will now be described, by way of example only, with reference to the accompanying drawings, in which:

FIG. 7 is a diagrammatic view of placement of ultrasonic transducers around an electrode in a system of some examples of this disclosure;

FIG. 8 is a diagrammatic view of placement of ultrasonic transducers around an electrode in a system of some examples of this disclosure;

FIG. 11 shows a table of relationships between dimensions of components of a system of some examples of this disclosure;

FIG. 23 is a table showing port functions of an example of this disclosure;

DETAILED DESCRIPTION OF THE DISCLOSURE

Figure 1:
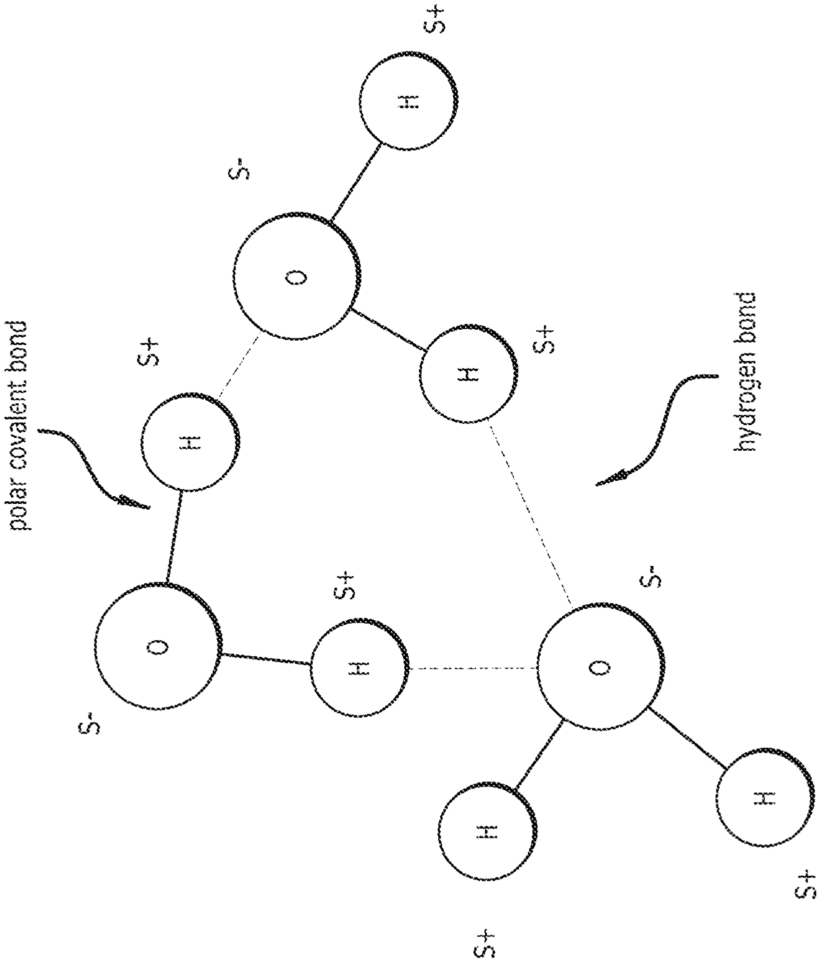
FIG. 1 is a diagram showing the bonds in and between water molecules in an aqueous solution.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The following disclosure describes representative examples. Each example may be considered to be an embodiment and any reference to an "example" may be changed to "embodiment" in the present disclosure.

Figure 2:
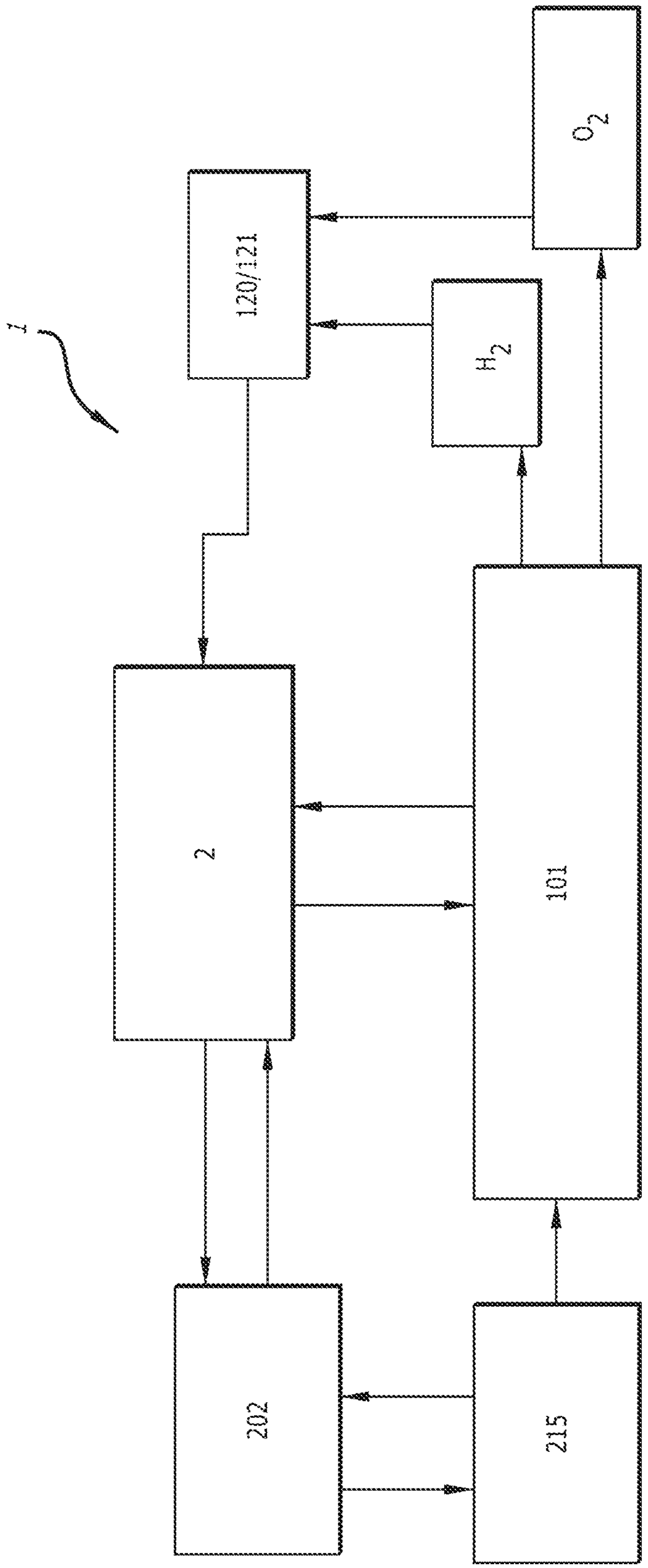
FIG. 2 is a schematic diagram of a system of some examples of this disclosure.

Referring to FIG. 2 of the accompanying drawings, a system 1 for generating hydrogen gas comprises a main controller 2. The main controller 2 coordinates the operation of components in the system 1 to optimize the operation of the system 1 for generating hydrogen gas. In some examples, the main controller 2 comprises a computing device having a processor and a non-transitory memory for executing instructions.

Figure 3:
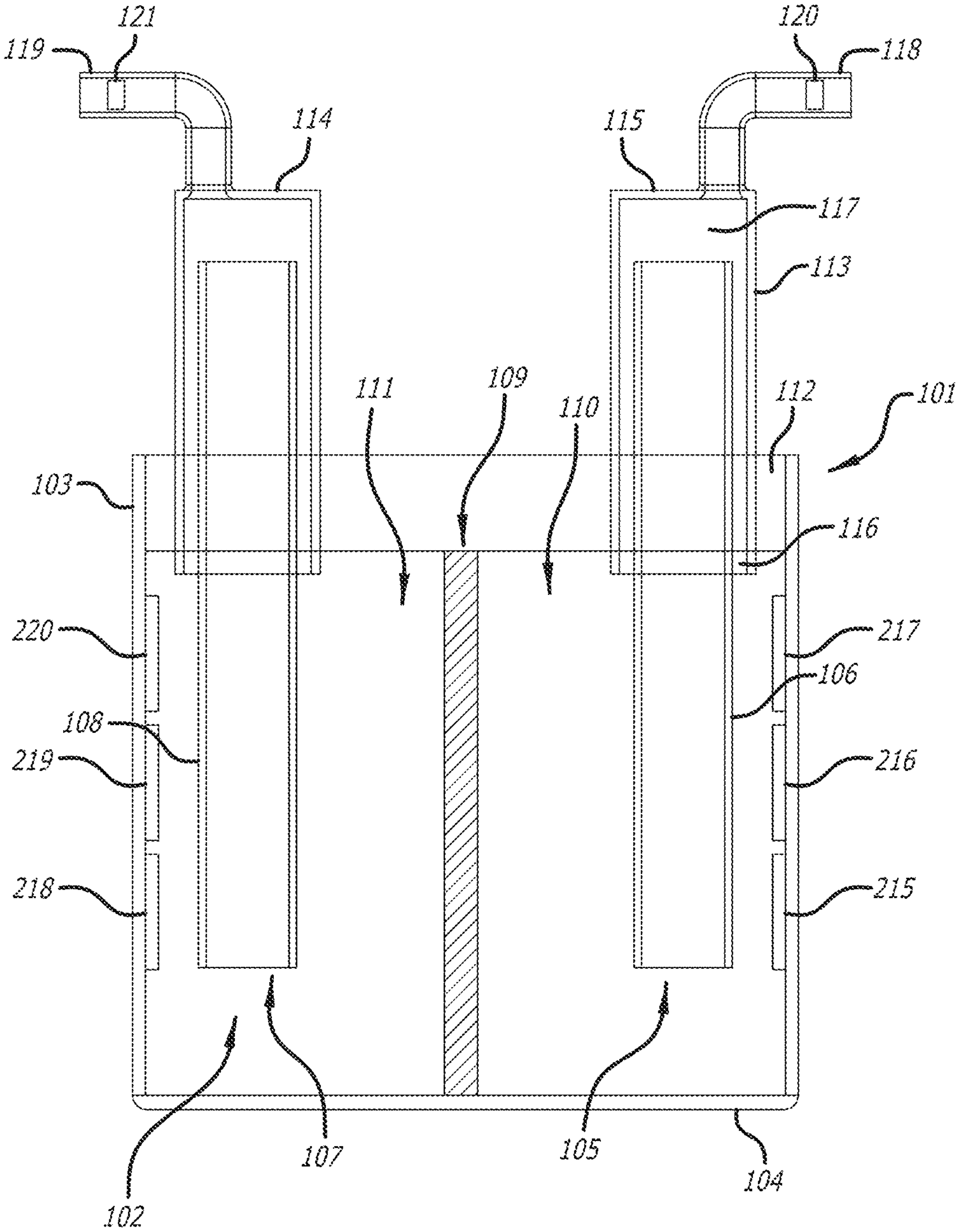
FIG. 3 is a diagrammatic view of a reaction vessel and components of a system of some examples of this disclosure.

Referring to FIG. 3 of the accompanying drawings, the system 1 of examples of this disclosure comprises a reaction vessel 101 containing an aqueous solution 102.

In some examples of this disclosure, the aqueous solution 102 is water. In other examples of this disclosure, the aqueous solution 102 is an electrolyte solution containing an electrolyte, such as sodium hydroxide. In further examples of this disclosure, the aqueous solution 102 is waste water or sea water. If sea water is used, the sea water does not need to be desalinated for use in the systems of examples of this disclosure. However, when sea water is used as the electrolyte in electrolysis process, other chemicals may be added to accelerate the hydrogen production rate, depending on the properties of the sea water.

In some examples, sodium hydroxide (NaOH) may be added to increase the pH of the sea water. This promotes the formation of hydroxide ions, which enhances the extraction of hydrogen gas during electrolysis. In other examples, optional additives, such as sodium hydroxide or other chemicals are omitted.

In this example, the reaction vessel 101 is cylindrical and comprises a curved side wall 103, however other shapes and configurations of the reaction vessels suitable for the intended purposes are contemplated and are within the scope of the present invention. The reaction vessel 101 comprises a flat or planar base 104. In this example, the base 104 is circular and has a diameter which is equal or substantially equal to the height of the side wall 103. In this example, the reaction vessel 101 therefore has a height-to-diameter ratio of 1:1.

The shape of the reaction vessel 101 of this example promotes the formation and collapse of cavitation bubbles during electrolysis while effectively mixing the aqueous solution 102. The shape of the reaction vessel 101 affects the efficiency and effectiveness of the system at performing electrolysis. The optimal shape of the reaction vessel 101 depends on various factors, the properties of the aqueous solution 102, and the geometry of the electrodes. In some examples, the optimal shape of the reaction vessel 101 is a cylinder with a diameter-to-height ratio of 1:1.

Benefits of using a cylindrical reaction vessel with a 1:1 diameter-to-height ratio include:

Reduced Current Path Length:

In a cylindrical reaction vessel with a 1:1 diameter-to-height ratio, the distance between the electrodes is minimized. This shorter current path length reduces the resistance encountered by the ions during their movement toward the electrodes, enhancing mass transport efficiency and electrolysis rates.

Efficient Gas Bubble Release:

The cylindrical shape facilitates the release and removal of gas bubbles generated during electrolysis. The vertical orientation of the cylinder allows gas bubbles to naturally rise to the top, minimizing the potential for bubble accumulation and blockage near the electrodes. This promotes continuous electrolysis and helps maintain stable and efficient operation.

Scalability:

Cylindrical vessels with a 1:1 ratio are relatively easy to fabricate. Cylindrical vessels can be easily implemented in various sizes, accommodating larger electrolysis setups. Moreover, the cylindrical shape simplifies the design and construction of supporting structures, ensuring practicality and ease of operation.

The reaction vessel 101 is provided with a cathode 105 positioned at least partly within the reaction vessel 101. A portion of the cathode 105 has an exterior surface 106 submersed in and in electrical contact with the aqueous solution 102 to create an interface for a reduction reaction for reducing H+ ions to produce hydrogen gas at the cathode 105.

The reaction vessel 101 is provided with an anode 107 positioned at least partly within the reaction vessel 101. A portion of the anode 107 has an exterior surface 108 submersed in and in electrical contact with the aqueous solution 102 to create an interface for an oxidation reaction for oxidizing OH− ions to produce oxygen gas at the anode 107.

The cathode 105 and the anode 107 are positioned within the reaction vessel 101 to be spaced apart from one another and spaced apart from the side wall 103. In this example, the cathode 105 and the anode 107 are parallel or generally parallel to the side wall 103 such that the cathode 105 and the anode 107 stand vertically within the reaction vessel 101.

The cathode 105 and the anode 107 are configured to receive power from a power source (not shown). In this example, the cathode 105 is coupled electrically to a negative terminal of a power source, such as a DC power source. The anode 107 is coupled electrically to a positive terminal of the power source. In this example, the power source is a battery, but in other examples the power source is a different type of DC power source, such as an AC-DC power adapter.

Electrons flow from the negative terminal of the power source to the cathode 105. The electrons then flow through the aqueous solution 102 to the anode 107 and from the anode 107 to the positive terminal of the power source.

During electrolysis the water undergoes:

1. a reduction reaction at the cathode, where H+ ions are reduced (receive an electron) and form hydrogen gas ($H_2$) which is released, and
2. an oxidation reaction at the anode, where OH− ions pass the extra electron to the anode and oxygen gas (O2) is produced and released.

In some embodiments, system 1 of this example comprises a Polymer Electrolytic Membrane (PEM) 109 positioned between the cathode 105 and the anode 107 to segregate the H+ ions and the OH− ions in the aqueous solution 102 to create divided areas 110, 111 in the reaction vessel 101. The aqueous solution 102 in a divided area 110 proximate the cathode 105 has a greater concentration of H+ ions than OH− ions.

The PEM 109 is a Proton Exchange membrane preferably made of perfluoro-sulfonic acid-based materials or similar proton-conducting polymers. An example of a PEM is commercially available from Nafion™ of The Chemours Company FC, LLC. of Wilmington, Delaware, USA. The PEM 109 conducts protons (H+ ions) and inhibits electron passage. To utilize this characteristic of the polymer, the PEM 109 is placed such that it separates the cathode 105 and the anode 107 and facilitates the splitting of water into Hydrogen and Oxygen.

An advantage of incorporating a PEM is that the PEM enables the system 1 to operate at relatively low temperatures, while accelerating the production of hydrogen through segregation of ions within the aqueous solution 102 for faster reduction at the cathode 105. Segregating the H+ ions and O− ions also prevents the ions from recombining within the aqueous solution 102, which further increases the efficiency of the system 1 in generating hydrogen gas.

Polymer electrolyte membrane water electrolysis (PEMWE) utilizes a sulfonated polymer membrane as the electrolyte. Typically, PEM water electrolysis functions at lower temperatures (30-80° C.) and higher current densities (1-2 A/$cm^2$), yielding gases of exceptional purity (99.999%), namely hydrogen and oxygen.

PEM electrolysis does not require caustic electrolytes, occupies minimal space, and is safer than conventional alkaline electrolysis.

In PEMWE, the oxygen produced is removed from the surface of the anode 107, while the remaining protons (H+) traverse the proton-conductive membrane towards the cathode 105. Simultaneously, electrons travel through the external circuit to reach the cathode 105. At the cathode 105, protons and electrons reunite, resulting in the generation of hydrogen gas.

To further increase the rate of hydrogen gas production, in some examples, the system 1 can include the Polymer Electrolytic Membrane (PEM) and a plurality of ultrasound transducers, placed at optimal locations within the aqueous solution 102. For example, the ultrasonic transducers may be positioned close to the anode 107 and/or the cathode 105 but leaving enough space for the aqueous solution 102 to flow easily around the anode 107 and/or the cathode 105. Alternatively, or additionally, ultrasonic transducers may be positioned close to the edges of the reaction vessel 101 to agitate the aqueous solution 102 and move ions towards the anode 107 and/or the cathode 105.

Figure 4:
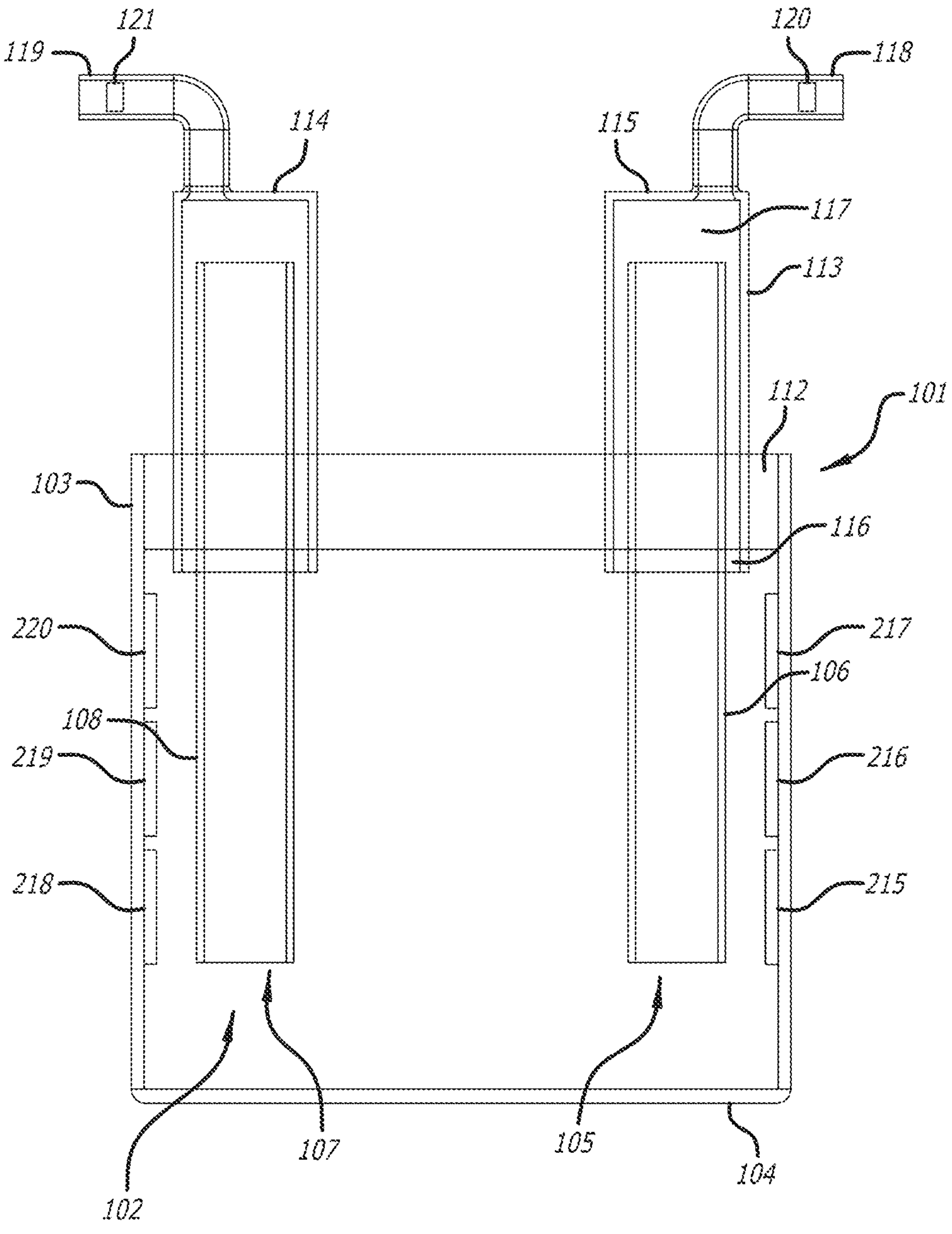
FIG. 4 is a diagrammatic view of a reaction vessel and components of a system of some examples of this disclosure.

The PEM 109 is, however, optional and is not required and is omitted in other examples of this disclosure. For example, FIG. 4 of the accompanying drawings shows the system 1 without the optional PEM 109.

Returning now to FIG. 3, in the example described above, the electrodes 105, 107 are circular cross-section rod electrodes. The electrodes 105, 107 are inserted into the aqueous solution 102 through a top wall 112 of the reaction vessel 101.

In some examples, the electrodes 105, 107 are each flat, rectangular-shaped electrodes positioned parallel to and spaced apart from one another within the reaction vessel 101. In some examples, the electrodes (anode/cathode) may have different electrode geometries depending on the intended use. For example, the electrodes may be flat elongate plates. This geometry would also disrupt any steady, laminar flow within the electrolyte, creating a turbulent vortex and increasing the interaction between water molecules and electrode.

Other electrode geometries of the electrodes (anode/cathode) of some examples of this disclosure include, but are not limited to M-shaped electrodes (increasing surface area) (similar to a heat sink), Mesh electrodes (increased surface area) or Porous electrodes (gas diffusion, improved mass transport).

In other examples, the electrodes 105, 107 are each mesh or screen electrodes consisting of a mesh or screen structure made of conductive material. These mesh or screen electrodes may be placed vertically on the inner surface of the reaction vessel 101. It is appreciated that various configurations and shapes of electrodes suitable for the intended purpose of electrolysis are contemplated and within the scope of the present invention. Some examples include, but are not limited to, electrodes that are planar and coil-shaped.

The electrodes 105, 107 may be affected by the chemicals in the aqueous solution 102. The choice of electrode material depends on various factors, such as the chemical reaction being performed, the properties of the aqueous solution, and the desired durability and efficiency of the electrodes.

In some examples, the cathode 105 and the anode 107 are of graphite, platinum or preferably stainless-steel. In some examples, the cathode 105 and the anode 107 are solid electrodes but in other examples cathode 105 and the anode 107 each comprise an aperture (tubular) or are porous. The structure of cathode 105 and the anode 107 is selected according to the required use and operating parameters of the system 1. Platinum electrodes generally have strong corrosion resistance and durability and thus are resistant to deterioration during electrolysis of water. However, platinum electrodes deteriorate over long periods and/or under harsh conditions such as when subjected to a high current density. To minimize or prevent the cathode 105 and the anode 107 from deteriorating during electrolysis, the cathode 105 and the anode 107 may be coated with materials that facilitate better performance and longevity.

In some examples, the cathode 105 and the anode 107 are coated with graphene to minimize or prevent the cathode 105 and the anode 107 from deteriorating. This coating not only prevents the cathode 105 and the anode 107 from deteriorating, but also enhances the electrical performance of the cathode 105 and the anode 107.

Graphene, being a 2-D material, is a single layer of carbon atoms arranged in a hexagonal lattice structure, making it resistant to corrosion due to its chemical stability. Moreover, the high electrical conductivity of graphene improves the overall efficiency of the cathode 105 and the anode 107 during the electrolysis process. The electrical conductivity is improved due to the availability of free electrons in the graphene lattice, with the lattice having a hexagonal structure. The presence of Dirac cones in the electronic band structure of graphene indicates the quality of its electrical properties.

The electronic structure of graphene comprises two conical energy bands meeting at two distinct points (Dirac cones/Dirac Points) which represent the energy dispersion relation for electrons. This energy dispersion relation is the product of reduced Planck's constant, the Fermi velocity, and the momentum of the electron. The linear relationship between energy and momentum allows the electrons to move with high mobility, presenting excellent electrical conductivity of the material, resulting in higher current densities being handled without deterioration to the electrodes.

Coating the cathode 105 and the anode 107 with graphene increases the lifespan of the cathode 105 and the anode 107 due to graphene's strong resistance to corrosion in harsh chemical and electrical environments. The graphene coating also increases the electrical conductivity property of the cathode 105 and the anode 107 for more efficient operation of the system in performing electrolysis of water to generate hydrogen gas.

Another example of a coating material is Goldene, a 2-D material, that is a single layer of gold atoms. Goldene provides similar benefits to graphene. In addition, gold nanoparticle-based plasmonic photocatalysts driven by the localized surface plasmon resonance excitation of gold nanoparticles (Au NPs) can be efficient solar-to-chemical converters due to their wide spectral response and are useful in plasmonic water splitting and $H_2O_2$ synthesis from water and oxygen ($O_2$).

A hydrogen gas collector 113 extends through the top wall 112 of the reaction vessel 101 and is positioned over the cathode 105 to collect hydrogen gas generated during electrolysis. An oxygen gas collector 114 extends through the top wall 112 of the reaction vessel 101 and is positioned over the anode 107 to collect oxygen gas generated during electrolysis. In this example, the hydrogen and oxygen gas collectors 113, 114 are identical or substantially identical to one another and for simplicity the elements of the hydrogen gas collector 113 will be described below. In other examples, the hydrogen and oxygen gas collectors 113, 114 may be different sizes and/or shapes from one another, suitable for the intended purpose of collecting the respective gas.

The hydrogen gas collector 113 is generally elongate with a closed end 115 and an open end 116. The hydrogen gas collector 113 preferably comprises an inner chamber 117.

The cathode 105 is inserted partially through the open end 116 of the hydrogen gas collector 113 so that hydrogen gas emitted from around the cathode 105 during electrolysis rises within the hydrogen gas collector 113 into the inner chamber 117. The hydrogen gas is therefore collected by the hydrogen gas collector 113.

Conversely, the oxygen gas collector 114 collects oxygen gas emitted from around the anode 107.

The hydrogen gas collector 113 comprises a hydrogen gas outlet 118 that allows hydrogen gas to flow out from the hydrogen gas collector 113 for use or storage. In some examples, the hydrogen gas outlet 118 communicates the hydrogen gas to a storage tank so that the hydrogen gas can be stored for use at a later date. In other examples, the hydrogen gas outlet 118 communicates the hydrogen gas to a fuel cell or alternatively a burner so the generated hydrogen gas can be utilized in real-time or near real-time to minimize or avoid the need to store a significant amount of the generated hydrogen gas.

The oxygen gas collector 114 comprises an oxygen gas outlet 119 that allows oxygen gas to flow out from the oxygen gas collector 114 for use or storage. In some examples, the oxygen gas outlet 119 communicates the oxygen gas to a storage tank so that the oxygen gas can be stored for use at a later date. In other examples, the oxygen gas outlet 119 communicates the oxygen gas to a further system so the generated oxygen gas can be utilized in real-time or near real-time to minimize or avoid the need to store a significant amount of the generated oxygen gas.

A hydrogen gas collector 113 preferably includes a pressure sensor 120 provided in the flow path from the hydrogen gas collector 113 to sense the pressure of hydrogen gas flowing out through the hydrogen gas outlet 118. The hydrogen gas pressure sensor 120 generates a hydrogen gas pressure signal and communicates the hydrogen gas pressure signal to the main controller 2. The main controller 2 uses the hydrogen gas pressure signal to calculate the volume and rate of hydrogen gas being produced by the system 1. The hydrogen gas pressure signal therefore forms part of a feedback loop in the system 1 that enables the main controller 2 to monitor the output of hydrogen gas and determine the efficiency of operation of the system 1.

The configuration of the oxygen gas collector 114 is, in this example, the same as the configuration of the hydrogen gas collector 113 but the oxygen gas collector 114 instead collects oxygen gas emitted from around the anode 107 during electrolysis.

In this example, an oxygen gas pressure sensor 121 is provided in the flow path from the oxygen gas collector 114 to sense the pressure of oxygen gas flowing out through the oxygen gas outlet 119. The oxygen gas pressure sensor 121 generates an oxygen gas pressure signal and communicates the oxygen gas pressure signal to the main controller 2. The main controller 2 uses the oxygen gas pressure signal to calculate the volume and rate of oxygen gas being produced by the system 1. The oxygen gas pressure signal therefore forms part of a feedback loop in the system 1 that enables the main controller 2 to monitor the output of oxygen gas and determine the efficiency of operation of the system 1.

While the gas pressure sensors 120, 121 provide useful feedback to the main controller 2, one or both of the hydrogen gas pressure sensor 120 and/or the oxygen gas pressure sensor 121 may be omitted in other examples of this disclosure.

The system 1 comprises an ultrasonic transducer 215 positioned at a predetermined distance $S_{t-e}$ from the cathode 105. The ultrasonic transducer 215 is oriented such that the ultrasonic transducer 215 emits ultrasonic waves at least partly towards the exterior surface of the cathode to agitate the aqueous solution proximate to the exterior surface 106 of the cathode 105 to clear any bubbles of the hydrogen gas formed at the exterior surface 106 of the cathode 105 to expose the exterior surface 106 of the cathode 105 to additional H+ ions for generation of hydrogen gas. In some examples, the ultrasonic transducer 215 emits ultrasonic waves which cause cavitation in the aqueous solution 102 proximate to the exterior surface 106 of the cathode 105.

In this example, the system 1 comprises a plurality of further ultrasonic transducers 216, 217 that are each positioned at a predetermined distance $S_{t-e}$ from the cathode 105. In this example, there are two further ultrasonic transducers 216, 217. The plurality of further ultrasonic transducers 216, 217 are oriented such that the plurality of further ultrasonic transducers 216, 217 emit ultrasonic waves at least partly towards the exterior surface of the cathode to agitate the aqueous solution proximate to the exterior surface 106 of the cathode 105 to clear any bubbles of the hydrogen gas formed at the exterior surface 106 of the cathode 105 to expose the exterior surface 106 of the cathode 105 to additional H+ ions for generation of hydrogen gas. In some examples, the ultrasonic transducers 216, 217 emits ultrasonic waves which cause cavitation in the aqueous solution 102 proximate to the exterior surface 106 of the cathode 105.

In other examples the plurality of further ultrasonic transducers 216, 217 are omitted. In further examples, the system 1 comprises a greater number of further ultrasonic transducers than the two further ultrasonic transducers 216, 217 shown in FIG. 3.

Figure 5:
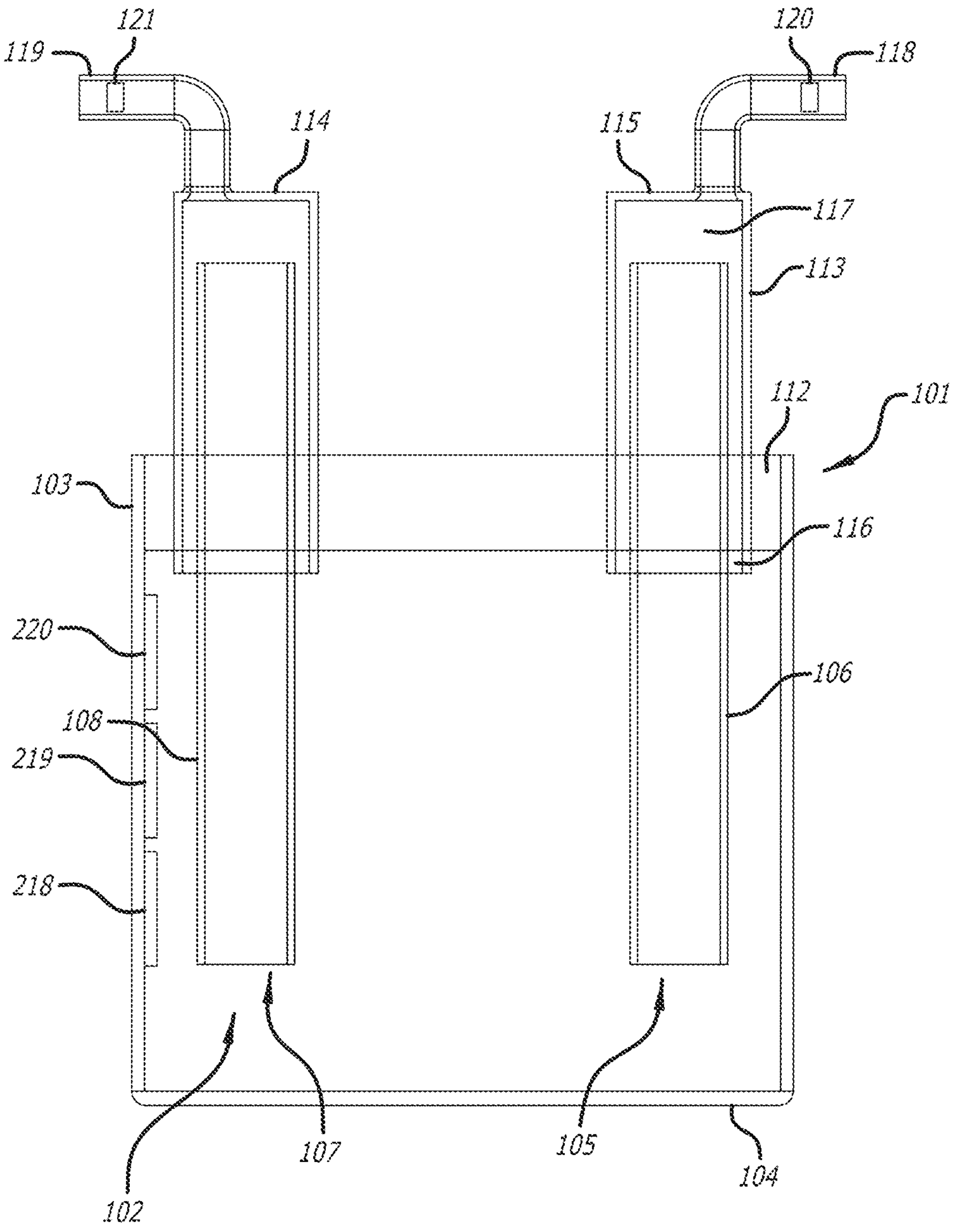
FIG. 5 is a diagrammatic view of a reaction vessel and components of a system of some examples of this disclosure.

In other examples the ultrasonic transducers 215-217 on the cathode side of the reaction vessel 101 are omitted entirely, for example as shown in FIG. 5.

In this example, the system 1 comprises at least one or a plurality of anode-side ultrasonic transducers 218-220 that are each positioned at a predetermined distance $S_{t-e}$ from the anode 107. In this example, there are three anode-side ultrasonic transducers 218-220. The anode-side ultrasonic transducers 218-220 are oriented such that the anode-side ultrasonic transducers 218-220 emit ultrasonic waves at least partly towards the exterior surface 108 of the anode 107 to cause cavitation in the aqueous solution 102 proximate to the exterior surface 108 of the anode 107. The cavitation weakens hydrogen bonds between water molecules of the aqueous solution 102 to separate individual water molecules available for interaction with the anode 107 to undergo the oxidation reaction at the anode 107 to oxidize OH− ions and form oxygen gas at the anode 107.

Figure 6:
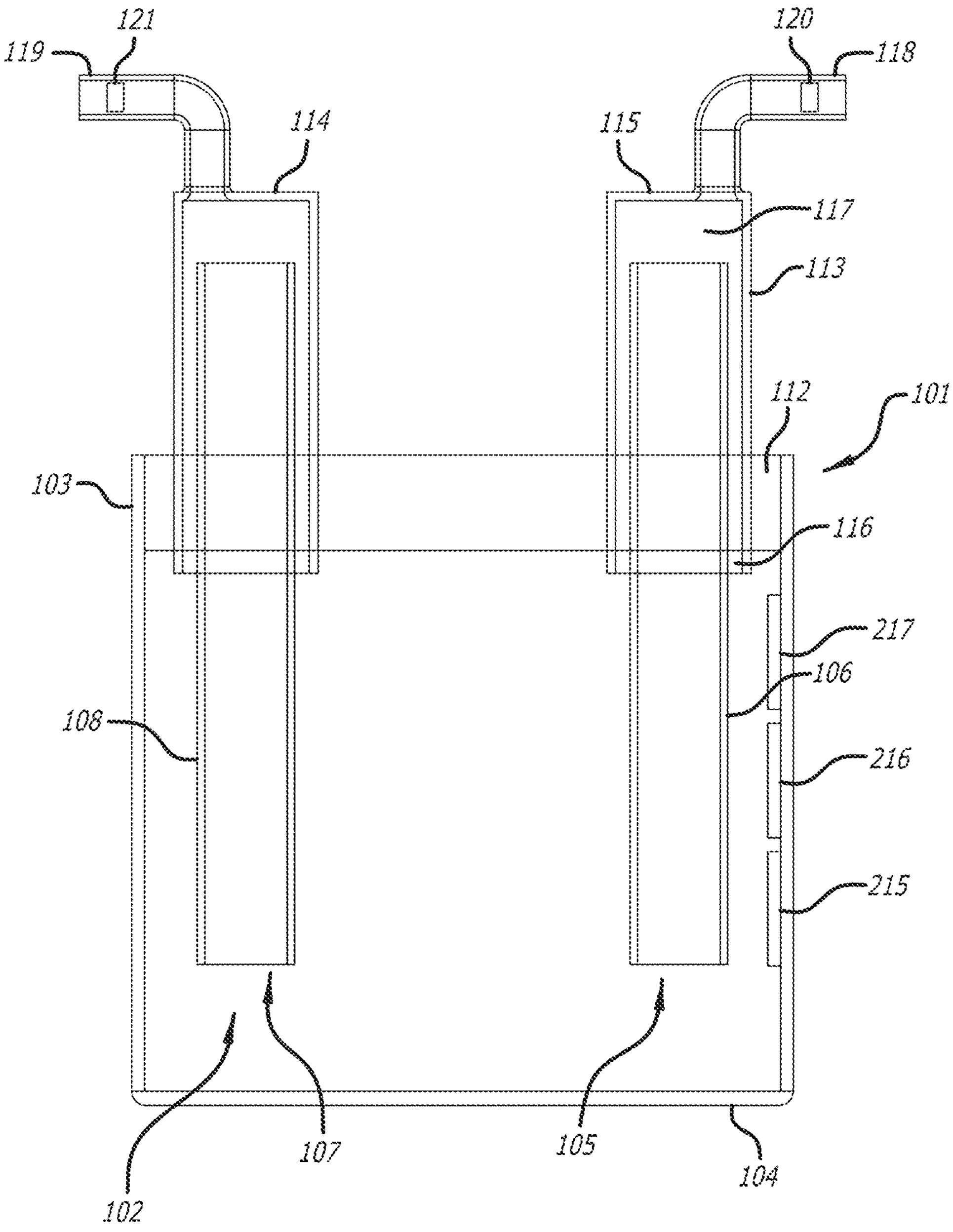
FIG. 6 is a diagrammatic view of a reaction vessel and components of a system of some examples of this disclosure.

In some examples, the system 1 comprises a greater or lower number of anode-side ultrasonic transducers than the three anode-side ultrasonic transducers 218-220 shown in FIG. 3. In other examples the anode-side ultrasonic transducers 218-220 are omitted entirely, for example as shown in FIG. 6.

For simplicity, the description below will refer to one ultrasonic transducer 215 and how that ultrasonic transducer 215 is driven by the transducer driver 202. However, the description applies equally to any of the other ultrasonic transducers that work in the same way as the ultrasonic transducer 215 to cause cavitation in the aqueous solution 102.

During electrolysis, the introduction of ultrasound in the aqueous solution 102 agitates the solution, increasing the rate of collisions between the H+ and the cathode 105. Ultrasound waves are transmitted through the aqueous solution 102, creating agitations and cavitation bubbles. The efficiency of electrolysis process to produce hydrogen gas using water can be improved with the addition of ultrasound.

In examples of this disclosure, at least one ultrasonic transducer is preferably driven at a frequency in a frequency range of 20 kHz to 40 kHz to induce convective flow and agitations within the aqueous solution 102. In other examples of this disclosure, an ultrasonic transducer is driven at a different frequency depending on the desired result.

Advantages of ultrasound transmission through the aqueous solution 102 include:

1. increased mass flow to the anode 105 and/or cathode 107 as the ultrasound waves create a stirring effect, increasing the rate of reaction. This also ensures a homogenous mix of all constituents of the aqueous solution 102 in the reaction vessel 101.
2. the stirring effect also regulates temperature throughout the aqueous solution 102, facilitating lower operating temperatures.
3. Removal/release of gas bubbles that may stick to the anode and/or cathode. Gas bubbles that stay on the anode and/or cathode reduce the exposed surface area of the anode/cathode, reducing the rate of the reaction.
4. The formation and collapse of cavitation bubbles creates localized shockwaves of energy ranging from 500 to several thousand Joules. This further increase the rate of reaction by weakening/breaking the hydrogen bonds between adjacent water molecules.

The ultrasound waves induce localized cavitation bubbles proximate to the exterior surface of the cathode/anode, which upon implosion, release energy in the form of microjets in the aqueous solution 102. As well as agitating the aqueous solution 102, the microjets from the cavitation weaken or break the hydrogen bonds in water molecules in the aqueous solution 102. This facilitates rapid breakdown of the water molecules into H+ and OH− ions which contact the cathode/anode and are reduced and oxidized to generate hydrogen gas and oxygen gas at the cathode 105 and anode 107, respectively.

The increased contact of the H+ ions with the cathode 105 accelerates the speed of the electrolysis process, producing higher quantities of hydrogen gas within a unit of time (consuming less power for the same amount of hydrogen production compared to traditional method). Moreover, the vessel geometry and optimal placement of the cathode 105, for maximized contact with the H+ ions in the aqueous solution 102, also increases the output of produced hydrogen gas.

In other examples of this disclosure, the system 1 drives at least one ultrasonic transducer within the aqueous solution 102 at a higher frequency, such as 3 MHz to 20 MHZ, preferably 10 MHz. The at least one ultrasonic transducer is preferably positioned close to the top surface of the aqueous solution 120 to facilitate sonolysis of water molecules in the aqueous solution 102. At higher frequencies in the 3 MHz to 20 MHz or higher range, the ultrasonic waves emitted from each ultrasonic transducer perform sonolysis and break apart water molecules in the aqueous solution to generate hydrogen gas directly from the water. In these examples, the sonolysis performed by each ultrasonic transducer may be performed instead of or in addition to electrolysis to maximize the yield of hydrogen gas.

In some examples, an ultrasonic transducer is positioned concentric or generally concentric with the open end 116 of the hydrogen gas collector 113. The ultrasonic transducer is positioned to emit ultrasonic waves in a direction towards the cathode 105. In this example, the direction of the ultrasonic waves emitted by the ultrasonic transducer 215 is aligned with the longitudinal length of the cathode 105.

In some examples, the ultrasonic transducer 215 is an ultrasonic horn (sonotrode). In these examples, the ultrasonic horn is capable of delivering high frequency and high intensity ultrasound waves for use in an industrial system for generating hydrogen.

In some examples, the ultrasonic horn is a Barbell Horn™. The Barbell Horn™ is able to amplify ultrasonic amplitudes while retaining large output diameters and radiating areas. An example of a Barbell Horn™ is disclosed in U.S. Pat. No. 11,325,094, incorporated herein by reference.

In some examples, the ultrasonic horn is a rod horn, which comprises a solid metal rod with a round transverse cross-section and a variable-shape longitudinal cross-section. In other examples, the ultrasonic horn is a block horn, which comprises a rectangular transverse cross-section and a variable-shape longitudinal cross-section.

The main controller 2 is coupled electrically to a power controller (not shown) that controls the power (electrode potential difference) applied across the cathode 105 and the anode 107 during electrolysis. The main controller 2 activates the power controller to deliver power to the cathode 105 and the anode 107 to start the electrolysis reaction as well as controlling the level of power to vary the rate of the electrolysis reaction. The main controller 2 also deactivates the power controller stop the electrolysis reaction.

The main controller 2 is also coupled electrically to a transducer driver 202 to initiate and control the operation of the transducer driver 202. The transducer driver 202 is coupled electrically to the ultrasonic transducer 215 to drive the ultrasonic transducer 215 to generate ultrasonic waves. In examples where the system comprises a plurality of ultrasonic transducers, the system 1 comprises a plurality of transducer drivers 202 with each transducer driver coupled electrically to control a respective one of the ultrasonic transducers. In further examples, the system comprises a transducer driver incorporating a plurality of outputs that are coupled electrically to a plurality of ultrasonic transducers to drive the ultrasonic transducers respectively to generate ultrasonic waves. For simplicity, the following description refers to only one transducer driver 202 coupled to only one ultrasonic transducer 215.

The main controller 2 coordinates the level of power delivered to the cathode 106 and the anode 107 with the operation of the transducer driver 202 to optimize the operation of the system 1 for generating hydrogen gas.

The placement of the ultrasonic transducer 215 (and similarly the other ultrasonic transducers 216-220) is an important factor in controlling the rate of the electrolysis reaction. A transducer placed in close proximity to the cathode/anode increases the efficiency of mechanical agitations around the cathode/anode, increasing rate of reaction.

Moreover, transducer placement also determines the region of cavitation bubbles' formation and collapse. The cavitation bubble implosions create localized shockwaves that, next to the cathode/anode, facilitate efficient, accelerated bubble release from cathode/anode surface. Consistent agitation and convective flow also ensure that there is no stagnation within the aqueous solution and every molecule/ion flows to the cathode/anode.

Each ultrasonic transducer is positioned according where the ultrasonic transducer produces regions of active cavitation bubble formation and collapse. The aim is to ensure close proximity of the cavitation bubble formation regions to the surface of the cathode/anode.

Cavitation bubbles are usually formed in the rarefaction regions of the ultrasound wave (longitudinal mechanical waves). In the rarefaction regions, the particles/layers of the medium (electrolyte) are being stretched apart, creating voids (cavitation bubbles). With each passing wave, the cavitation bubble in the rarefaction region grows to a size that is no longer sustainable, due to pressure difference between the outside and inside of the bubble.

The immense pressure difference then causes the bubble to instantly implode, creating localized regional conditions of up to 200 atm pressure and 5000° K. (since these conditions are at an infinitesimal scale, the dissipation rate is $10^{-4\circ}$ $Ks^{-1}$). The violent implosion of the cavitation bubble also releases a shockwave that travels through the medium (water) inducing microjets. These microjets shake gas bubbles off the electrodes to continuously maximise exposed surface area for increased reaction rates.

The intensity of ultrasound waves (measured in $Wcm^{-2}$) reduces by a square on average as the electrode moves away from the transducer. Therefore, in some examples, the space between transducer and electrode is kept close to 1× (one) wavelength of the ultrasound wave. In other examples, the space between transducer and electrode is kept close to a multiple (plurality) of one wavelength of the ultrasound wave.

To find the wavelength of the ultrasound wave, the following formula is used:

$$\lambda = \frac{v}{f}$$

Where 'λ' is the wavelength,

'v' is velocity of the wave, and

'f' is wave frequency.

To find velocity of ultrasound waves in water (electrolyte), the following formula is used:

$$v = \sqrt{\frac{K}{\rho}}$$

Where 'K' is the bulk modulus of the aqueous solution (for water, this is $2.2\times10^9$ Pa @ room temperature and pressure), and 'ρ' is the density of the aqueous solution (for water, this is 1000 $kgm^{-3}$)

Since the preferable range for ultrasound transmission in the system 1 is set at 20 KHz-40 kHz, the range of wavelengths can be found by calculating the minimum and maximum wavelength values.

$$\lambda = \frac{v}{f} \text{ and } v = \sqrt{\frac{K}{\rho}}$$

$$\lambda = \frac{\sqrt{\frac{K}{\rho}}}{f} \quad \lambda_{min} = \frac{\sqrt{\frac{2.2*10^9}{1000}}}{40000} = 37 \text{ mm}$$

$$\lambda_{max} = \frac{\sqrt{\frac{2.2*10^9}{1000}}}{20000} = 74 \text{ mm}$$

Therefore, for a frequency range of 20 KHz to 40 kHz the one-wavelength placement distance between the anode/cathode and the transducer is 37 mm to 74 mm.

In other examples, each transducer is spaced further from the anode/cathode than one wavelength. In some examples, such as for use in but not limited to industrial settings, each transducer is spaced from the anode/cathode by a distance equal to or substantially equal to a plurality of wavelengths of the ultrasonic waves emitted by the ultrasonic transducer.

The wavelength is relative to the frequency of the ultrasonic wave. Each ultrasonic transducer may be spaced from the anode/cathode by 1× or 2× the wavelength of the ultrasonic waves depending on the intensity (input power) of the ultrasonic wave. If the ultrasonic transducers are operated at higher power, the intensity of the ultrasound waves is higher and the position distance of the ultrasonic transducers relative to the anode/cathode can be 2×, 3× or the wavelength or higher.

Introduction of a plurality of transducers in close proximity to the cathode/anode, especially the cathode, causes more agitation and a multitude of cavitation bubbles' collapses along the length of the cathode/anode.

As shown in FIGS. 3-6, a plurality of ultrasonic transducers 215-220 are placed within the aqueous solution 102 at set positions. In these examples, the ultrasonic transducers 215-220 are mounted to the side wall 103 of the reaction vessel 101. However, in other examples, the ultrasonic transducers 215-220 are spaced apart from the side wall 103 of the reaction vessel 101.

In some examples, with all the ultrasonic transducers 215-217 lined in the same direction and facing towards the cathode 105, the collective agitation is increased, resulting in H+ ions interacting with the surface of the cathode 105, increasing the rate of reaction (hydrogen gas production). The placement of the plurality of ultrasonic transducers 218-220 also increases the number of cavitation bubble collapse regions adjacent to the anode 107, further weakening the hydrogen bonds between water molecules, separating them, and facilitating individual water molecules' interactions with the anode 107, again increasing the rate of reaction.

Referring now to FIG. 7 of the accompanying drawings, in other examples the system 1 comprises a plurality of ultrasonic transducers 221-223 positioned at least partly around the cathode 105. In these examples, the ultrasonic transducers 221-223 emit ultrasound waves that bombard the cathode 105 from multiple angles. In the example shown in FIG. 7 there are three ultrasonic transducers 221-223 equally spaced at an angle of at or near 120° around the cathode 105. In other examples, there are a greater or fewer number of ultrasonic transducers positioned at the same or different spacings and angles around the cathode 105 to that shown in FIG. 7. For example, in the case of four ultrasonic transducers, the ultrasonic transducers may be equally spaced at an angle of at or near 90° around the cathode 105.

Referring now to FIG. 8 of the accompanying drawings, in some examples the ultrasonic transducers 221-223 are offset relative to one another along the length of the cathode 105 as well as being positioned at least partly around the cathode 105. In these examples, the ultrasonic transducers 221-223 are positioned on or approximately on a helix path 224 (shown in dotted line in FIG. 8) extending around and along part of the cathode 105. The aim again of this ultrasonic transducer arrangement is to bombard the cathode 105 with ultrasound waves from multiple or all directions to increase the reduction reaction at the cathode 105.

In some examples, ultrasonic transducers are positioned around the anode 107 in the same or a similar configuration as the ultrasonic transducers 221-223 positioned around the cathode 105 as described above and as shown in FIGS. 7 and 8. In the case of the anode 107, the aim of this ultrasonic transducer arrangement is to bombard the anode 107 with individual water molecules from multiple or all directions to increase the oxidization reaction at the anode 107. In some examples ultrasonic transducers are positioned around the anode 107 but not around the cathode 105 or vice versa.

Introducing an ultrasound transducer into systems that incorporate a PEM 109 increase the overall yield of hydrogen gas produced. This also reduces the need of expensive noble metal electrode coating that are used as catalysts, while increasing the rate of reaction.

The distance between the anode 107 and the ultrasonic transducers 218-220 is ~1×λ (wavelength) of the ultrasound wave produced by each ultrasonic transducers 218-220. Regions of low pressure (rarefaction) cause cavitation bubbles to be formed in close proximity to the anode 107, and upon collapse, release high energy shockwaves in the localized region, breaking the hydrogen bonds between water molecules and facilitating increased number of free water molecules that hit the anode 107 and are then broken into oxygen atoms (that combine together to form oxygen molecules/gas) and hydrogen (H+) ions. The hydrogen ions travel through the PEM 109 and, at the cathode 105, receive the electrons that have travelled through the power source. This results in hydrogen atoms being collected around the cathode 105 by the hydrogen gas collector 113. The hydrogen atoms covalently bond to form hydrogen gas ($H_2$). The process continues as it would without an ultrasound transducer, albeit at higher reaction rates, producing higher quantity of 'green hydrogen' within the same duration due to the improved efficiency resulting from the use of ultrasound.

Multiple ultrasonic transducers are controlled to operate at precise parameters based on their positioning around each other. This ensures that the ultrasound wave transmission from each ultrasonic transducer have optimal effect on the cathode/anode and not reduced by the wave from an adjacent ultrasonic transducer. In some examples, the transducers are controlled using a single driver IC with multi-channel transducer control output to drive a singular or plurality of transducers simultaneously.

As described in below, each transducer driver 202 drives the respective ultrasonic transducer 215 to maximize the delivery of power by ultrasonic waves emitted from the ultrasonic transducer 215 regardless of the temperature and/or properties of the aqueous solution 102.

The transducer driver 202 comprises an H-bridge circuit connected to the ultrasonic transducer 215. The H-bridge circuit generates an AC drive signal to drive the ultrasonic transducer 215 to generate and transmit ultrasonic waves. A microchip is connected to the H-bridge circuit to control the H-bridge circuit to generate the AC drive signal.

The microchip is described in detail below. In summary, the microchip comprises an oscillator which generates a main clock signal, a first phase clock signal which is high for a first time during the positive half-period of the main clock signal and low during the negative half-period of the main clock signal. The oscillator generates a second phase clock signal which is high for a second time during the negative half-period of the main clock signal and low during the positive half-period of the main clock signal. The phases of the first phase clock signal and the second phase clock signal are centre aligned.

The transducer driver 202 comprises a pulse width modulation (PWM) signal generator subsystem which is described in detail below. The PWM signal generator subsystem comprises a delay locked loop which generates a double frequency clock signal using the first phase clock signal and the second phase clock signal, the double frequency clock signal being double the frequency of the main clock signal, The delay locked loop synchronizes the first phase clock signal and the second phase clock signal, and adjusts the frequency and the duty cycle of the first phase clock signal and the second phase clock signal in response to a driver control signal to produce a first phase output signal and a second phase output signal. The first phase output signal and the second phase output signal are configured to drive the H-bridge circuit to generate the AC drive signal to drive the ultrasonic transducer 215.

A first phase output signal terminal outputs the first phase output signal to the H-bridge circuit. A second phase output signal terminal outputs the second phase output signal to the H-bridge circuit. A feedback input terminal receives a feedback signal from the H-bridge circuit, the feedback signal is indicative of a parameter of the operation of the H-bridge circuit or the AC drive signal when the H-bridge circuit is driving the ultrasonic transducer 215 with the AC drive signal.

The transducer driver 202 comprises an analogue to digital converter (ADC) subsystem comprising at least one ADC input terminal which receives an analogue signal. The ADC input terminal is connected to the feedback input terminal such that the ADC subsystem receives the feedback signal from the H-bridge circuit. The ADC subsystem samples analogue signals received at the ADC input terminal at a sampling frequency which is proportional to the frequency of the main clock signal and the ADC subsystem generates ADC digital signals using the sampled analogue signal.

The transducer driver 202 comprises a digital processor subsystem which receives the ADC digital signals from the ADC subsystem and processes the ADC digital signals to generate the driver control signal. The digital processor subsystem communicates the driver control signal to the PWM signal generator subsystem to control the PWM signal generator subsystem. The transducer driver 202 further comprises a digital to analogue converter (DAC) subsystem comprising a digital to analogue converter (DAC) which converts a digital control signal generated by the digital processor subsystem into an analogue voltage control signal to control a voltage regulator circuit which generates a voltage for modulation by the H-bridge circuit.

A DAC output terminal outputs the analogue voltage control signal to control the voltage regulator circuit to generate a predetermined voltage for modulation by the H-bridge circuit to drive the ultrasonic transducer 215 to control the cavitation in the aqueous solution in response to feedback signals which are indicative of the operation of the ultrasonic transducer. The intensity of the ultrasound waves emitted by the ultrasonic transducer 215 is controlled by the level of the predetermined voltage.

The ultrasonic transducer 215 improves the efficiency of the electrolysis process due to the agitation of the aqueous solution 102 by the ultrasonic waves emitted by the ultrasonic transducer 215 and the energy resulting from the cavitation in the aqueous solution 102 weakening or breaking hydrogen bonds in the water molecules. In some examples, the ultrasonic transducer 215 produces ultrasound at a frequency of 20 kHz to 40 kHz, preferably 26 kHz which agitates the aqueous solution 102 by causing numerous localized cavitation implosions (formation and collapse of tiny bubbles in the solution). This cavitation creates local areas of high pressure and temperature within the aqueous solution 102, thus increasing the rate of the electrolysis reaction.

In other examples, the transducer driver 202 drives the ultrasonic transducer 215 at a higher frequency of 2 MHz to 5 MHz or 3 MHz±200 kHz.

In other examples of this disclosure, the transducer driver 202 drives the ultrasonic transducer 215 at a frequency in the range 20 kHz to 5 MHz.

The intensity of ultrasound required for sonoelectrolysis of water depends on various factors, such as the size and shape of the reaction vessel, the properties of the aqueous solution, and the desired effects of the ultrasound on the electrolysis process. In some examples, the system 100 uses high intensity ultrasound for electrolysis of water where cavitation is desired.

In some examples of this disclosure, the driver device 202 drives the ultrasonic transducer 215 to emit ultrasonic waves at an intensity of 0.05 $Wcm^{-2}$ to 0.5 $Wcm^{-2}$, or preferably 0.1 $Wcm^{-2}$. However, other intensity values and ranges are contemplated and those skilled in the art will appreciate that the intensity value or range will be selected in other examples based on the use and application of the system. For example, it will be appreciated that a higher ultrasound intensity, for example 0.5 $Wcm^{-2}$ to 5 $Wcm^{-2}$, may be required for generating hydrogen gas in an industrial application.

The intensity of the ultrasonic waves emitted by the ultrasonic transducer 215 is controlled by an algorithm implemented in the transducer driver 202. The algorithm functions in unison with integrated circuits within the transducer driver 202, employing the feedback loop to continuously adjust the intensity and frequency of the ultrasonic waves generated by the ultrasonic transducer 215 to ensure optimal hydrogen gas production.

The transducer driver 202 adjusts the frequency and/or intensity of the ultrasonic waves emitted by the ultrasonic transducer 215 using continuous monitoring of the volume of hydrogen gas produced. The gas pressure sensor 117 in the hydrogen gas collector 112 records the increase in gas pressure over time to determine the gas production rate. This information is relayed in the form of the gas pressure signal to the transducer driver 202. The transducer driver 202 then adjusts the frequency and/or intensity of the ultrasonic waves emitted by the ultrasonic transducer 215 to increase the rate of hydrogen gas production and keep it maintained. This forms the feedback loop between initial parameters (frequency and intensity) and adjusted parameters (frequency and intensity).

In examples of this disclosure that use high frequency ultrasound (~3 MHz±200 kHz), the high frequency ultrasound can lead to more efficient cavitation (formation and collapse of small bubbles in the aqueous solution). When the bubbles collapse, they generate localized areas of high temperatures and pressures at the cavitation bubbles for a very short time, which enhance the reaction rate and facilitate the extraction of hydrogen gas. High frequencies of ultrasound lead to small and stable cavitation bubbles, which result in more efficient energy transfer and more effective mixing of the aqueous solution.

Direct Sonoelectrolysis

Sea water can be used as an electrolyte in electrolysis applications. Sea water is a naturally occurring electrolyte solution that contains a variety of dissolved salts and ions, such as sodium, chloride, magnesium, and calcium ions.

In conventional systems for producing hydrogen from sea water, the sea water is first desalinated to remove the dissolved salts, and then the resulting purified water is electrolyzed to produce hydrogen gas. However, with the use of ultrasound and the introduction of frequency and/or intensity adjustments made by the transducer driver 202, the system 100 is capable of electrolyzing sea water directly to produce hydrogen gas. The expensive and time-consuming process of desalination is eliminated by the systems of some examples of this disclosure.

When the system 100 is operating, ultrasonic waves emitted by the ultrasonic transducer 215 are applied to the sea water, which induces cavitation (formation and collapse of bubbles). This phenomenon creates localized regions of high pressure and temperatures in cavitation bubbles in the sea water for a very short time, leading to increased mass and heat transfer rates. The energy from the cavitation weakens or breaks the hydrogen bonds between water molecules.

The ultrasonic waves emitted by the ultrasonic transducer 215 displace the solutes present in sea water to facilitate electrolysis proximate to the surface of the cathode 105.

Improved mass transfer enhances the mixing and movement of reactants near the electrodes 105, 106, improving the distribution of ions in the aqueous solution 102 (sea water). The ions move freely within the aqueous solution 102 (sea water) as they would in desalinated sea water with a conventional electrolysis process.

The systems of examples of this disclosure enable precise control of the frequency and intensity of the ultrasound waves emitted from the ultrasonic transducer to precisely control the system and accommodate for changes in the reaction conditions in the reaction vessel. The ultrasound waves reduce dirt formation on the electrodes and promote the formation of more uniform and well-defined electrode surfaces, which improved the efficiency and durability of the electrodes over time.

In some examples, ultrasonic transducers are positioned to emit ultrasonic waves upwardly in a direction which is generally aligned with the longitudinal length of the hydrogen or oxygen gas collectors 113, 114. The ultrasonic waves emitted by the ultrasonic transducers control the distribution of hydrogen gas bubbles in the aqueous solution 102. Having at least one ultrasonic transducer as the source of ultrasound at the base of the respective anode/cathode ensures efficient stirring of the aqueous solution 102. The stirring effect exposes more ions to the surface of the anode/cathode for increased gas production.

Each of the ultrasonic transducers described above is coupled electrically to one or more transducer drivers, such as the transducer driver 202.

The placement of each ultrasonic transducer relative to a respective anode 107 or cathode 105 depends on the specific application and the properties of the aqueous solution 102. Ideally, the transducer is placed in close proximity to the exterior surface 106, 18 of the anode/cathode (either below or to the side of the anode/cathode) to facilitate the formation of cavitation bubbles and enhance the efficiency of the electrolysis process.

The placement of the ultrasonic transducer in the reaction vessel 101 also depends on the size and geometry of the reaction vessel 101 along with the properties of the aqueous solution 102.

The size of the reaction vessel 101 affects the rate of electrolysis with the following considerations:

Mass Transport:

The rate at which ions reach the cathode 105 and the anode 107 is affected by the distance the ions need to travel to be in contact with the cathode 105 and the anode 107. In smaller reaction vessels, this distance is less, shortening the path for ions to reach the electrodes and resulting in a faster gas production.

Electrode Surface Area:

Large reaction vessels allow for large or multiple electrodes, increasing the overall surface area available for ions to contact and this increases the volume of gas produced (increased production rate). In some examples of this disclosure, the system 100 comprises a greater number of electrodes than the cathode 105 and the anode 107 of the examples described above.

Reaction vessel geometry affects the electrolysis process rate due to the following:

Position of Electrodes:

The cathode/anode position is selected based on the geometry of the reaction vessel. The spacing between the cathode 105 and the anode 107 is also selected based on the geometry of the reaction vessel 101. The distance between the cathode 105 and the anode 107 and their relative positioning affects the quantity of ions contacting them, affecting the reaction rate.

Ionic Density Around Electrodes:

The shape of the reaction vessel affects the distribution of electrolyte (density of ions) around the cathode 105 and the anode 107. A uniform electrolyte distribution around the cathode 105 and the anode 107 promotes effective ion transport, increasing reaction rates.

The reaction vessel size optimization requires consideration of the balance between the ion transport distance to the electrodes and the available surface area of electrodes for ions to contact.

Scalability:

In some examples, the reaction vessel shape is selected for industrial scale use. This means that the shape of the reaction vessel is adapted for the desired hydrogen gas production capacity, is easy to maintain and operate.

The reaction vessel size and geometry are parameters that affect the performance, efficiency, and rate of the electrolysis process. Introduction and placement of at least one ultrasonic transducer within the reaction vessel is determined by the reaction vessel's size and geometry. This is also a factor that determines the type of ultrasonic transducer placed within the electrolytic solution.

Figure 9:
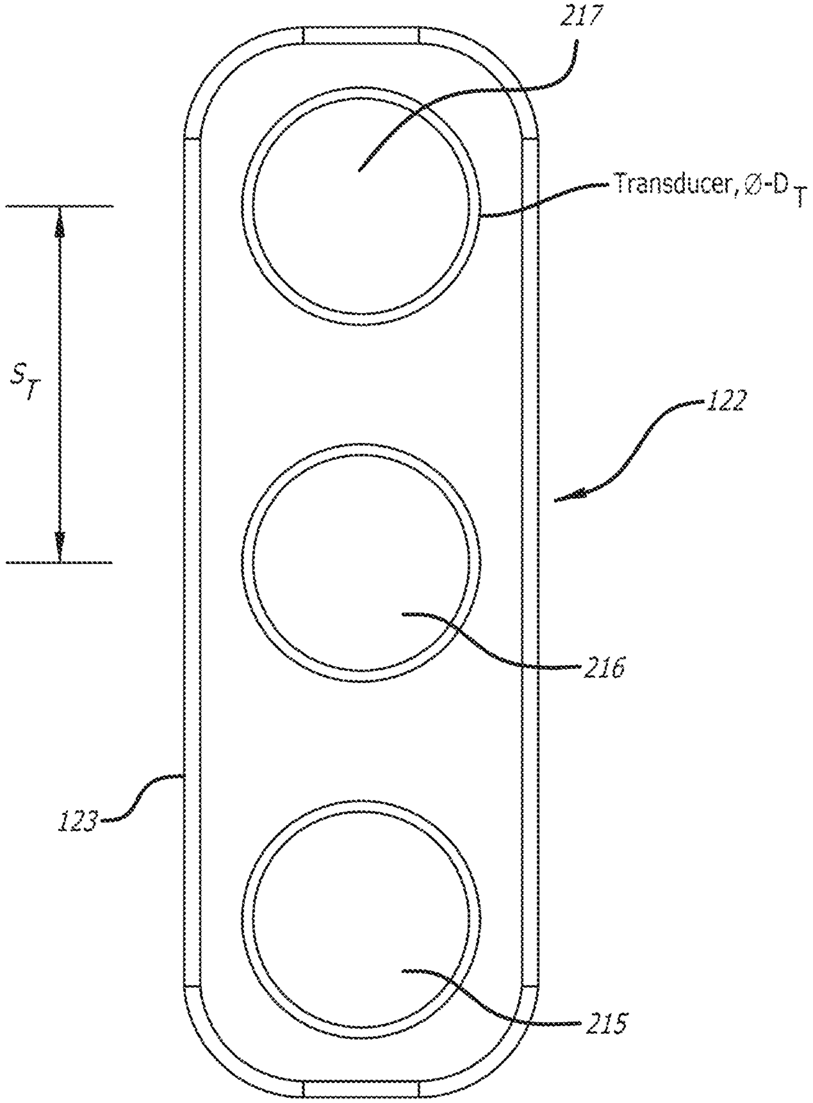
FIG. 9 is a diagrammatic view of a transducer holder and ultrasonic transducers of a system of some examples of this disclosure.

Referring now to FIG. 9 of the accompanying drawings an ultrasonic transducer array 122 of some examples comprises three ultrasonic transducers 215-217 held by a transducer holder 123. Each of the ultrasonic transducers 215-217 has a diameter $D_T$.

The center of each of the ultrasonic transducers 215-217 is spaced apart from the center of an adjacent one of the ultrasonic transducers 215-217 by a distance $S_T$.

Figure 10:
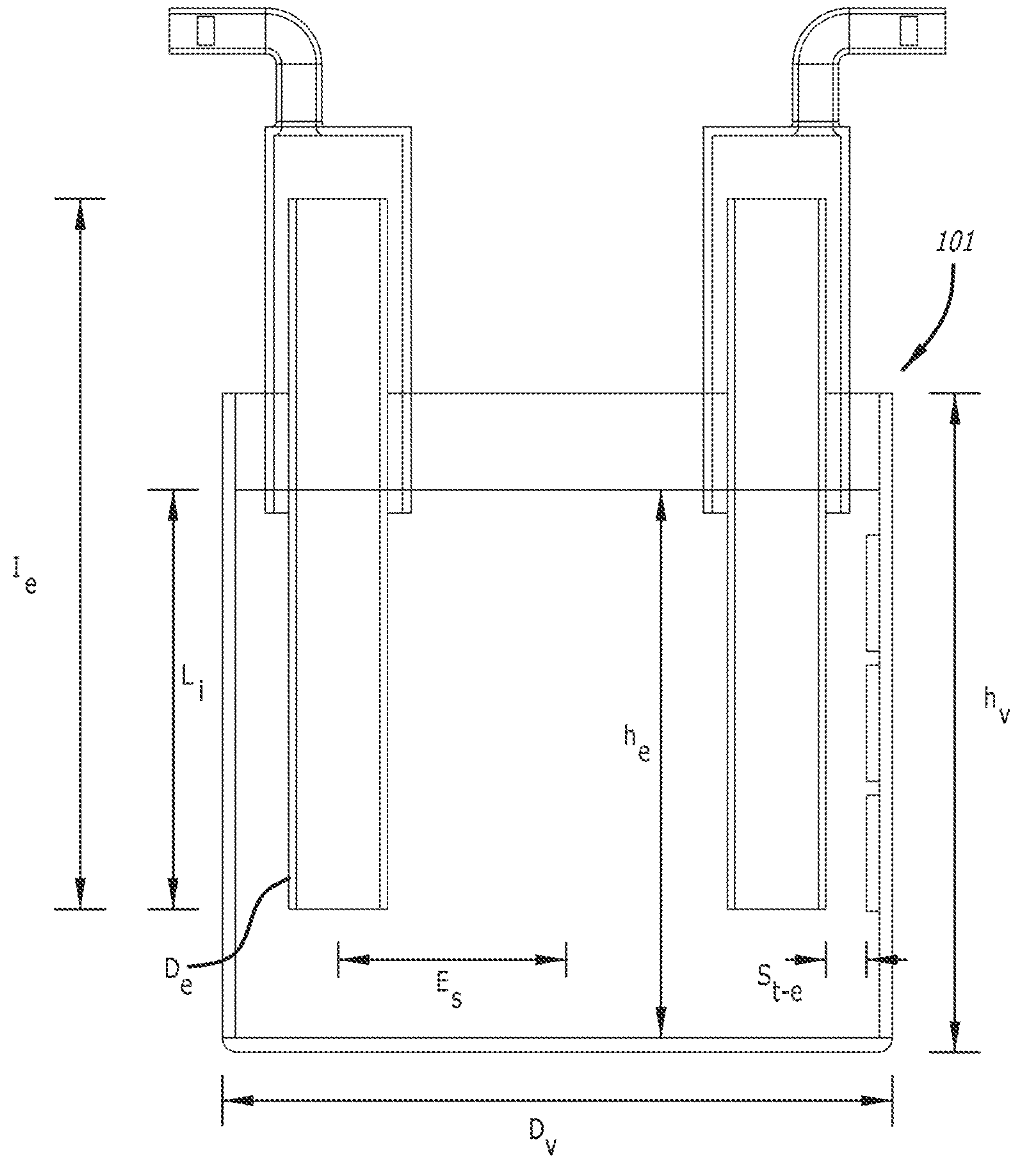
FIG. 10 is a diagrammatic view of a reaction vessel and components of a system of some examples of this disclosure.

FIG. 10 of the accompanying drawings shows a system of one example with some relevant dimensions labeled. The relationships between these dimensions of this example system are summarised in the table show in FIG. 11. The dimensions and relationships between the parameters of the components are specific to this described example. This disclosure is not limited to the specific dimension and relationships disclosed herein and other dimensions and relationships are contemplated. For example, those skilled in the art will appreciate that the dimensions and relationships may be modified to scale up the system, for instance for industrial generation of hydrogen gas.

In the example shown in FIG. 10, the reaction vessel 101 is a flat-bottom cylindrical container with diameter ($D_v$) to height ($h_v$) ratio of 1:1. Differently shaped reaction vessels are contemplated in other examples of this disclosure. In some examples, the reaction vessel is a rectangular (cuboid) shape. In some examples, the reaction vessel is a variable depth vessel having a non-planar base to control mass flow within the reaction vessel.

In this example, the anode and the cathode each have a length ($l_e$) in the range $110\%*h_v \leq l_e \leq 120\%*h_v$ with 70%-80% of the length ($l_e$) immersed in the aqueous solution.

The immersed length of the anode/cathode is denoted as $l_i$. In this example, the diameter ($D_e$) of each electrode is $7\% \leq D_v \leq 20\%$.

In this example, the diameter of each transducer, $D_T$, may be 2 cm-5 cm. However, other transducer diameters are contemplated, and the selected transducer diameter will depend on the intended use and functionality of the system for generating hydrogen gas. The relative dimensions described herein may be scaled up for larger systems for generating hydrogen gas.

In some examples, the ultrasonic transducers function using thickness mode vibration to generate ultrasonic waves where the thickness of the ultrasonic transducer is a determining factor for its resonant frequency. However, other types of ultrasonic transducers are contemplated.

In this example, the spacing between ultrasonic transducers is $S_T$ and is set as $½*D_T$.

In this example, the aqueous solution volume can be determined from the maximum fill height ($h_e$) of 75% to 85% of vessel height. Other aqueous solution volumes are, however, contemplated and a skilled person will understand how to calculate the aqueous solution fill volume based on the parameters of the reaction vessel that is configured for an intended purpose.

In this example, the placement of the anode or cathode $E_s$ is (25%-30% of $D_v+½*D_e$) from the center of the anode/cathode to centre of the cylindrical reaction vessel.

In some examples, disc shaped transducers and ultrasonic horns (sonotrodes) of different shapes are selected to transmit ultrasound throughout the electrolytic solution 102 within the reaction vessel 101.

Figure 12:
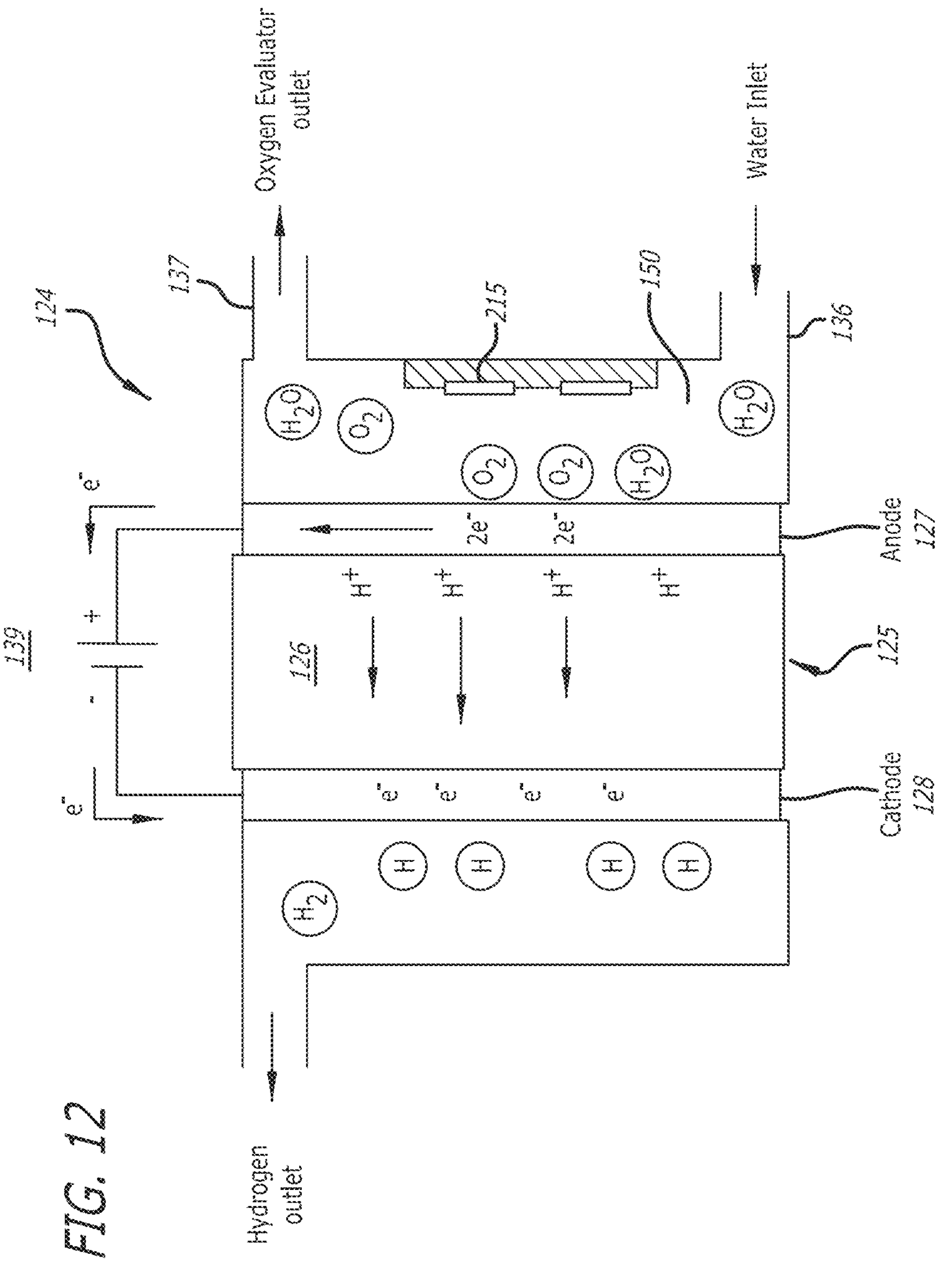
FIG. 12 is a diagrammatic view of a membrane-electrode assembly of a system of some examples of this disclosure.
Figure 13:
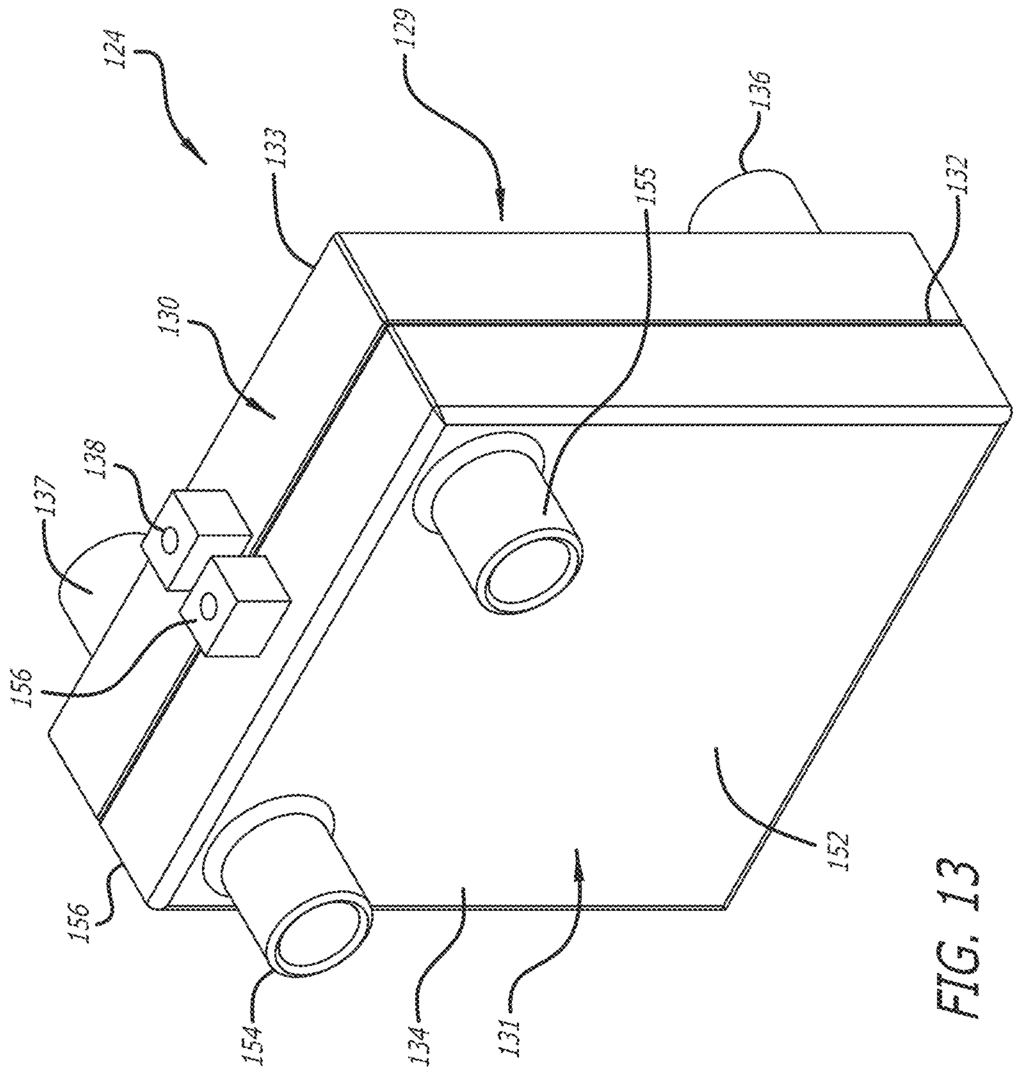
FIG. 13 is a diagrammatic perspective view of a system of some examples of this disclosure.

Referring now to FIG. 12 of the accompanying drawings, a system 124 of some examples comprises a membrane-electrode assembly (MEA) 125 for water electrolysis. The MEA 125 comprises a Polymer Electrolytic Membrane (PEM) 126 which is positioned or sandwiched between an anode 127 and a cathode 128.

The PEM 126 is a Proton Exchange membrane preferably made of perfluoro-sulfonic acid-based materials or similar proton-conducting polymers. An example of a PEM is commercially available from Nafion™ of The Chemours Company FC, LLC. of Wilmington, Delaware, USA. The PEM 126 conducts protons (H+ ions) and inhibits electron passage. To utilize this characteristic of the polymer, the PEM 126 is placed such that it separates the cathode 128 and the anode 127 and facilitates the splitting of water into Hydrogen and Oxygen.

PEM electrolysis does not require caustic electrolytes, occupies minimal space, and is safer than conventional alkaline electrolysis.

In PEMWE, the oxygen produced is removed from the surface of the anode 127, while the remaining protons (H+) traverse the proton-conductive membrane towards the cathode 128. Simultaneously, electrons travel through the external circuit to reach the cathode 128. At the cathode 128, protons and electrons reunite, resulting in the generation of hydrogen gas.

In these examples, the anode 127 and the cathode 128 are each planar or generally planar electrodes. In these examples, the anode 127 and the cathode 128 are each provided with respective gas diffusion layers (GDL). In these examples, the anode 127 and the cathode 128 are each gas diffusion electrodes (GDE) that are preferably made of porous, conductive materials. The anode 127 and the cathode 128 are each preferably coated with at least one catalyst to facilitate electrochemical reactions.

In the MEA 125, the anode 127 and the cathode 128 are preferably noble metal electrodes and the oxides of the noble metal(s) are the electrocatalysts (for example, but not limited to, platinum, iridium, iridium dioxide (IrO2), rhodium, rhodium oxide (RhO2)).

In some examples, the anode 127 and the cathode 128 are each porous and contain interconnected pores or channels throughout its structure. This porosity serves as an enhanced surface area for the catalyst to interact with water molecules, increasing the efficiency of the electrochemical reactions, and proton (H+) diffusion to the cathode side.

Referring now to FIGS. 13-16 of the accompanying drawings, in some examples the MEA 125 is positioned within a housing 129 that is preferably a sealed vessel that is configured to enable reactants and products to flow. Seals and gaskets, ensure a tight and secure enclosure resisting the gas and or liquid pressure within the housing 129, and preventing leaks.

In some examples, the housing 129 comprises a first housing portion 130 and a second housing portion 131 that are coupled to one another along a seal interface 132.

In some examples, the first housing portion 130 comprises side walls 133 that are coupled to an end wall 134. A first internal chamber 135 is formed between at least part of the side walls 133 and the end wall 134. The anode 127 of the MEA 125 is positioned on an opposite side of the first housing portion 130 to the end wall 134. A gas tight or substantially gas tight seal is preferably provided between the anode 127 and the side walls 133.

An inlet port 136 is provided on the first housing portion 130. In this example the inlet port 136 is positioned on the end wall 134. The inlet port 136 provides a water flow path to enable water to flow from a water source into the first internal chamber 135.

An outlet port 137 is provided on the first housing portion 130. In this example the outlet port 137 is positioned on the end wall 134 and is spaced apart from the inlet port 136 on an opposite corner of the end wall 134 to the inlet port 136. The outlet port 137 provides an oxygen gas and water flow path to enable oxygen gas and water to flow out from the first internal chamber 135 for storage or use.

In some examples, the first housing portion 130 comprises an anode connector 138 to enable the anode 127 to be connected to a power source, such as a DC power source 139 as shown in FIG. 12.

Figure 15:
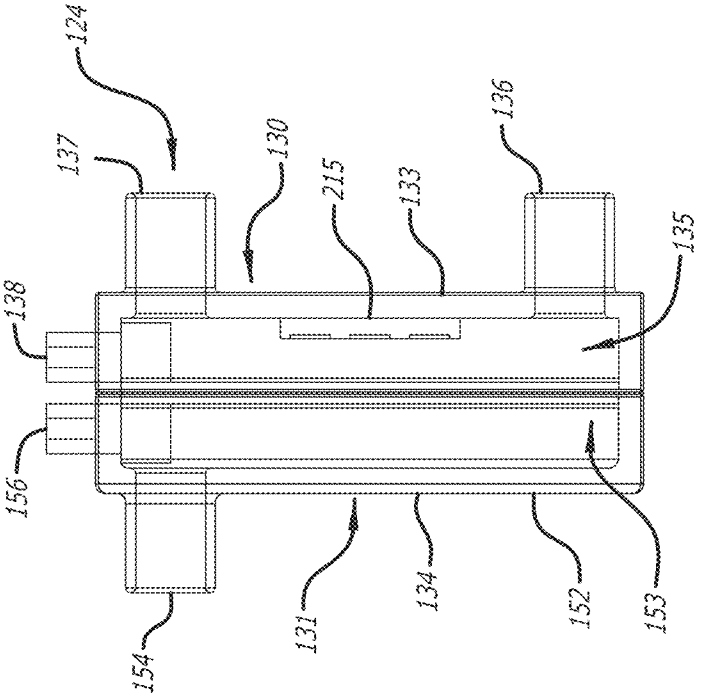
FIG. 15 is a cross-sectional side view of the system of FIG. 13.
Figure 14:
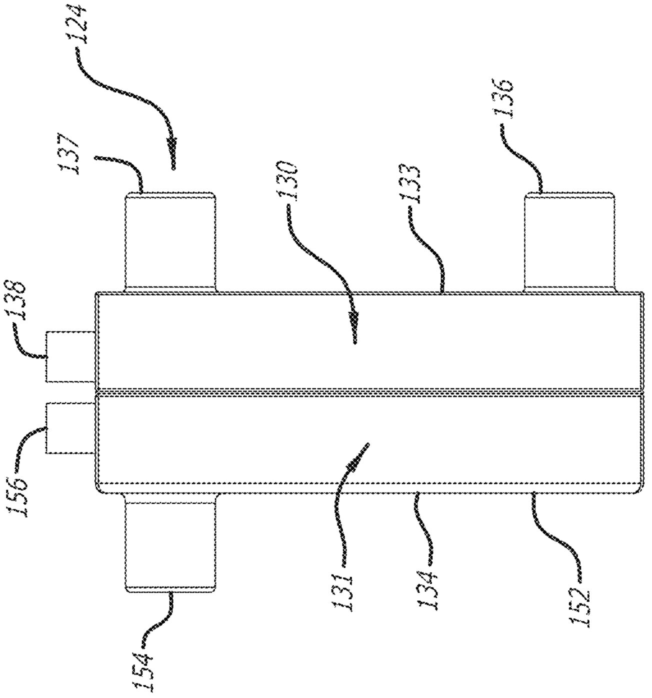
FIG. 14 is a diagrammatic side view of the system of FIG. 13.
Figure 16:
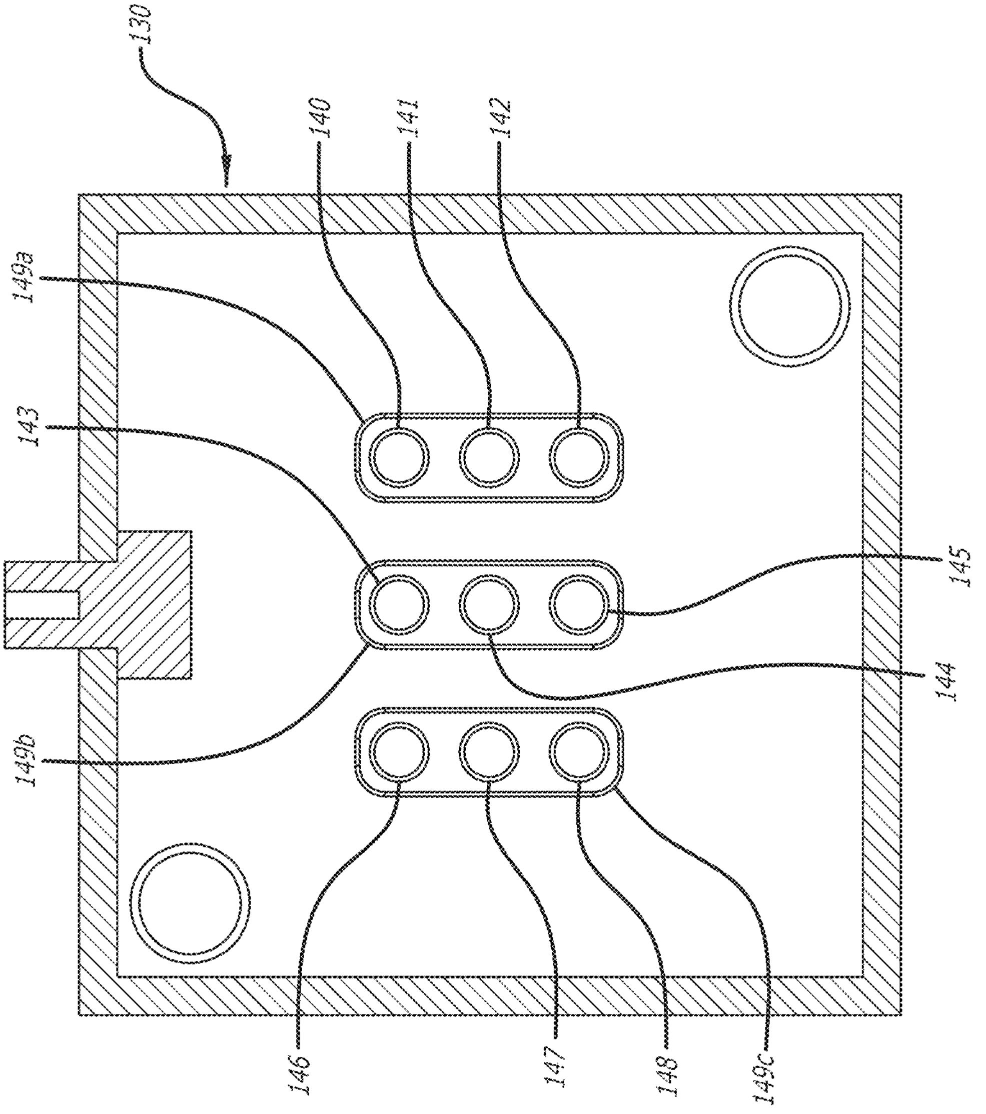
FIG. 16 is a cross-sectional view of part of the system of FIG. 13.

Referring now to FIGS. 15 and 16 of the accompanying drawings, in some examples the system 124 comprises at least one ultrasonic transducer 140-146 that is positioned within the first internal chamber 135. In this example, the system 124 comprises nine ultrasonic transducers 140-146 that are held respectively in three separate transducer holders 147-149 that are coupled to the first housing portion 130.

Each ultrasonic transducer 140-146 is driven by a respective transducer driver 202 as described herein in relation to the ultrasonic transducer 215.

In this example, the ultrasonic transducers 140-146 emit ultrasonic waves at least partly towards the anode 127 to cause cavitation in water 150 within the first internal chamber 135 proximate to the surface of the anode 127. The cavitation weakens hydrogen bonds between water molecules to separate individual water molecules available for interaction with the anode 127 to undergo the oxidation reaction at the anode 127 to oxidize OH− ions and form oxygen gas and H+ ions at the anode 107. The H+ ions pass through the PEM 126 to the cathode 128.

Referring again to FIGS. 13-15 of the accompanying drawings, in some examples, the second housing portion 131 comprises side walls 151 that are coupled to an end wall 152. A second internal chamber 153 is formed between at least part of the side walls 151 and the end wall 152. The cathode 128 of the MEA 125 is positioned on an opposite side of the second housing portion 131 to the end wall 152. A gas tight or substantially gas tight seal is preferably provided between the cathode 128 and the side walls 151.

At least one hydrogen outlet port 154, 155 is provided on the second housing portion 131. In this example, two hydrogen outlet ports 154, 155 are provided on the second housing portion 131. In this example the hydrogen outlet ports 154, 155 are positioned on the end wall 152. Each hydrogen outlet port 154, 155 provides a flow path to enable hydrogen gas to flow from the second internal chamber 153 for storage or use.

In some examples, the second housing portion 131 comprises a cathode connector 156 to enable the cathode 128 to be connected to a power source, such as a DC power source 139 as shown in FIG. 12.

In some examples, the cathode 128 is a cathode ultrasonic transducer that is driven by a transducer driver 202 or an oscillator to vibrate. In these examples, the vibrations in the cathode 128 help clear any hydrogen gas formed on a surface of the cathode 128 to expose the surface of the cathode 128 to additional H+ ions for generation of hydrogen gas.

Figure 17:
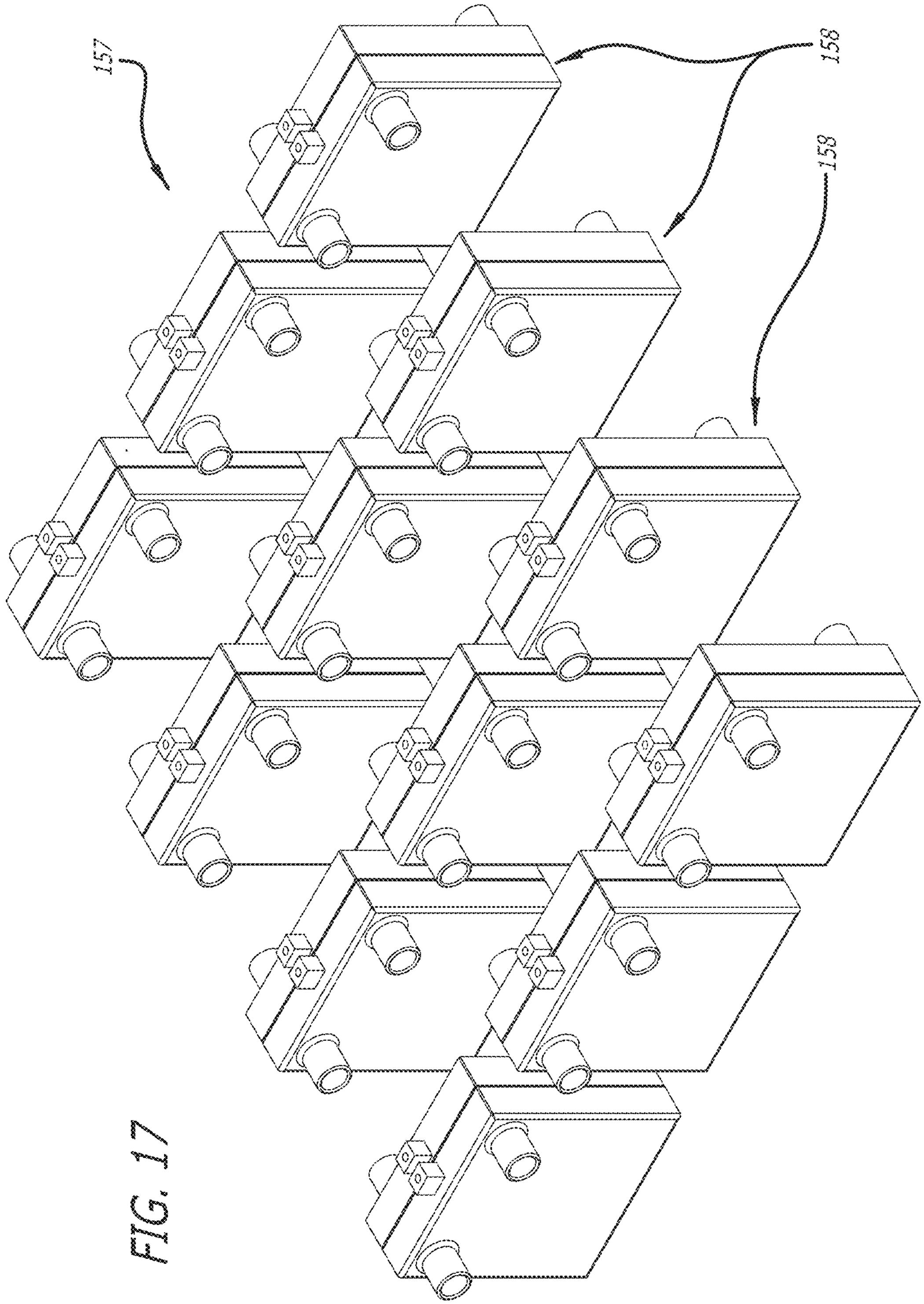
FIG. 17 is a diagrammatic perspective view of an array system of some examples of this disclosure.

Referring now to FIG. 17 of the accompanying drawings, a system 157 of some examples of this disclosure comprises a plurality of hydrogen generation cells 158. Each hydrogen generation cell 158 is a PEM system identical or similar to the system 128 described above. The hydrogen generation cells 158 are preferably coupled to one another in an array to produce hydrogen gas from water that is pumped through the hydrogen generation cells 158.

The operation of the hydrogen generation cells 158 is controlled by the main controller 2 which coordinates the operation of each hydrogen generation cell 158 so the array generates hydrogen gas at a desired rate. In some examples, the main controller 2 activates all or a subset of the hydrogen generation cells 158 to generate hydrogen gas based on a desired hydrogen gas production rate. If the main controller 2 detects that the hydrogen gas production rate of the array is higher than a threshold, then the main controller 2 deactivates one or more of the hydrogen generation cells 158. Conversely, if the main controller 2 detects that the hydrogen gas production rate of the array is lower than the threshold, then the main controller 2 activates one or more of the hydrogen generation cells 158. In this way, the main controller 2 can control the rate of production of hydrogen gas to a safe level for an intended storage volume or use.

The main controller 2 coordinates the activation and deactivation of each hydrogen generation cell 158 while at the same time optimizing the operation of each activated hydrogen generation cell 158. The main controller 2 therefore maximizes the flexibility and efficiency of the system 157 to generate hydrogen gas efficiently at a desired rate.

Figure 18:
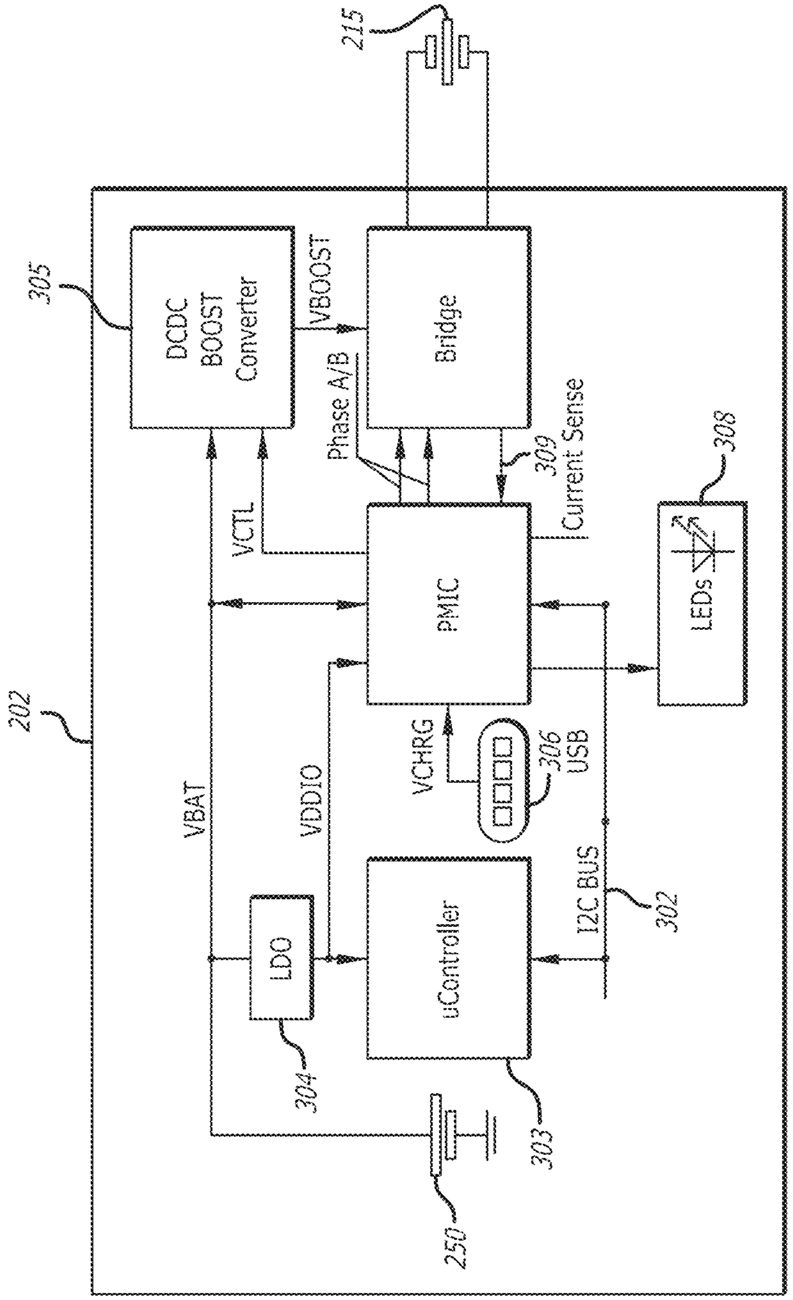
FIG. 18 is a schematic diagram of an integrated circuit arrangement of this disclosure.

Referring now to FIG. 18 of the accompanying drawings, the transducer driver 202 comprises a microchip which is referred to herein as a power management integrated circuit or PMIC 300. The PMIC 300 is a microchip for driving the ultrasonic transducer 215.

The transducer driver 202 offer precise control to ensure that each ultrasonic transducer is operating at optimal frequency (resonance) to maximize displacement (amplitude/intensity) of the ultrasound wave at the lowest possible power inputs. This is achieved by using the feedback loop function of transducer driver 202, whereby the transducer driver 202 senses the current flowing through the ultrasonic transducer 215 and adjusts the drive frequency of the ultrasonic transducer 215 to maximise the active power consumed by the ultrasonic transducer 215. The feedback loop therefore ensures that the transducer driver 202 drives the ultrasonic transducer 215 at or near its resonant (optimum) frequency. The feedback loop of the transducer driver 202 is described in detail below.

In some examples, multiple ultrasonic transducers are controlled to operate at precise parameters based on their positioning around each other. This ensures that each transducer's ultrasound wave transmission effect on the electrode is maximized and not reduced by the wave from adjacent transducer.

In some examples, the transducers are controlled using a single transducer driver 202 with multi-channel transducer control output to drive singular or a plurality of transducers simultaneously.

In this disclosure, the terms chip, microchip and integrated circuit are interchangeable. The microchip or integrated circuit is a single unit which comprises a plurality of interconnected embedded components and subsystems. The microchip is, for example, at least partly of a semiconductor, such as silicon, and is fabricated using semiconductor manufacturing techniques.

The transducer driver 202 comprises a second microchip which is referred to herein as a bridge integrated circuit or bridge IC 301 which is electrically connected to the PMIC 300. The bridge IC 301 is a microchip for driving a piezoelectric transducer, such as the ultrasonic transducer 215. The bridge IC 301 is a single unit which comprises a plurality of interconnected embedded components and subsystems.

In this example, the PMIC 300 and the bridge IC 301 are mounted to the same PCB of the transducer driver 202.

The ultrasonic transducer 215 is electrically connected to the bridge IC 301 so that the ultrasonic transducer 215 may be driven by an AC drive signal generated by the bridge IC 301 when system 100 is operating.

The transducer driver 202 comprises a processor in the form of a microcontroller 303 which is electrically coupled for communication with the communication bus 302. The microcontroller 303 receives power from a low dropout regulator (LDO) 304 which is driven by a power supply (not shown). The LDO 304 provides a stable regulated voltage to the microcontroller 303 to enable the microcontroller 303 to operate consistently even when there is a variation in the voltage of the power supply.

The transducer driver 202 comprises a voltage regulator in the form a DC-DC boost converter 305 which is powered by the power supply. The boost converter 305 increases the voltage of the power supply to a programmable voltage VBOOST. The programmable voltage VBOOST is set by the boost converter 305 in response to a voltage control signal VCTL from the PMIC 300. As will be described in more detail below, the boost converter 305 outputs the voltage VBOOST to the bridge IC 301. In other examples, the voltage regulator is a buck converter or another type of voltage regulator which outputs a selectable voltage.

The voltage control signal VCTL is generated by a digital to analogue converter (DAC) which, in this example, is implemented within the PMIC 300. The DAC is not visible in FIG. 18 since the DAC is integrated within the PMIC 300. The DAC and the technical benefits of integrating the DAC within the PMIC 300 are described in detail below. In this example, the PMIC 300 is connected to a power source connector 306 so that the PMIC 300 can receive power from the power supply.

The microcontroller 303 functions as a master device on the communication bus 302, with the PMIC 300 being a first slave device. The communication bus 302 enables the microcontroller 303 to control the following functions within the transducer driver 202:

1. All functions of the PMIC are highly configurable by the microcontroller 303.
2. The current flowing through the ultrasonic transducer 215 is sensed by a high bandwidth sense and rectifier circuit at a high common mode voltage (high side of the bridge). The sensed current is converted into a voltage proportional to the rms current and provided as a buffered voltage at a current sense output pin 309 of the bridge IC 301. This voltage is fed to and sampled in the PMIC 300 and made available as a digital representation via 12C requests. Sensing the current flowing through the ultrasonic transducer 215 forms part of the resonant frequency tracking functionality. As described herein, the ability of the device to enable this functionality within the bridge IC 301 provides significant technical benefits.
3. The DAC (not shown in FIG. 18) integrated within the PMIC 300 enables the DC-DC boost converter voltage VBOOST to be programmed to be between 10V and 20V.

Figure 19:
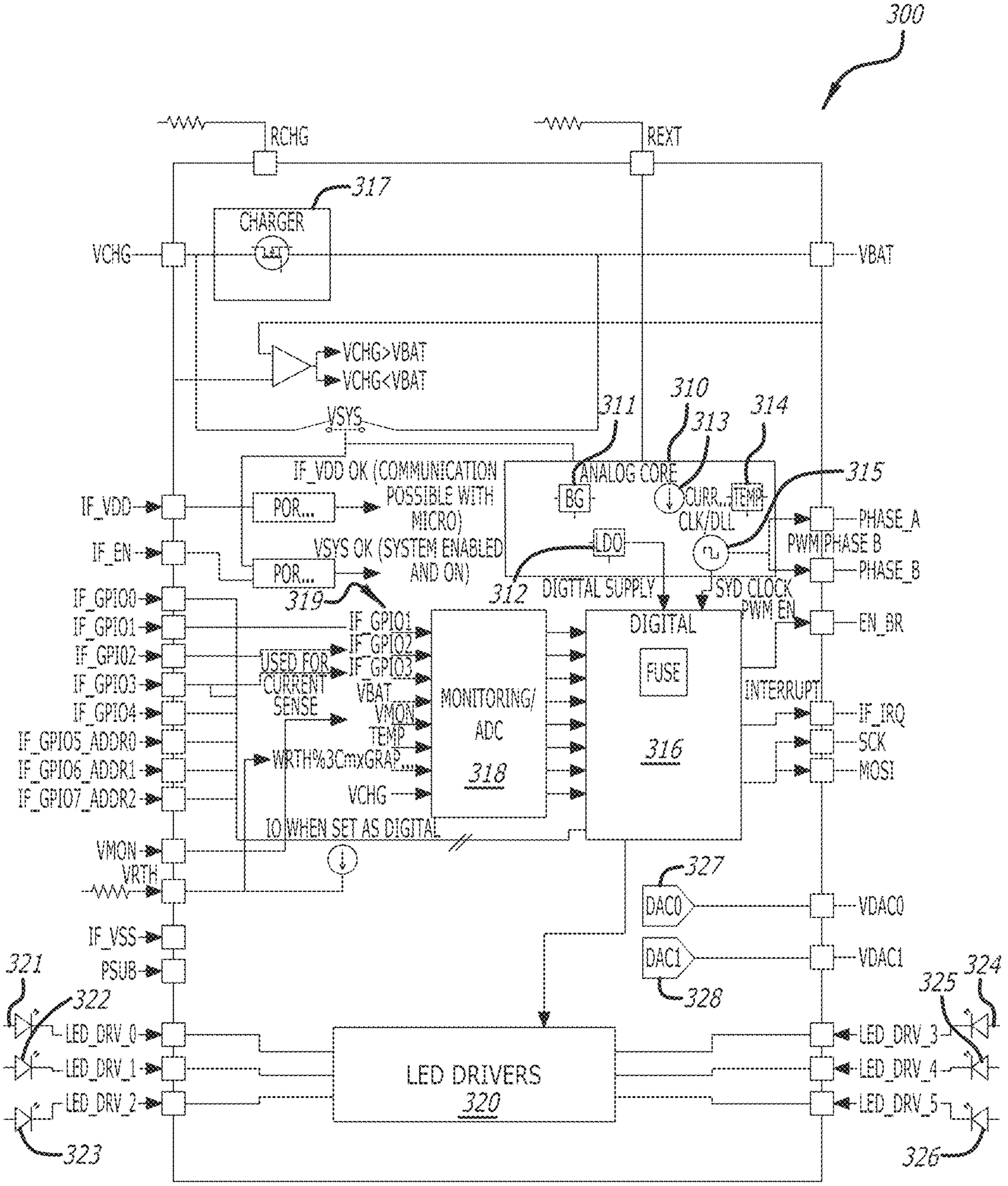
FIG. 19 is a schematic diagram of an integrated circuit of this disclosure.

Referring now to FIG. 19 of the accompanying drawings, the PMIC 300 is, in this example, a self-contained chip or integrated circuit which comprises integrated subsystems and a plurality of pins which provide electrical inputs and outputs to the PMIC 300. The references to an integrated circuit or chip in this disclosure are interchangeable and either term encompasses a semiconductor device which may, for instance, be of silicon.

The PMIC 300 comprises an analogue core 310 which comprises analogue components including a reference block (BG) 311, a LDO 312, a current sensor 313, a temperature sensor 314 and an oscillator 315.

As described in more detail below, the oscillator 315 is coupled to a delay locked loop (DLL) which outputs pulse width modulation (PWM) phases A and B. The oscillator 315 and the DLL generate a two-phase centre aligned PWM output which drives an H bridge in the bridge IC 301.

The DLL comprises a plurality of delay lines connected end to end, wherein the total delay of the delay lines is equal to the period of the main clock signal clk_m. In this example, the DLL is implemented in a digital processor subsystem, referred to herein as a digital core 316, of the PMIC 300 which receives a clock signal from the oscillator 315 and a regulated power supply voltage from the LDO 312. The DLL is implemented in a large number (e.g. in the order of millions) of delay gates which are connected end to end in the digital core 316.

The implementation of the oscillator 315 and the DLL in the same integrated circuit of the PMIC 300 in order to generate a two-phase centre aligned PWM signal is unique since at present no signal generator component in the integrated circuit market comprises this implementation.

As described herein, PWM is part of the functionality which enables the transducer driver 202 to track the resonant frequency of the ultrasonic transducer 215 accurately in order to maintain an efficient transfer from electrical energy to kinetic energy in order to optimise the generation of hydrogen gas.

The PMIC 300 comprises an integrated power switch VSYS which configures the PMIC 300 to power the analogue core 310 by power from a power source.

The PMIC 300 comprises an embedded analogue to digital converter (ADC) subsystem 318. The implementation of the ADC 318 together with the oscillator 315 in the same integrated circuit is, in itself, unique since there is no other integrated circuit in the integrated circuit market which comprises an oscillator and an ADC implemented as sub-blocks within the integrated circuit. In a conventional device, an ADC is typically provided as a separate discrete component from an oscillator with the separate ADC and oscillator being mounted to the same PCB. The problem with this conventional arrangement is that the two separate components of the ADC and the oscillator take up space unnecessarily on the PCB. A further problem is that the conventional ADC and oscillator are usually connected to one another by a serial data communication bus, such as an I2C bus, which has a limited communication speed of up to only 400 kHz. In contrast to conventional devices, the PMIC 300 comprises the ADC 318 and the oscillator 315 integrated within the same integrated circuit which eliminates any lag in communication between the ADC 318 and the oscillator 315, meaning that the ADC 318 and the oscillator 315 can communicate with one another at high speed, such as at the speed of the oscillator 315 (e.g. 20 kHz to 40 kHz).

In the PMIC 300 of this example, the oscillator 315 is running at 26 kHz and generates a clock signal SYS CLOCK at 26 kHz. However, in other examples, the oscillator 315 generates a clock signal at a frequency of of 20 kHz to 40 kHz, preferably 26 kHz. The integrated circuits described herein are all configured to operate at the high frequency of the oscillator 315.

The ADC 318 comprises a plurality of feedback input terminals or analogue inputs 319 which comprise a plurality of GPIO inputs (IF_GPIO1-3).

At least one of the feedback input terminals or the analogue inputs 319 receives the gas pressure signal from the pressure sensor 117.

At least one of the other feedback input terminals or the analogue inputs 319 receives a feedback signal from an H-bridge circuit in the bridge IC 301, the feedback signal being indicative of a parameter of the operation of the H-bridge circuit or an AC drive signal when the H-bridge circuit is driving the ultrasonic transducer 215 with the AC drive signal. As described below, the GPIO inputs are used to receive a current sense signal from the bridge IC 301 which is indicative of the route mean square (rms) current reported by the bridge IC 301. In this example, one of the GPIO inputs is a feedback input terminal which receives a feedback signal from the H-bridge in the bridge IC 301.

The ADC subsystem 318 samples analogue signals received at the plurality of ADC input terminals 319 at a sampling frequency which is proportional to the frequency of the main clock signal. The ADC subsystem 318 then generates ADC digital signals using the sampled analogue signals.

In this example, the ADC 318 which is incorporated in the PMIC 300 samples not only the RMS current flowing through the H-bridge 334 and the ultrasonic transducer 215 but also voltages available in the system (e.g. VBOOST), the temperature of the PMIC 300 and the GPIO inputs (IF_GPIO1-3).

The digital core 316 receives the ADC generated digital signals from the ADC subsystem and processes the ADC digital signals to generate the driver control signal. The digital core 316 communicates the driver control signal to the PWM signal generator subsystem (DLL 332) to control the PWM signal generator subsystem.

Rectification circuits existing in the market today have a very limited bandwidth. Since the oscillator 315 of the PMIC 300 is capable of running at a wide range of 20 kHz to 5 MHz a high bandwidth rectifier circuit is implemented in the PMIC 300. As will be described below, sensing the RMS current within an H bridge of the bridge IC 301 forms part of a feedback loop which enables the transducer driver 202 to drive the ultrasonic transducer 215 with high precision. The feedback loop is a game changer in the industry of driving ultrasound transducers since it accommodates for any process variation in the piezoelectric transducer production (variations of resonance frequencies) and it compensates for temperature effects of the resonance frequency. This is achieved, in part, by the inventive realisation of integrating the ADC 318, the oscillator 315 and the DLL within the same integrated circuit of the PMIC 300. The integration enables these sub-systems to communicate with one another at high speed (e.g. at the clock frequency of 20 kHz to 5 MHz).

The ADC 318 comprises voltage monitoring inputs VMON and VRTH as well as a temperature monitoring input TEMP. The temperature monitoring input TEMP receives a temperature signal from the temperature sensor 314 which is embedded within the PMIC 300. This enables the PMIC 300 to sense the actual temperature within the PMIC 300 accurately so that the PMIC 300 can detect any malfunction within the PMIC 300 as well as malfunction to other components on the printed circuit board which affect the temperature of the PMIC 300. The PMIC 300 can then control the bridge IC 301 to prevent excitation of the ultrasonic transducer 215 if there is a malfunction in order to maintain the safety of the system.

The PMIC 300 comprises an LED driver 320 which, in this example, receives a digital drive signal from the digital core 316 and provides LED drive output signals to six LEDs 321-326 which are configured to be coupled to output pins of the PMIC 300. The LED driver 320 can thus drive and dim the LEDs 321-326 in up to six independent channels.

The PMIC 300 comprises a first digital to analogue converter (DAC) 327 which converts digital signals within the PMIC 300 into an analogue voltage control signal which is output from the PMIC 300 via an output pin VDAC0. The first DAC 327 converts a digital control signal generated by the digital core 316 into an analogue voltage control signal which is output via the output pin VDAC0 to control a voltage regulator circuit, such as the boost converter 305. The voltage control signal thus controls the voltage regulator circuit to generate a predetermined voltage for modulation by the H-bridge circuit to drive the ultrasonic transducer 215 in response to feedback signals which are indicative of the operation of the ultrasonic transducer 215.

In this example, the PMIC 300 comprises a second DAC 328 which converts digital signals within the PMIC 300 into an analogue signal which is output from the PMIC 300 via a second analogue output pin VDAC1.

Embedding the DAC 327 or the DACs 327, 328 within the same microchip as the other subsystems of the PMIC 300 allows the DACs 327, 328 to communicate with the digital core 316 and other components within the PMIC 300 at high speed with no or minimal communication lag. The DACs 327, 328 provide analogue outputs which control external feedback loops. For instance, the first DAC 327 provides the control signal VCTL to the boost converter 305 to control the operation of the boost converter 305. In other examples, the DACs 327, 328 are configured to provide a drive signal to a DC-DC buck converter instead of or in addition to the boost converter 305. Integrating the two independent DAC channels in the PMIC 300 enables the PMIC 300 to manipulate the feedback loop of any regulator used in the transducer driver 202 and allows the transducer driver 202 to regulate the sonication power of the ultrasonic transducer 215 or to set analogue thresholds for absolute maximum current and temperature settings of the ultrasonic transducer 215.

The PMIC 300 comprises a serial communication interface which, in this example, is an I2C interface which incorporates external I2C address set through pins.

The PMIC 300 also comprises various functional blocks which include a digital machine (FSM) to implement the functionality of the microchip. These blocks will be described in more detail below.

Figure 20:
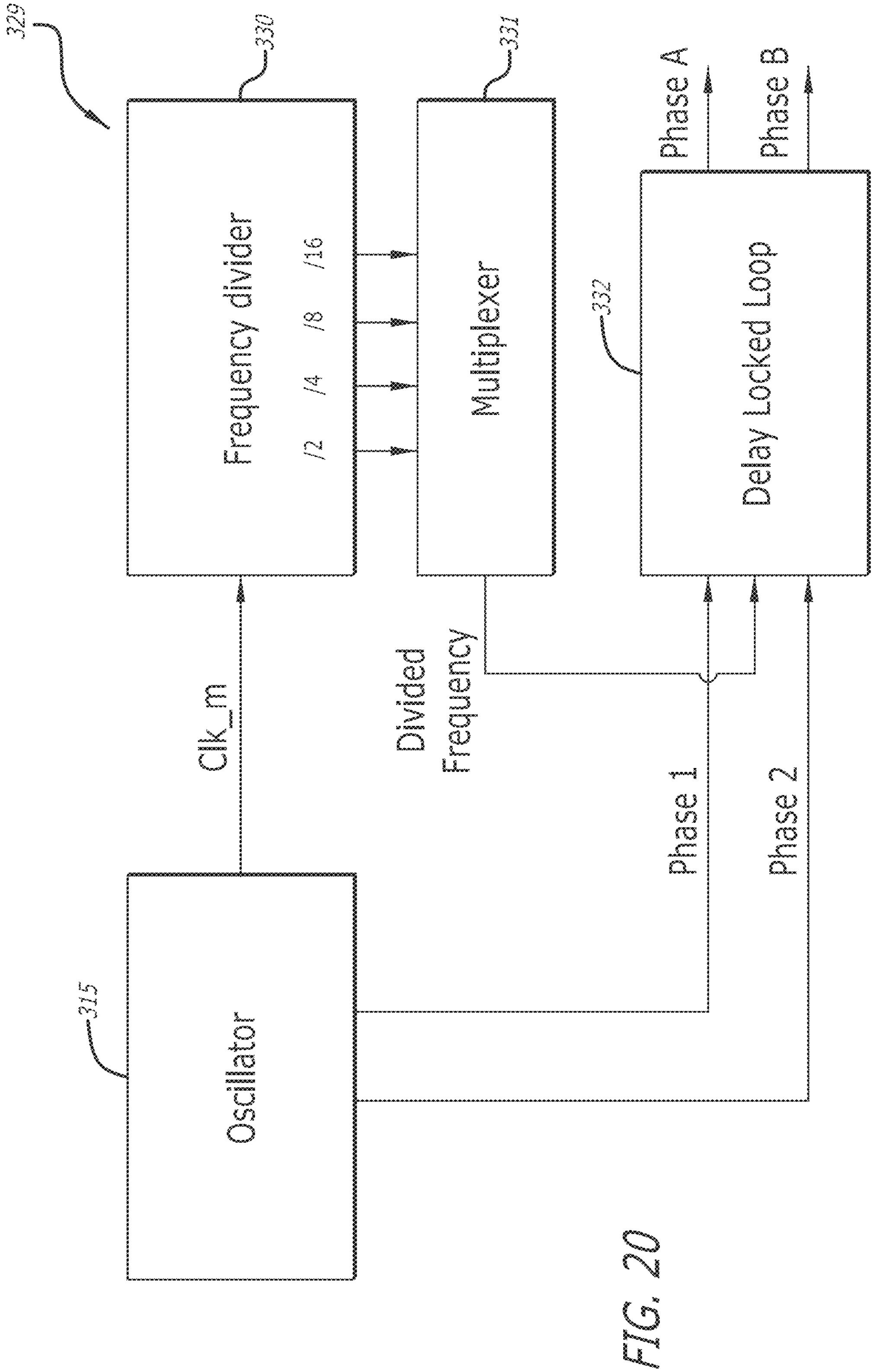
FIG. 20 is a schematic diagram of a pulse width modulation generator of this disclosure.

Referring now to FIG. 20 of the accompanying drawings, a pulse width modulation (PWM) signal generator subsystem 329 is embedded within the PMIC 300. The PWM generator system 329 comprises the oscillator 315, and frequency divider 330, a multiplexer 331 and a delay locked loop (DLL) 332. As will be described below, the PWM generator system 329 is a two phase centre aligned PWM generator.

The frequency divider 330, the multiplexer 331 and the DLL 332 are implemented in digital logic components (e.g. transistors, logic gates, etc.) within the digital core 316.

In examples of this disclosure, the frequency range which is covered by the oscillator 315 and respectively by the PWM generator system 329 is 20 KHz to 5 MHz or of 20 kHz to 40 kHz, preferably 26 kHz. The frequency accuracy of the PWM generator system 329 is ±1% and the spread over temperature is ±1%. In the IC market today, no IC has an embedded oscillator and two phase centre aligned PWM generator that can provide a frequency range of 20 KHz to 5 MHz. In fact, the IC of some examples of this disclosure is capable of providing a frequency range of 20 kHz up to 105 MHz.

The oscillator 315 generates a main clock signal (clk_m) with a frequency of 20 kHz to 5 MHz or of 20 kHz to 40 kHz, preferably 26 kHz. The main clock clk_m is input to the frequency divider 330 which divides the frequency of the main clock clk_m by one or more predetermined divisor amounts. In this example, the frequency divider 330 divides the frequency of the main clock clk_m by 2, 4, 8 and 16 and provides the divided frequency clocks as outputs to the multiplexer 331. The multiplexer 331 multiplexes the divided frequency clocks and provides a divided frequency output to the DLL 332. This signal which is passed to the DLL 332 is a frequency reference signal which controls the DLL 332 to output signals at a desired frequency. In other examples, the frequency divider 330 and the multiplexer 331 are omitted.

Figure 21:
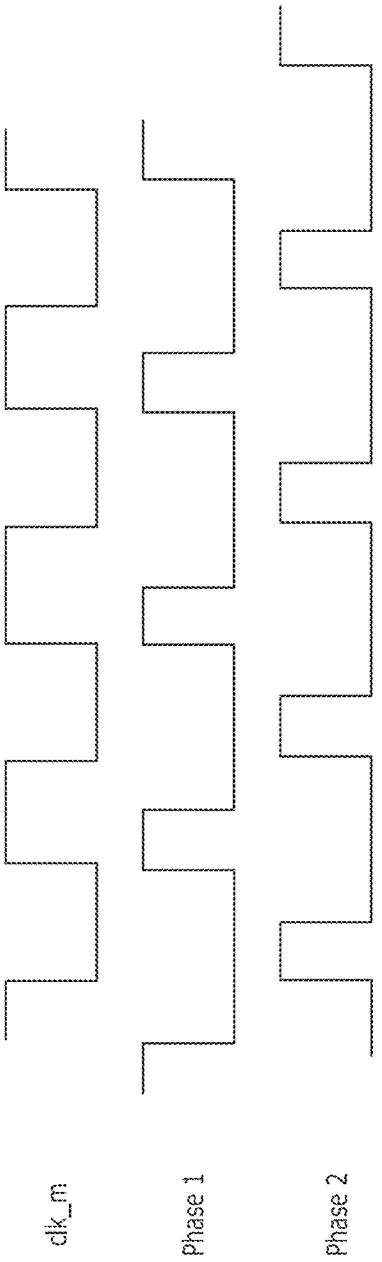
FIG. 21 is timing diagram of an example of this disclosure.

The oscillator 315 also generates two phases; a first phase clock signal Phase 1 and a second phase clock signal Phase 2. The phases of the first phase clock signal and the second phase clock signal are centre aligned. As illustrated in FIG. 21:

- The first phase clock signal Phase 1 is high for a variable time of clk_m's positive half-period and low during clk_m's negative half-period.
- The second phase clock signal Phase 2 is high for a variable time of clk_m's negative half-period and low during clk_m's positive half-period.

Phase 1 and Phase 2 are then sent to the DLL 332 which generates a double frequency clock signal using the first phase clock signal Phase 1 and the second phase clock signal Phase 2. The double frequency clock signal is double the frequency of the main clock signal clk_m. In this example, an "OR" gate within the DLL 332 generates the double frequency clock signal using the first phase clock signal Phase 1 and the second phase clock signal Phase 2. This double frequency clock or the divided frequency coming from the frequency divider 330 is selected based on a target frequency selected and then used as reference for the DLL 332.

Within the DLL 332, a signal referred to hereafter as "clock" represents the main clock clk_m multiplied by 2, while a signal referred to hereafter as "clock_del" is a replica of clock delayed by one period of the frequency. Clock and clock_del are passed through a phase frequency detector. A node Vc is then charged or discharged by a charge-pump based on the phase error polarity. A control voltage is fed directly to control the delay of every single delay unit within the DLL 332 until the total delay of the DLL 332 is exactly one period.

The DLL 332 controls the rising edge of the first phase clock signal Phase 1 and the second phase clock signal Phase 2 to be synchronous with the rising edge of the double frequency clock signal. The DLL 332 adjusts the frequency and the duty cycle of the first phase clock signal Phase 1 and the second phase clock signal Phase 2 in response to a respective frequency reference signal and a duty cycle control signal to produce a first phase output signal Phase A and a second phase output signal Phase B to drive an H-bridge or an inverter to generate an AC drive signal to drive an ultrasonic transducer.

The PMIC 300 comprises a first phase output signal terminal PHASE_A which outputs the first phase output signal Phase A to an H-bridge circuit and a second phase output signal terminal PHASE_B which outputs the second phase output signal Phase B to an H-bridge circuit.

In this example, the DLL 332 adjusts the duty cycle of the first phase clock signal Phase 1 and the second phase clock signal Phase 2 in response to the duty cycle control signal by varying the delay of each delay line in the DLL 332 response to the duty cycle control signal.

Figure 22:
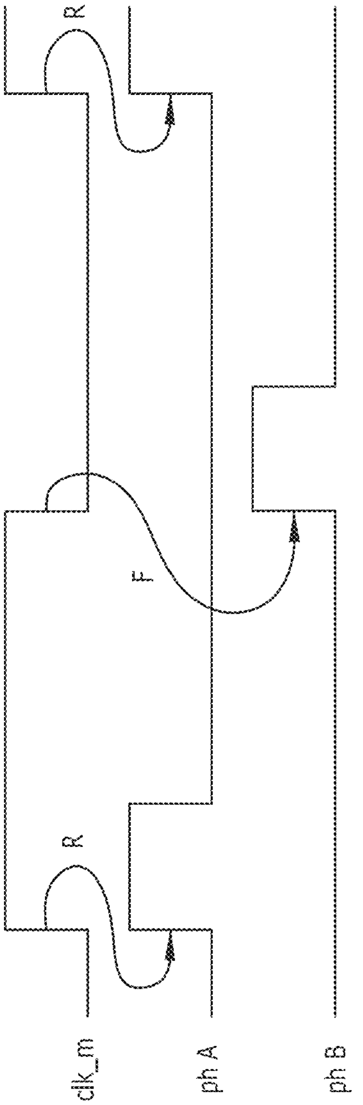
FIG. 22 is timing diagram of an example of this disclosure.

The clock is used at double its frequency because this guarantees better accuracy. As shown in FIG. 22, for the purpose of explanation if the frequency of the main clock clk_m is used (which it is not in examples of this disclosure), Phase A is synchronous with clock's rising edge R, while Phase B is synchronous with clock's falling edge F. The delay line of the DLL 332 controls the rising edge R and so, for the falling edge F, the PWM generator system 329 would need to rely on a perfect matching of the delay units of the DLL 332 which can be imperfect. However, to remove this error, the PWM generator system 329 uses the double frequency clock so that both Phase A and Phase B are synchronous with the rising edge R of the double frequency clock.

To perform a duty-cycle from 20% to 50% with a 2% step size, the delay line of the DLL 332 comprises 25 delay units, with the output of each respective delay unit representing a Phase nth. Eventually the phase of the output of the final delay unit will correspond to the input clock. Considering that all delays will be almost the same, a particular duty cycle is obtained with the output of the specific delay unit with simple logic in the digital core 316.

It is important to take care of the DLL 332 startup as the DLL 332 might not be able to lock a period of delay but two or more periods, taking the DLL 332 to a non-convergence zone. To avoid this issue, a start-up circuit is implemented in the PWM generator system 329 which allows the DLL 332 to start from a known and deterministic condition. The start-up circuit furthermore allows the DLL 332 to start with the minimum delay.

In examples of this disclosure, the frequency range covered by the PWM generator system 329 is extended and so the delay units in the DLL 332 can provide delays of 4 ns (for an oscillator frequency of 5 MHZ) to 400 ns (for an oscillator frequency of 50 kHz). In order to accommodate for these differing delays, capacitors Cb are included in the PWM generator system 329, with the capacitor value being selected to provide the required delay.

The Phase A and Phase B are output from the DLL 332 and passed through a digital IO to the bridge IC 301 so that the Phase A and Phase B can be used to control the operation of the bridge IC 301.

The analogue to digital converter (ADC) 318 will now be described in more detail. The inventors had to overcome significant technical challenges to integrate the ADC 318 within the PMIC 300 with the high speed oscillator 315. Moreover, integrating the ADC 318 within the PMIC 300 goes against the conventional approach in the art which relies on using one of the many discrete ADC devices that are available in the IC market.

In this example, the ADC 318 samples at least one parameter within the ultrasonic transducer driver chip (PMIC 300) at a sampling rate which is equal to the frequency of the main clock signal clk_m. In this example, the ADC 318 is a 10 bit analogue to digital converter which is able to unload digital sampling from the microprocessor 303 to save the resources of the microprocessor 303. Integrating the ADC 318 within the PMIC 300 also avoids the need to use an 12C bus that would otherwise slow down the sampling ability of the ADC (a conventional device relies on an 12C bus to communicate data between a dedicated discrete ADC and a microcontroller at a limited clock speed of typically up to 400 kHz).

In examples of this disclosure, one or more of the following parameters can be sampled sequentially by the ADC 318:

i. An rms current signal which is received at the ultrasonic transducer driver chip (PMIC 300) from an external inverter circuit which is driving an ultrasonic transducer. In this is example, this parameter is a root mean square (rms) current reported by the bridge IC 301. Sensing the rms current is important to implementing the feedback loop used for driving the ultrasound transducer 215. The ADC 318 is able to sense the rms current directly from the bridge IC 301 via a signal with minimal or no lag since the ADC 318 does not rely on this information being transmitted via an 12C bus. This provides a significant speed and accuracy benefit over conventional devices which are constrained by the comparatively low speeds of an 12C bus.

ii. The voltage of a power supply connected to the PMIC 300.

iii. A temperature signal, such as a temperature signal which is indicative of the PMIC 300 chip temperature. As described above, this temperature can be measured very accurately due to the temperature sensor 314 being embedded in the same IC as the oscillator 315. For example, if the PMIC 300 temperature goes up, the current, frequency and PWM are regulated by the PMIC 300 to control the transducer oscillation which in turn controls the temperature.

iv. Two external pins.

v. External NTC temperature sensor to monitor the temperature in the vicinity of the system.

In some examples, the ADC 318 samples one or more of the above-mentioned sources sequentially, for instance in a round robin scheme. The ADC 318 samples the sources at high speed, such as the speed of the oscillator 315 which may be 20 kHz to 5 MHz.

In some examples, the device 202 is configured so that a user or the manufacturer of the device can specify how many samples shall be taken from each source for averaging. For instance, a user can configure the system to take 512 samples from the rms current input, 64 samples from the battery voltage, 64 from the charger input voltage, 32 samples from the external pins and 8 from the NTC pin. Furthermore, the user can also specify if one of the above-mentioned sources shall be skipped.

In some examples, for each source the user can specify two digital thresholds which divide the full range into a plurality of zones, such as 3 zones. Subsequently the user can set the system to release an interrupt when the sampled value changes zones e.g. from a zone 2 to a zone 3.

No conventional IC available in the market today can perform the above features of the PMIC 300. Sampling with such flexibility and granularity is paramount when driving the ultrasound transducer 215.

In this example, the PMIC 300 comprises an 8 bit general purpose digital input output port (GPIO). Each port can be configured as digital input and digital output. Some of the ports have an analogue input function, as shown in the table in FIG. 23.

The GPIO7-GPIO5 ports of the PMIC 300 can be used to set the device's address on the communication (I2C) bus 302. Subsequently eight identical devices can be used on the same I2C bus. This is a unique feature in the IC industry since it allows eight identical devices to be used on the same I2C bus without any conflicting addresses. This is implemented by each device reading the state of GPIO7-GPIO5 during the first 100 us after the startup of the PMIC 300 and storing that portion of the address internally in the PMIC 300. After the PMIC 300 has been started up the GPIOs can be used for any other purpose.

As described above, the PMIC 300 comprises a six channel LED driver 320. In this example the LED driver 320 comprises N-Channel Metal-Oxide Semiconductor (NMOS) current sources which are 5V tolerant. The LED driver 320 is configured to set the LED current in four discrete levels; 5 mA, 10 mA, 15 mA and 20 mA. The LED driver 320 is configured to dim each LED channel with a 12 bit PWM signal either with or without gamma correction. The LED driver 320 is configured to vary the PWM frequency from 300 Hz to 1.5 KHz.

In this example, the PMIC 300 comprises two independent 6 Bit Digital to Analog Converters (DAC) 327, 328 which are incorporated into the PMIC 300. The purpose of the DACs 327, 328 is to output an analogue voltage to manipulate the feedback path of an external regulator (e.g. the DC-DC Boost converter 305 a Buck converter or a LDO). Furthermore, in some examples, the DACs 327, 328 can also be used to dynamically adjust the over current shutdown level of the bridge IC 301, as described below.

The output voltage of each DAC 327, 328 is programmable between 0V and 1.5V or between 0V and V_battery (Vbat). In this example, the control of the DAC output voltage is done via I2C commands. Having two DAC incorporated in the PMIC 300 is unique and will allow the dynamic monitoring control of the current. If either DAC 327, 328 was an external chip, the speed would fall under the same restrictions of speed limitations due to the I2C protocol. An active power monitoring arrangement of the device 202 works with optimum efficiency if all these embedded features are in the PMIC. Had they been external components, the active power monitoring arrangement would be totally inefficient.

Figure 24:
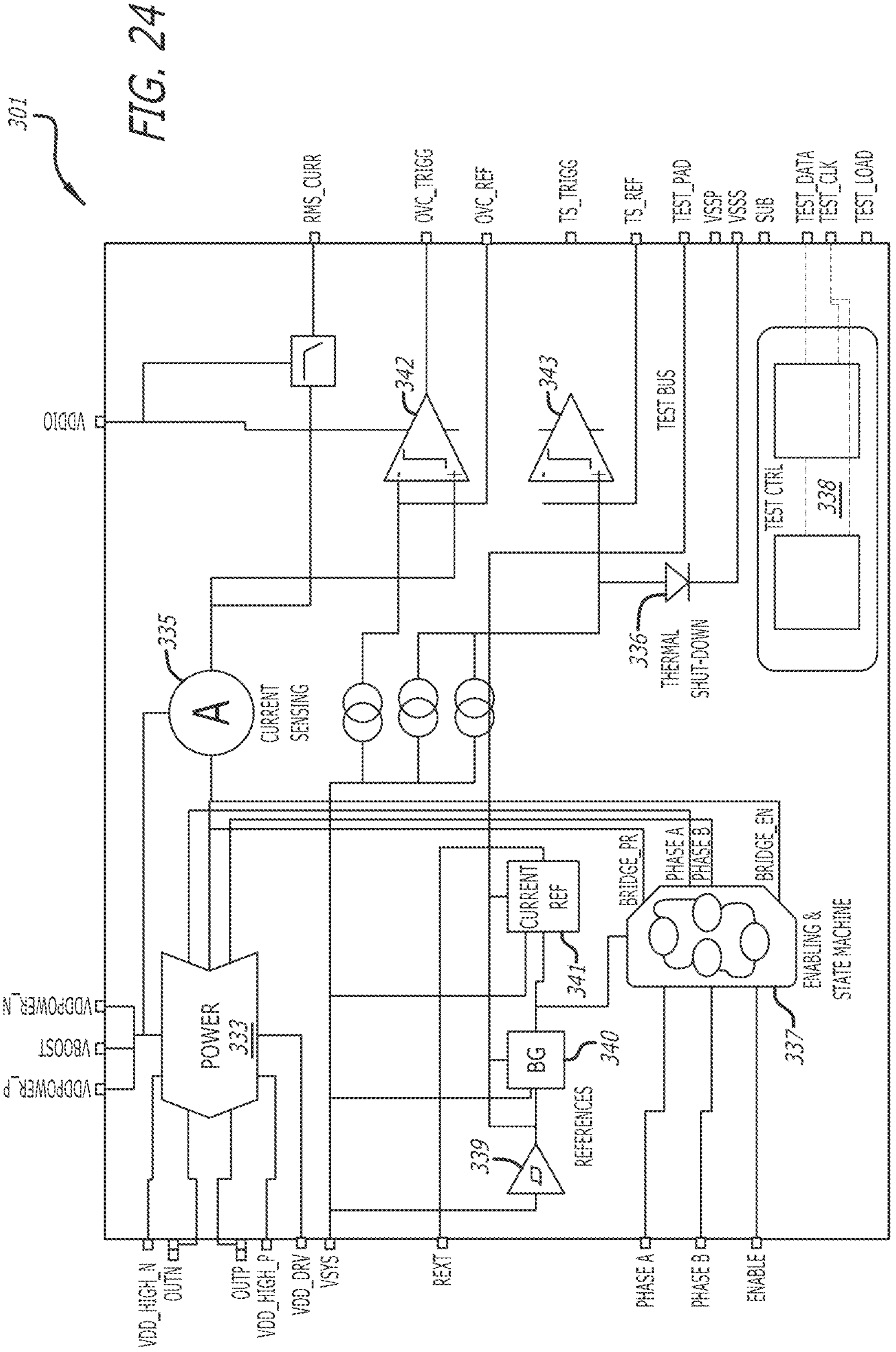
FIG. 24 is a schematic diagram of an integrated circuit of this disclosure.
Figure 25:
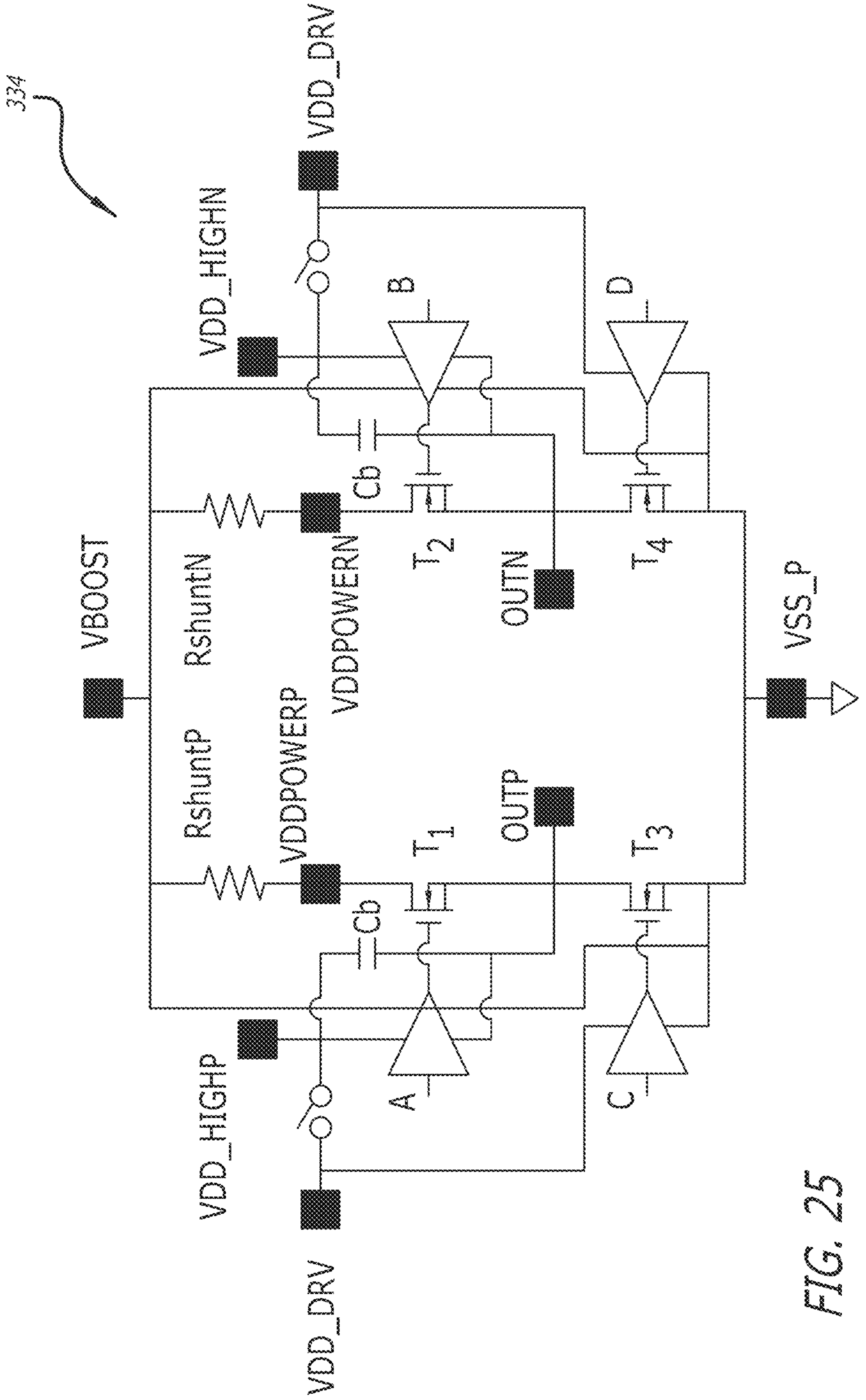
FIG. 25 is a circuit diagram of an H-bridge of an example of this disclosure.

Referring now to FIG. 24 of the accompanying drawings, the bridge IC 301 is a microchip which comprises an embedded power switching circuit 333. In this example, the power switching circuit 333 is an H-bridge 334 which is shown in FIG. 25 and which is described in detail below. It is, however, to be appreciated that the bridge IC 301 of other examples may incorporate an alternative power switching circuit to the H-bridge 334, provided that the power switching circuit performs an equivalent function for generating an AC drive signal to drive the ultrasonic transducer 215.

The bridge IC 301 comprises a first phase terminal PHASE A which receives a first phase output signal Phase A from the PWM signal generator subsystem of the PMIC 300. The bridge IC 301 also comprises a second phase terminal PHASE B which receives a second phase output signal Phase B from the PWM signal generator subsystem of the PMIC 300.

The bridge IC 301 comprises a current sensing circuit 335 which senses current flow in the H-bridge 334 directly and provides an RMS current output signal via the RMS_CURR pin of the bridge IC 301. The current sensing circuit 335 is configured for over current monitoring, to detect when the current flowing in the H-bridge 334 is above a predetermined threshold. The integration of the power switching circuit 333 comprising the H-bridge 334 and the current sensing circuit 335 all within the same embedded circuit of the bridge IC 301 is a unique combination in the IC market. At present, no other integrated circuit in the IC market comprises an H-bridge with embedded circuitry for sensing the RMS current flowing through the H-bridge.

The bridge IC 301 comprises a temperature sensor 336 which includes over temperature monitoring. The temperature sensor 336 is configured to shut down the bridge IC 301 or disable at least part of the bridge IC 336 in the event that the temperature sensor 336 detects that the bridge IC 301 is operating at a temperature above a predetermined threshold. The temperature sensor 336 therefore provides an integrated safety function which prevents damage to the bridge IC 301 or other components within the transducer driver 202 in the event that the bridge IC 301 operates at an excessively high temperature.

The bridge IC 301 comprises a digital state machine 337 which is integrally connected to the power switching circuit 333. The digital state machine 337 receives the phase A and phase B signals from the PMIC 300 and an ENABLE signal, for instance from the microcontroller 303. The digital state machine 337 generates timing signals based on the first phase output signal Phase A and the second phase output signal Phase B.

The digital state machine 337 outputs timing signals corresponding to the phase A and phase B signals as well as a BRIDGE PR and BRIDGE EN signals to the power switching circuit 333 in order to control the power switching circuit 333. The digital state machine 337 thus outputs the timing signals to the switches $T_1$-$T_4$ of the H-bridge circuit 334 to control the switches $T_1$-$T_4$ to turn on and off in a sequence such that the H-bridge circuit outputs an AC drive signal for driving the ultrasonic transducer 215.

As described in more detail below, the switching sequence comprises a free-float period in which the first switch $T_1$ and the second switch $T_1$ are turned off and the third switch $T_3$ and the fourth switch $T_4$ are turned on in order to dissipate energy stored by the ultrasonic transducer 215.

The bridge IC 301 comprises a test controller 338 which enables the bridge IC 301 to be tested to determine whether the embedded components within the bridge IC 301 are operating correctly. The test controller 338 is coupled to TEST_DATA, TEST_CLK and TEST_LOAD pins so that the bridge IC 301 can be connected to an external control device which feeds data into and out from the bridge IC 301 to test the operation of the bridge IC 301. The bridge IC 301 also comprises a TEST BUS which enables the digital communication bus within the bridge IC 301 to be tested via a TST_PAD pin.

The bridge IC 301 comprises a power on reset circuit (POR) 339 which controls the startup operation of the bridge IC 301. The POR 339 ensures that the bridge IC 301 starts up properly only if the supply voltage is within a predetermined range. If the power supply voltage is outside of the predetermined range, for instance if the power supply voltage is too high, the POR 339 delays the startup of the bridge IC 301 until the supply voltage is within the predetermined range.

The bridge IC 301 comprises a reference block (BG) 340 which provides a precise reference voltage for use by the other subsystems of the bridge IC 301.

The bridge IC 301 comprises a current reference 341 which provides a precise current to the power switching circuit 333 and/or other subsystems within the bridge IC 301, such as the current sensor 335.

The temperature sensor 336 monitors the temperature of the silicon of the bridge IC 301 continuously. If the temperature exceeds the predetermined temperature threshold, the power switching circuit 333 is switched off automatically. In addition, the over temperature may be reported to an external host to inform the external host that an over temperature event has occurred.

The digital state machine (FSM) 337 generates the timing signals for the power switching circuit 333 which, in this example, are timing signals for controlling the H-bridge 334.

The bridge IC 301 comprises comparators 342,343 which compare signals from the various subsystems of the bridge IC 301 with the voltage and current references 340,341 and provide reference output signals via the pins of the bridge IC 301.

Referring again to FIG. 25 of the accompanying drawings, the H-bridge 334 of this example comprises four switches in the form of NMOS field effect transistors (FET) switches on both sides of the H-bridge 334. The H-bridge 334 comprises four switches or transistors $T_1$-$T_4$ which are connected in an H-bridge configuration, with each transistor $T_1$-$T_4$ being driven by a respective logic input A-D. The transistors $T_1$-$T_4$ are configured to be driven by a bootstrap voltage which is generated internally with two external capacitors Cb which are connected as illustrated in FIG. 25.

The H-bridge 334 comprises various power inputs and outputs which are connected to the respective pins of the bridge IC 301. The H-bridge 334 receives the programmable voltage VBOOST which is output from the boost converter 305 via a first power supply terminal, labelled VBOOST in FIG. 25. The H-bridge 334 comprises a second power supply terminal, labelled VSS_P in FIG. 25.

The H-bridge 334 comprises outputs OUTP, OUTN which are configured to connect to respective terminals of the ultrasonic transducer 215 so that the AC drive signal output from the H-bridge 334 can drive the ultrasonic transducer 215.

The switching of the four switches or transistors $T_1$-$T_4$ is controlled by switching signals from the digital state machine 337 via the logic input A-D. It is to be appreciated that, while FIG. 25 shows four transistors $T_1$-$T_4$, in other examples, the H-bridge 334 incorporates a larger number of transistors or other switching components to implement the functionality of the H-bridge.

In this example, the H-bridge 334 operates at a switching power of 22 W to 50 W in order to deliver an AC drive signal with sufficient power to drive the ultrasonic transducer 215 optimally at or near the resonant frequency of the ultrasonic transducer 215. The voltage which is switched by the H-bridge 334 of this example is +15 V. In other examples, the voltage is +20 V.

Other voltages and power ratings of the H-bridge 334 are contemplated and would be selected based on the intended purpose. In some examples, the voltage which is switched by the H-bridge 334 of this example is 100 V-500 V with a power output of 200 W-2500 W.

In this example, the H-bridge 334 switches at a frequency of of 20 kHz to 40 kHz, preferably 26 kHz. Aside from the bridge IC 301 described herein, no conventional integrated circuit H-bridge available in the IC market is able to operate at a power of 22 V to 50 V at a frequency range of 26 kHz to 5 MHz.

Figure 26:
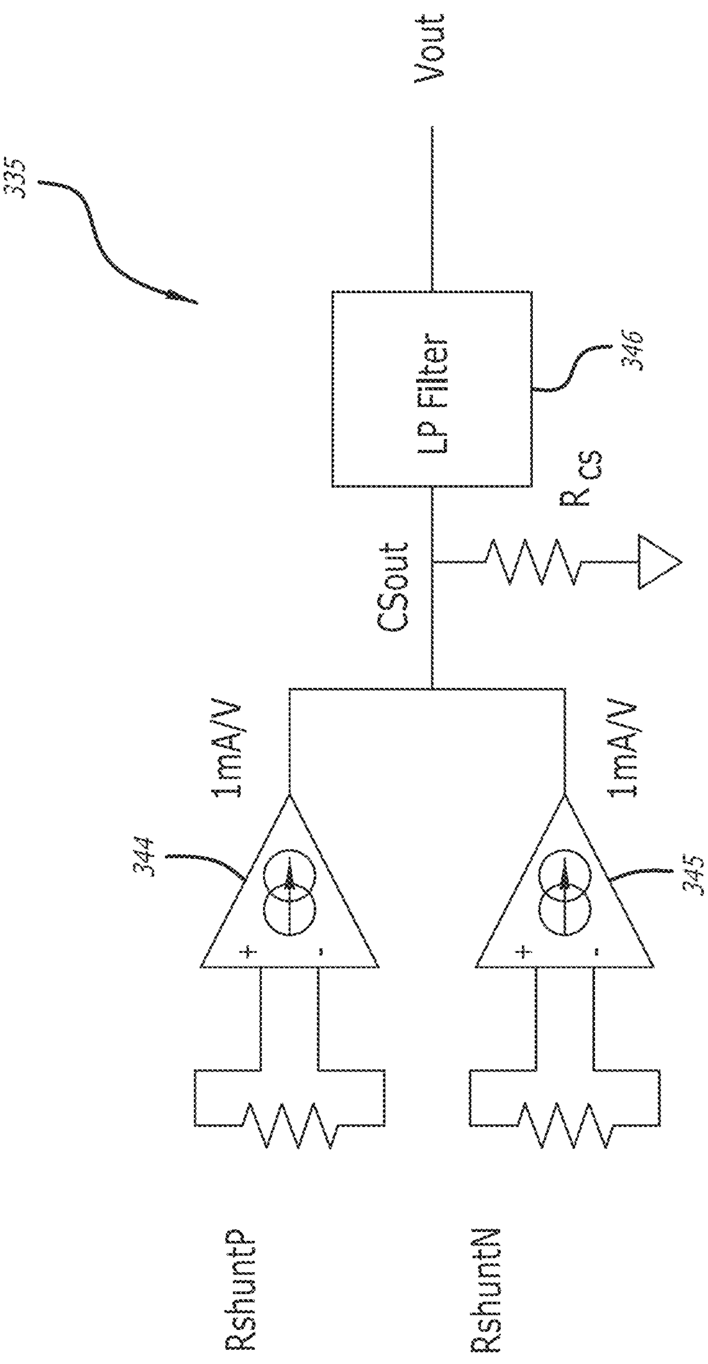
FIG. 26 is a circuit diagram of a current sense arrangement of an example of this disclosure.

Referring now to FIG. 26 of the accompanying drawings, the current sensor 335 comprises positive and negative current sense resistors RshuntP, RshuntN which are connected in series with the respective high and low sides of the H-bridge 334, as shown in FIG. 25. The current sense resistors RshuntP, RshuntN are low value resistors which, in this example, are 0.1Ω. The current sensor 335 comprises a first voltage sensor in the form of a first operational amplifier 344 which measures the voltage drop across the first current sensor resistor RshuntP and a second voltage sensor in the form of a second operational amplifier 345 which measures the voltage drop across the second current sensor resistor RshuntN. In this example, the gain of each operational amplifier 344, 345 is 2V/V. The output of each operational amplifier 344, 345 is, in this example, 1 mA/V. The current sensor 335 comprises a pull down resistor Rcs which, in this example, is 2 kΩ. The outputs of the operational amplifiers 344, 345 provide an output CSout which passes through a low pass filter 346 which removes transients in the signal CSout. An output Vout of the low pass filter 346 is the output signal of the current sensor 335.

The current sensor 335 thus measures the AC current flowing through the H-bridge 334 and respectively through the ultrasonic transducer 215. The current sensor 335 translates the AC current into an equivalent RMS output voltage (Vout) relative to ground. The current sensor 335 has high bandwidth capability since the H-bridge 334 can be operated at a frequency of of 26 kHz to 5 MHz, preferably 20 kHz to 40 kHz, preferably 26 kHz. The output Vout of the current sensor 335 reports a positive voltage which is equivalent to the measured AC rms current flowing through the ultrasonic transducer 215. The output voltage Vout of the current sensor 335 is, in this example, fed back to the control circuitry within the bridge IC 301 to enable the bridge IC 301 to shut down the H-bridge 334 in the event that the current flowing through the H-bridge 334 and hence through the transducer 215 is in excess of a predetermined threshold. In addition, the over current threshold event is reported to the first comparator 342 in the bridge IC 301 so that the bridge IC 301 can report the over current event via the OVC_TRIGG pin of the bridge IC 301.

Figure 27:
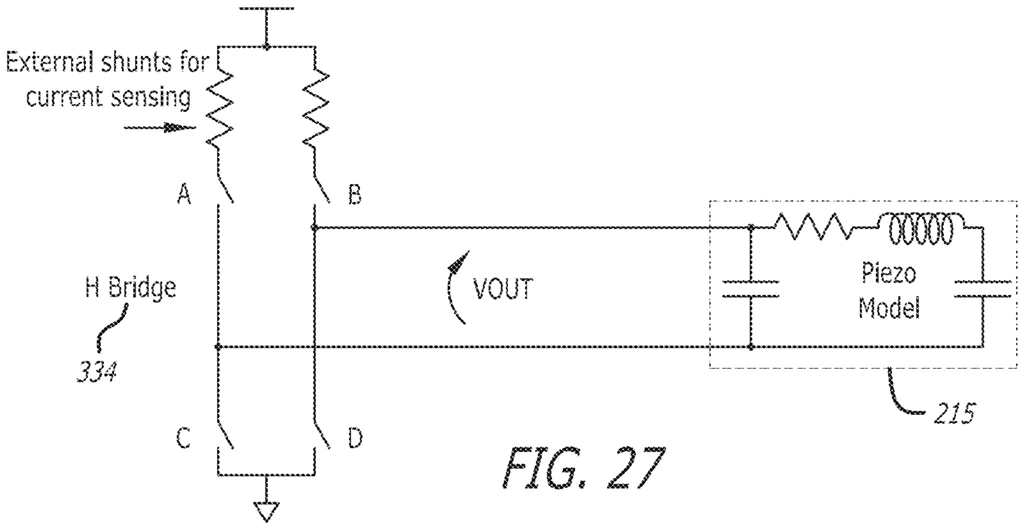
FIG. 27 is a circuit diagram of an H-bridge of an example of this disclosure.

Referring now to FIG. 27 of the accompanying drawings, the control of the H-bridge 334 will now be described also with reference to the equivalent piezoelectric model of the ultrasonic transducer 215.

Figure 28:
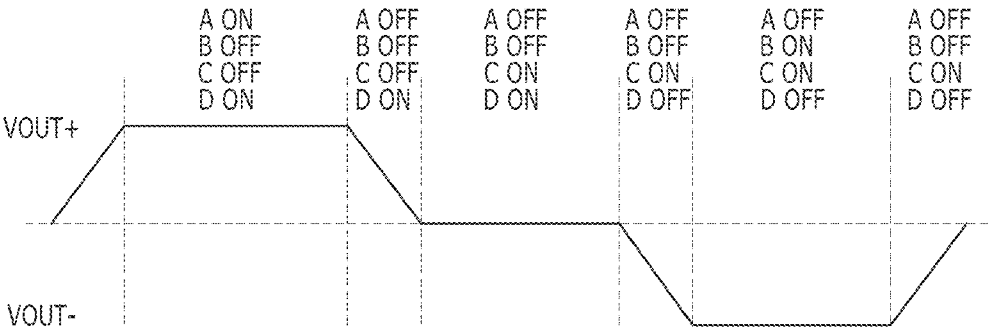
FIG. 28 is a graph showing the voltages during the phases of operation of the H-bridge of FIG. 25.

To develop a positive voltage across the outputs OUTP, OUTN of the H-bridge 334 as indicated by V_out in FIG. 27 (note the direction of the arrow) the switching sequence of the transistors $T_1$-$T_4$ via the inputs A-D is as follows:

1. Positive output voltage across the ultrasonic transducer 215: A—ON, B—OFF, C—OFF, D—ON
2. Transition from positive output voltage to zero: A—OFF, B—OFF, C—OFF, D—ON. During this transition, C is switched off first to minimise or avoid power loss by minimising or avoiding current flowing through A and C if there is a switching error or delay in A.
3. Zero output voltage: A—OFF, B—OFF, C—ON, D—ON. During this zero output voltage phase, the terminals of the outputs OUTP, OUTN of the H-bridge 334 are grounded by the C and D switches which remain on. This dissipates the energy stored by the capacitors in the equivalent circuit of the ultrasonic transducer, which minimises the voltage overshoot in the switching waveform voltage which is applied to the ultrasonic transducer.
4. Transition from zero to negative output voltage: A—OFF, B—OFF, C—ON, D—OFF.
5. Negative output voltage across the ultrasonic transducer 215: A—OFF, B—ON, C—ON, D—OFF At high frequencies of of 2 MHz to 5 MHz, it will be appreciated that the time for each part of the switching sequence is very short and in the order of nanoseconds or picoseconds. A graph showing the output voltage OUTP, OUTN of the H-bridge 334 according to the above switching sequence is shown in FIG. 28 of the accompanying drawings. The zero output voltage portion of the switching sequence is included to accommodate for the energy stored by the ultrasonic transducer 215 (e.g. the energy stored by the capacitors in the equivalent circuit of the ultrasonic transducer). As described above, this minimises the voltage overshoot in the switching waveform voltage which is applied to the ultrasonic transducer and hence minimises unnecessary power dissipation and heating in the ultrasonic transducer.

Minimising or removing voltage overshoot also reduces the risk of damage to transistors in the bridge IC 301 by preventing the transistors from being subject to voltages in excess of their rated voltage. Furthermore, the minimisation or removal of the voltage overshoot enables the bridge IC 301 to drive the ultrasonic transducer accurately in a way which minimises disruption to the current sense feedback loop described herein. Consequently, the bridge IC 301 is able to drive the ultrasonic transducer at a power of 22 W to 50 W or 70 W. In some examples, the bridge IC 301 is able to drive the ultrasonic transducer at a frequency of 20 KHz to 5 MHz. In other examples, the bridge IC 301 is able to drive the ultrasonic transducer at a frequency of 20 kHz to 40 KHz.

The bridge IC 301 of this example is configured to be controlled by the PMIC 300 to operate in two different modes, referred to herein as a forced mode and a native frequency mode. These two modes of operation are novel over existing bridge ICs. In particular, the native frequency mode is a major innovation which offers substantial benefits in the accuracy and efficiency of driving an ultrasonic transducer as compared with conventional devices.

Forced Frequency Mode (FFM)

In the forced frequency mode the H-bridge 334 is controlled in the sequence described above but at a user selectable frequency. As a consequence, the H-bridge transistors $T_1$-$T_4$ are controlled in a forced way irrespective of the inherent resonant frequency of the ultrasonic transducer 215 to switch the output voltage across the ultrasonic transducer 215. The forced frequency mode therefore allows the H-bridge 334 to drive the ultrasonic transducer 215, which has a resonant frequency f1, at different frequency f2.

Driving an ultrasonic transducer at a frequency which is different from its resonant frequency may be appropriate in order to adapt the operation to different applications. For example, it may be appropriate to drive an ultrasonic transducer at a frequency which is slightly off the resonance frequency (for mechanical reasons to prevent mechanical damage to the transducer). Alternatively, it may be appropriate to drive an ultrasonic transducer at a low frequency but the ultrasonic transducer has, because of its size, a different native resonance frequency.

The transducer driver 202 controls the bridge IC 301 to drive the ultrasonic transducer 215 in the forced frequency mode in response to the configuration of the transducer driver 202 for a particular application or a particular ultrasonic transducer.

Native Frequency Mode (NFM)

The following native frequency mode of operation is a significant development and provides benefits in improved accuracy and efficiency over conventional ultrasonic drivers that are available on the IC market today.

The native frequency mode of operation follows the same switching sequence as described above but the timing of the zero output portion of the sequence is adjusted to minimise or avoid problems that can occur due to current spikes in the forced frequency mode operation. These current spikes occur when the voltage across the ultrasonic transducer 215 is switched to its opposite voltage polarity. An ultrasonic transducer which comprises a piezoelectric crystal has an electrical equivalent circuit which incorporates a parallel connected capacitor (e.g. see the piezo model in FIG. 27). If the voltage across the ultrasonic transducer is hard-switched from a positive voltage to a negative voltage, due to the high dV/dt there can be a large current flow current flow as the energy stored in the capacitor dissipates.

The native frequency mode avoids hard switching the voltage across the ultrasonic transducer 215 from a positive voltage to a negative voltage (and vice versa). Instead, prior to applying the reversed voltage, the ultrasonic transducer 215 (piezoelectric crystal) is left free-floating with zero voltage applied across its terminals for a free-float period. The PMIC 300 sets the drive frequency of the bridge IC 301 such that the bridge 334 sets the free-float period such that current flow inside the ultrasonic transducer 215 (due to the energy stored within the piezoelectric crystal) reverses the voltage across the terminals of the ultrasonic transducer 215 during the free-float period.

Consequently, when the H-bridge 334 applies the negative voltage at the terminals of the ultrasonic transducer 215 the ultrasonic transducer 215 (the capacitor in the equivalent circuit) has already been reverse charged and no current spikes occur because there is no high dV/dt.

It is, however, to be appreciated that it takes time for the charge within the ultrasonic transducer 215 (piezoelectric crystal) to build up when the ultrasonic transducer 215 is first activated. Therefore, the ideal situation in which the energy within the ultrasonic transducer 215 is to reverse the voltage during the free-float period occurs only after the oscillation inside the ultrasonic transducer 215 has built up the charge. To accommodate for this, when the bridge IC 301 activates the ultrasonic transducer 215 for the first time, the PMIC 300 controls the power delivered through the H-bridge 334 to the ultrasonic transducer 215 to a first value which is a low value (e.g. 5 V). The PMIC 300 then controls the power delivered through the H-bridge 334 to the ultrasonic transducer 215 to increase over a period of time to a second value (e.g. 15 V) which is higher than the first value in order to build up the energy stored within the ultrasonic transducer 215. Current spikes still occur during this ramp of the oscillation until the current inside the ultrasonic transducer 215 developed sufficiently. However, by using a low first voltage at start up those current spikes are kept sufficiently low to minimise the impact on the operation of the ultrasonic transducer 215.

In order to implement the native frequency mode, the transducer driver 202 controls the frequency of the oscillator 315 and the duty cycle (ratio of turn-on time to free-float time) of the AC drive signal output from the H-bridge 334 with high precision. In this example, the transducer driver 202 performs three control loops to regulate the oscillator frequency and the duty cycle such that the voltage reversal at the terminals of the ultrasonic transducer 215 is as precise as possible and current spikes are minimised or avoided as far as possible. The precise control of the oscillator and the duty cycle using the control loops is a significant advance in the field of IC ultrasonic drivers.

During the native frequency mode of operation, the current sensor 335 senses the current flowing through the ultrasonic transducer 215 during the free-float period. The digital state machine 337 adapts the timing signals to switch on either the first switch T1 or the second switch T2 when the current sensor 335 senses that the current flowing through the ultrasonic transducer 215 during the free-float period is zero.

Figure 29:
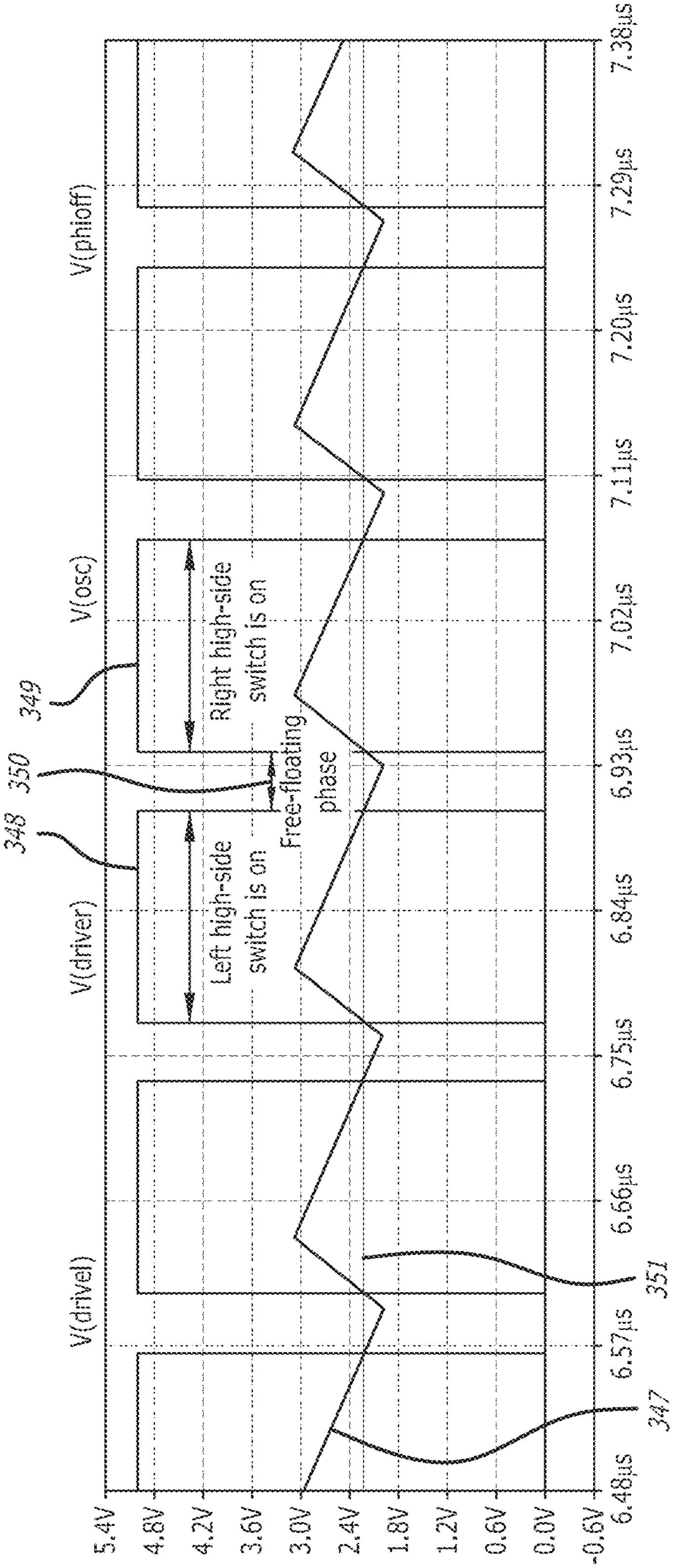
FIG. 29 is a graph showing the voltages during the phases of operation of the H-bridge of FIG. 25.

FIG. 29 of the accompanying drawings shows the oscillator voltage waveform 347 (V(osc)), a switching waveform 348 resulting from the turn-on and turn-off the left hand side high switch T1 of the H-bridge 334 and a switching waveform 349 resulting from the turn-on and turn-off the right hand side high switch T2 of the H-bridge 334. For an intervening free-float period 350, both high switches T1, T2 of the H-bridge 334 are turned off (free-floating phase). The duration of the free-float period 350 is controlled by the magnitude of the free-float control voltage 351 (Vphioff).

Figure 30:
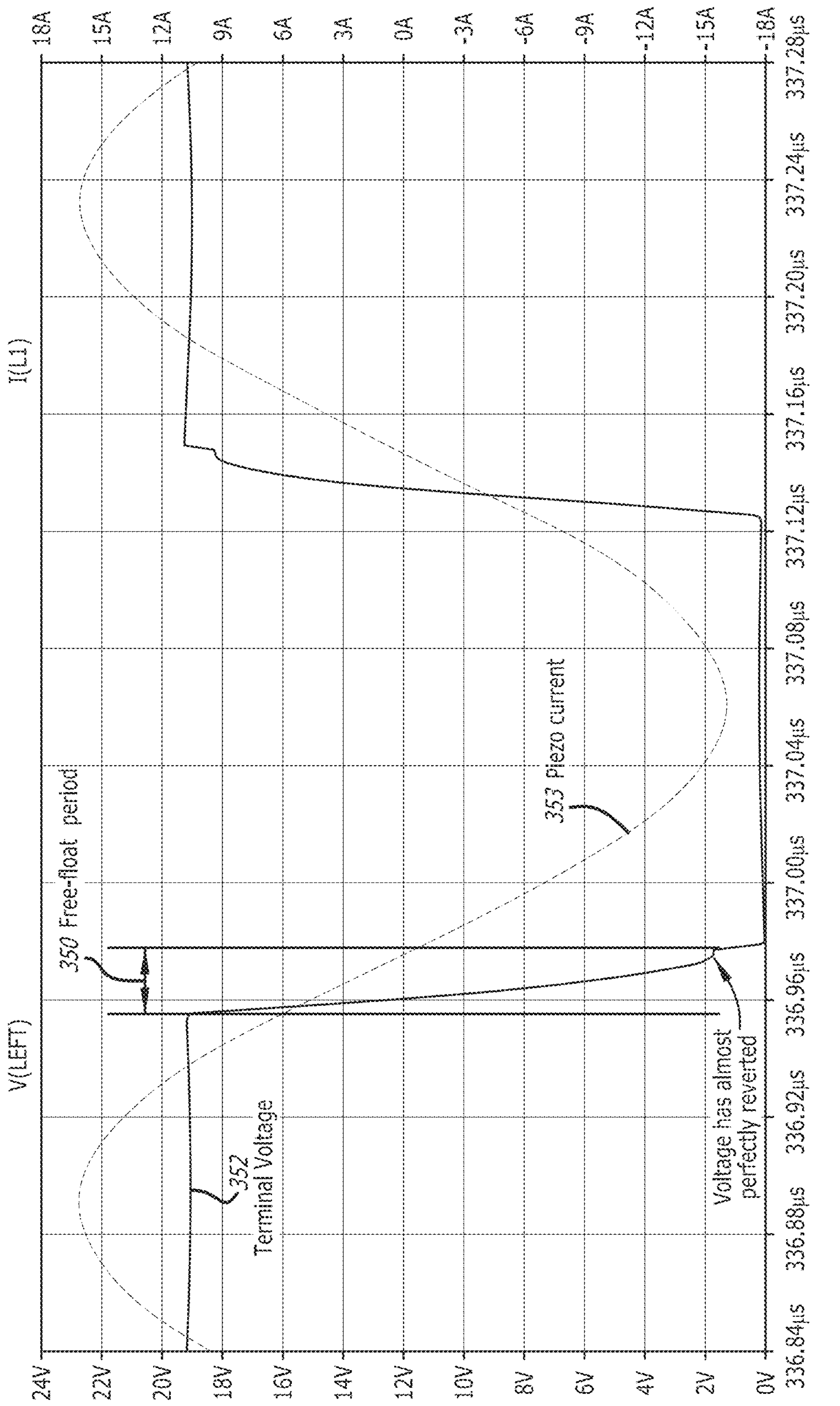
FIG. 30 is a graph showing the voltage and current at a terminal of an ultrasonic transducer while the ultrasonic transducer is being driven by the H-bridge of FIG. 25.

FIG. 30 of the accompanying drawings shows the voltage waveform 352 at a first terminal of the ultrasonic transducer 215 (the voltage waveform is reversed at the second terminal of the ultrasonic transducer 215) and the piezo current 353 flowing through the ultrasonic transducer 215. The piezo current 353 represents an (almost) ideal sinusoidal waveform (this is never possible in the forced frequency mode or in any bridge in the IC market).

Before the sinusoidal wave of the piezo current 353 reaches zero, the left hand side high switch T1 of the H-bridge 334 is turned off (here, the switch T1 is turned off when the piezo current 353 is approximately 6 A). The remaining piezo current 353 which flows within the ultrasonic transducer 215 due to the energy stored in the ultrasonic transducer 215 (the capacitor of the piezo equivalent circuit) is responsible for the voltage reversal during the free-float period 350. The piezo current 353 decays to zero during the free-float period 350 and into negative current flow domain thereafter. The terminal voltage at the ultrasonic transducer 215 drops from the supply voltage (in this case 19 V) to less than 2 V and the drop comes to a stop when the piezo current 353 reaches zero. This is the perfect time to turn on the low-side switch T3 of the H-bridge 334 in order to minimise or avoid a current spike.

Compared to the forced frequency mode described above, the native frequency mode has at least three advantages:

1. The current spike associated with hard switching of the package capacitor is significantly reduced or avoided completely.
2. Power loss due to hard switching is almost eliminated.
3. Frequency is regulated by the control loops and will be kept close to the resonance of the piezo crystal (i.e. the native resonance frequency of the piezo crystal).

In the case of the frequency regulation by the control loops (advantage 3 above), the PMIC 300 starts by controlling the bridge IC 301 to drive the ultrasonic transducer 215 at a frequency above the resonance of the piezo crystal. The PMIC 300 then controls the bridge IC 301 to that the frequency of the AC drive signal decays/reduces during start up. As soon as the frequency approaches resonance frequency of the piezo crystal, the piezo current will develop/increase rapidly. Once the piezo current is high enough to cause the desired voltage reversal, the frequency decay/reduction is stopped by the PMIC 300. The control loops of the PMIC 300 then take over the regulation of frequency and duty cycle of the AC drive signal.

In the forced frequency mode, the power delivered to the ultrasonic transducer 215 is controlled through the duty cycle and/or a frequency shift and/or by varying the supply voltage. However, in this example in the native frequency mode the power delivered to the ultrasonic transducer 215 controlled only through the supply voltage.

In this example, during a setup phase of operation of the transducer driver, the bridge IC 301 is configured to measure the length of time taken for the current flowing through the ultrasonic transducer 215 to fall to zero when the first switch $T_1$ and the second switch $T_2$ are turned off and the third switch $T_3$ and the fourth switch $T_4$ are turned on. The bridge IC 301 then sets the length of time of the free-float period to be equal to the measured length of time.

Figure 31:
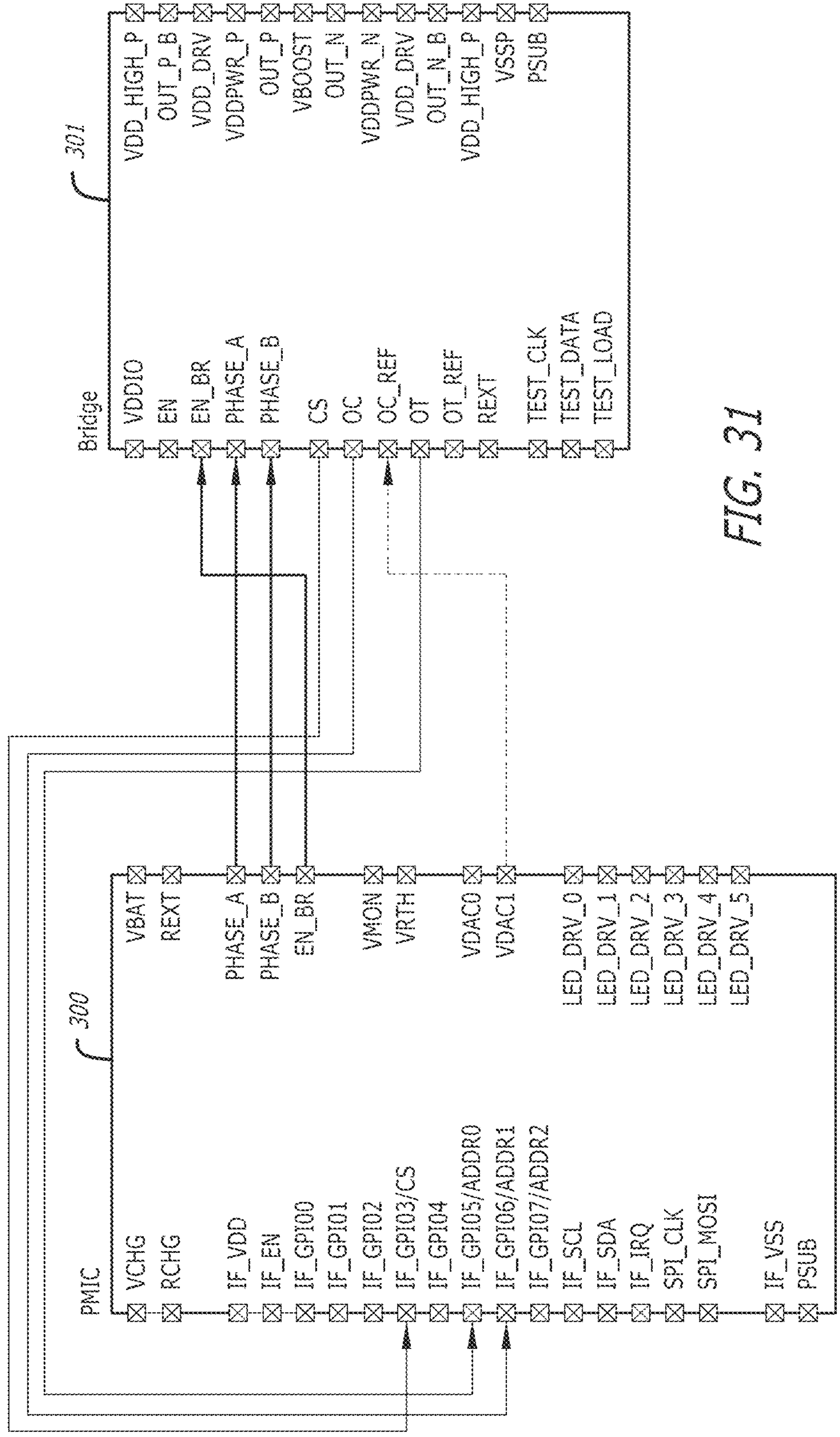
FIG. 31 is a schematic diagram showing connections between integrated circuits of this disclosure.

Referring now to FIG. 31 of the accompanying drawings, the PMIC 300 and the bridge IC 301 of this example are designed to work together as a companion chip set. The PMIC 300 and the bridge IC 301 are connected together electrically for communication with one another. In this example, there are interconnections between the PMIC 300 and the bridge IC 301 which enable the following two categories of communication:

1. control signals
2. feedback signals

The connections between the PHASE_A and PHASE_B pins of the PMIC 300 and the bridge IC 301 carry the PWM modulated control signals which drive the H-bridge 334. The connection between the EN_BR pins of the PMIC 300 and the bridge IC 301 carries the EN_BR control signal which triggers the start of the H-bridge 334. The timing between the PHASE_A, PHASE_B and EN_BR control signals is important and handled by the digital bridge control of the PMIC 300.

The connections between the CS, OC and OT pins of the PMIC 300 and the bridge IC 301 carry CS (current sense), OC (over current) and OT (over temperature) feedback signals from the bridge IC 301 back to the PMIC 300. Most notably, the CS (current sense) feedback signal comprises a voltage equivalent to the rms current flowing through the ultrasonic transducer 215 which is measured by the current sensor 335 of the bridge IC 301.

The OC (over current) and OT (over temperature) feedback signals are digital signals indicating that either an over current or an over voltage event has been detected by the bridge IC 301. In this example, the thresholds for the over current and over temperature are set with an external resistor. Alternatively, the thresholds can also be dynamically set in response to signals passed to the OC_REF pin of the bridge IC 301 from one of the two DAC channels VDAC0, VDAC1 from the PMIC 300.

In this example, the design of the PMIC 300 and the bridge IC 301 allow the pins of these two integrated circuits to be connected directly to one another (e.g. via copper tracks on a PCB) so that there is minimal or no lag in the communication of signals between the PMIC 300 and the bridge IC 301. This provides a significant speed advantage over conventional bridges in the IC market which are typically controlled by signals via a digital communications bus. For example, a standard I2C bus is clocked at only 400 kHz, which is too slow for communicating data sampled at the high clock speeds of of 2 MHz to 5 MHz.

While examples of this disclosure have been described above in relation to the microchip hardware, it is to be appreciated that other examples of this disclosure comprise a method of operating the components and subsystems of each microchip to perform the functions described herein. For instance, the methods of operating the PMIC 300 and the bridge IC 301 in either the forced frequency mode or the native frequency mode.

The operation of the system 1 of some examples will now be described. More specifically, the following processing sequence that is performed by the system 1 to optimize the yield of hydrogen gas generated by the system 1:

1. The system is activated and the main controller coordinates the electrolysis reaction and the control of the transducer driver 202.
2. Each transducer driver 202 drives a respective ultrasonic transducer 215 sequentially at multiple drive frequencies to detect the optimal (resonant) frequency at which the ultrasonic transducer 215 converts electrical power into kinetic energy most efficiently. At resonance, a maximum active power is converted by the ultrasonic transducer 215 to kinetic energy. The transducer driver 202 then drives the ultrasonic transducer 215 at the optimal (resonant) frequency for efficiency to emit ultrasound waves which cause agitation and/or cavitation in the aqueous solution 102.
3. The main controller 2 monitors the hydrogen gas pressure signal and/or the oxygen gas pressure to detect the volume or rate of hydrogen gas and/or oxygen gas generated by the system 1.
4. If the volume or rate of hydrogen gas and/or oxygen gas generated by the system 1 is lower than an expected or optimal amount, the main controller 2 controls the power controller to increase the power (potential difference) across the cathode 105 and the anode 107. Otherwise, the power (potential difference) across the cathode 105 and the anode 107 is maintained.
5. If the main controller 2 controls the power controller to increase the power (potential difference) across the cathode 105 and the anode 107 and there is no change in the production rate of the hydrogen gas and/or the oxygen gas, the main controller 2 controls each transducer controller 202 to increase the power of the drive signal to the ultrasonic transducers to increase intensity of the ultrasound waves in the reaction vessel 101.
6. If the production rate of the hydrogen gas and/or the oxygen gas increases, the new parameters (power across the anode/cathode and the power of the ultrasonic transducer drive signals) are maintained, else, steps 4 and 5 are repeated until an expected or optimal production rate of hydrogen gas and/or oxygen gas is achieved.
7. If after x iterations of step 6, there is no increase in production rate of hydrogen gas and/or oxygen gas, a last set of parameters are maintained.
8. If production rate of hydrogen gas and/or oxygen gas starts to decline with maximum power input (across the anode/cathode and/or in the ultrasonic transducer drive signals), the main controller 2 controls the power controller and each transducer driver 202 to gradually power down the system 1.
9. Production ends.

The volume of hydrogen produced by the systems of some examples of this disclosure may be calculated follows:

Stoichiometry of water electrolysis:

$$2H_2O \Rightarrow 2H_2 + O_2$$

Every 2 mol of water makes 2 mol of hydrogen.

1 mol water is 18 g (18 mL). 1 mol of hydrogen is 4 g (4 mL).

For an inlet water flow rate of 10 L/h, the output hydrogen gas at 70% efficiency would be:

$$\text{Produced } H_2 \text{ volumetric flow rate} = \frac{0.004 * 10}{0.018} * 0.7 = 1.55 \text{ L/h}$$

The rate of hydrogen gas produces is relative to the input water flow rate, (with consideration for the efficiency of the system).

The equation for the output flow rate can be deduced from the following equation:

$$\text{produced } H_2 \text{ Flow rate} = \frac{4 * x}{18} * y$$

Where x is the inlet water flow rate, y is the efficiency of the system.

The systems of examples of this disclosure do not require sea water to be desalinated prior to electrolysis. Sea water can be used directly as the electrolytic solution. The configuration of the transducer driver and the feedback loop determines and implements the optimum balance between frequency and intensity of the ultrasound flowing through the electrolytic solution to maximize hydrogen production. In some examples a frequency of 20 kHz to 40 KHz is set by the transducer driver to produce an optimum balance for a high electrolysis reaction rate. In some examples a frequency an intensity of 0.1 $Wcm^{-2} \pm 0.02$ $Wcm^{-2}$ is set by the transducer driver to produce an optimum balance for a high electrolysis reaction rate.

The foregoing outlines features of several examples or embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various examples or embodiments introduced herein. Those of ordinary skill in the art should also realise that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of examples or embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some examples or embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Examples or embodiments of the subject matter and the functional operations described herein can be implemented in digital electronic circuitry, or in computer software, firmware, or hardware, including the structures disclosed in this specification and their structural equivalents, or in combinations of one or more of them.

Some examples or embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A system for generating hydrogen gas, the system comprising:

a reaction vessel containing an aqueous solution;

a cathode positioned at least partly within the reaction vessel with a portion of the cathode having an exterior surface submersed in and in electrical contact with the aqueous solution to create an interface for a reduction reaction for reducing $H^+$ ions to produce hydrogen gas at the cathode;

an anode positioned at least partly within the reaction vessel with a portion of the anode submersed in and in electrical contact with the aqueous solution to create an interface for an oxidation reaction for oxidizing $OH^-$ ions to produce oxygen gas at the anode, wherein the cathode and the anode are configured to receive power from a power source;

a polymer-electrolyte membrane (PEM) positioned between the cathode and the anode to segregate the $H^+$ ions and the $OH^-$ ions in the aqueous solution to create divided areas in the reaction vessel, wherein the aqueous solution in a divided area proximate the cathode has a greater concentration of $H^+$ ions than $OH^-$ ions;

a first ultrasonic transducer positioned at least partly in the reaction vessel and in the aqueous solution, the first ultrasonic transducer positioned at a predetermined distance from the cathode and oriented such that the first ultrasonic transducer emits ultrasonic waves at least partly towards the exterior surface of the cathode to agitate the aqueous solution proximate to the exterior surface of the cathode to clear any bubbles of the hydrogen gas formed at the exterior surface of the cathode to expose the exterior surface of the cathode to additional $H^+$ ions for generation of hydrogen gas;

a second ultrasonic transducer positioned at least partly in the reaction vessel and in the aqueous solution, the second ultrasonic transducer positioned at a predetermined distance from the anode and oriented such that the second ultrasonic transducer emits ultrasonic waves at least partly towards the exterior surface of the anode to cause cavitation in the aqueous solution proximate to the exterior surface of the anode, wherein the cavitation weakens hydrogen bonds between water molecules of the aqueous solution to separate individual water molecules available for interaction with the anode to undergo the oxidation reaction at the anode to oxidize $OH^-$ ions and form oxygen gas at the anode; and a plurality of transducer drivers each coupled electrically to a respective one of the first ultrasonic transducer or the second ultrasonic transducer to drive the respective ultrasonic transducer with an AC drive signal to generate the ultrasonic waves;

a main controller comprising a computing device having a processor and a memory for executing instructions, wherein the main controller controls the power received by the anode and the cathode, and wherein the main controller is electronically coupled to each transducer driver to control the operation of each transducer driver;

a hydrogen gas collector in fluid communication with the reaction vessel to collect hydrogen gas produced within the reaction vessel; and a hydrogen gas pressure sensor which senses the pressure of hydrogen gas within the hydrogen gas collector and provides a hydrogen gas pressure signal, wherein:

the hydrogen gas pressure sensor is electrically coupled to the main controller to provide the hydrogen gas pressure signal to the main controller in a feedback loop, wherein the main controller uses the hydrogen gas pressure signal to calculate the volume and rate of hydrogen gas being produced by the system and to determine the efficiency of operation of the system, and the hydrogen gas pressure sensor is electrically coupled to each transducer driver, wherein each transducer driver samples the hydrogen gas pressure signal at a sampling frequency and the transducer driver processes the sampled gas pressure signal to modify the drive signal in response to a change in the hydrogen gas pressure signal, wherein each transducer driver manages the efficiency of operation of the system in response to the hydrogen gas pressure signal received at the transducer driver, wherein each of the plurality of transducer drivers controls the frequency and power of the AC drive signal driving a respective one of the ultrasonic transducers to adjust the frequency and intensity of ultrasonic waves emitted by each ultrasonic transducer to control the cavitation in the aqueous solution to control the volume and rate of hydrogen gas generated by the system, wherein the memory of the main controller stores executable instructions which, when executed by the processor, cause the main controller to coordinate the electrolysis reaction and the control of each transducer driver to manage the efficiency of operation of the system by:

1) Controlling the power received by the anode and the cathode to control the rate of electrolysis in response to the hydrogen gas pressure signal; and 2) Controlling coordinated operation of the plurality of transducer drivers in response to the hydrogen gas pressure signal, wherein each of the plurality of transducer drivers controls the frequency and power of the drive signal driving a respective one of the ultrasonic transducers to adjust the frequency and intensity of ultrasonic waves emitted by each ultrasonic transducer to control the cavitation in the aqueous solution, and wherein the transducer drivers control the ultrasonic transducers individually to emit ultrasonic waves to not reduce ultrasound wave transmission from one or more of the other ultrasonic transducers positioned around each other and around a respective one of the cathode and the anode, to control the volume and rate of hydrogen gas generated by the system.

2. The system of claim 1, wherein the transducer driver drives the ultrasonic transducer at a frequency of 20 kHz to 40 KHz.

3. The system of claim 1, wherein each first ultrasonic transducer is positioned at a distance from the exterior surface of the cathode which equates to one wavelength of the ultrasonic waves emitted by the ultrasonic transducer.

4. The system of claim 1, wherein each first ultrasonic transducer is positioned at a distance from the exterior surface of the cathode which equates to a plurality of wavelengths of the ultrasonic waves emitted by the ultrasonic transducer.

5. The system of claim 1, wherein each second ultrasonic transducer is positioned at a distance from the exterior surface of the anode which equates to one wavelength of the ultrasonic waves emitted by the ultrasonic transducer.

6. The system of claim 1, wherein each second ultrasonic transducer is positioned at a distance from the exterior surface of the anode which equates to a plurality of wavelengths of the ultrasonic waves emitted by the ultrasonic transducer.

7. The system of claim 1, wherein each first ultrasonic transducer is oriented to emit ultrasonic waves in a direction that is transverse to a longitudinal length of the cathode.

8. The system of claim 1, wherein each second ultrasonic transducer is oriented to emit ultrasonic waves in a direction that is transverse to a longitudinal length of the anode.

9. The system of claim 1, wherein the system comprises:

an oxygen gas collector positioned at least partly within the reaction vessel to collect oxygen gas produced within the reaction vessel; and an oxygen gas pressure sensor which senses the pressure of oxygen gas within the oxygen gas collector, the oxygen gas pressure sensor being electrically coupled to the main controller to provide an oxygen gas pressure signal to the main controller in a feedback loop.

10. A system for generating hydrogen gas, the system comprising:

a reaction vessel containing an aqueous solution;

a cathode positioned at least partly within the reaction vessel with a portion of the cathode having an exterior surface submersed in and in electrical contact with the aqueous solution to create an interface for a reduction reaction for reducing $H^+$ ions to produce hydrogen gas at the cathode;

an anode positioned at least partly within the reaction vessel with a portion of the anode submersed in and in electrical contact with the aqueous solution to create an interface for an oxidation reaction for oxidizing $OH^-$ ions to produce oxygen gas at the anode, wherein the cathode and the anode are configured to receive power from a power source;

a plurality of first ultrasonic transducers positioned at least partly in the reaction vessel and in the aqueous solution, each first ultrasonic transducer positioned at a predetermined distance from the cathode and oriented such that each first ultrasonic transducer emits and conducts ultrasonic waves through the aqueous solution at least partly towards the exterior surface of the cathode to agitate the aqueous solution proximate to the exterior surface of the cathode to clear any bubbles of the hydrogen gas formed at the exterior surface of the cathode to expose the exterior surface of the cathode to additional $H^+$ ions for generation of hydrogen gas;

a plurality of second ultrasonic transducers positioned at least partly in the reaction vessel, the second ultrasonic transducers positioned at a predetermined distance from the anode and oriented such that the second ultrasonic transducers emit ultrasonic waves at least partly towards the exterior surface of the anode to cause cavitation in the aqueous solution proximate to the exterior surface of the anode, wherein the cavitation weakens hydrogen bonds between water molecules of the aqueous solution to separate individual water molecules available for interaction with the anode to undergo the oxidation reaction at the anode to oxidize $OH^-$ ions and form oxygen gas at the anode; and a plurality of transducer drivers each coupled electrically to a respective one of the ultrasonic transducers to drive the ultrasonic transducers with an AC drive signal to generate the ultrasonic waves;

a main controller comprising a computing device having a processor and a memory for executing instructions, wherein the main controller controls the power received by the anode and the cathode, and wherein the main controller is electronically coupled to each transducer driver to control the operation of each transducer driver;

a hydrogen gas collector in fluid communication with the reaction vessel to collect hydrogen gas produced within the reaction vessel; and a hydrogen gas pressure sensor which senses the pressure of hydrogen gas within the hydrogen gas collector and provides a hydrogen gas pressure signal, wherein:

the hydrogen gas pressure sensor is electrically coupled to the main controller to provide the hydrogen gas pressure signal to the main controller in a feedback loop, wherein the main controller uses the hydrogen gas pressure signal to calculate the volume and rate of hydrogen gas being produced by the system and to determine the efficiency of operation of the system, and the hydrogen gas pressure sensor is electrically coupled to each transducer driver, wherein each transducer driver samples the hydrogen gas pressure signal at a sampling frequency and the transducer driver processes the sampled gas pressure signal to modify the drive signal in response to a change in the hydrogen gas pressure signal, wherein each transducer driver manages the efficiency of operation of the system in response to the hydrogen gas pressure signal received at the transducer driver, wherein each of the plurality of transducer drivers controls the frequency and power of the AC drive signal driving a respective one of the ultrasonic transducers to adjust the frequency and intensity of ultrasonic waves emitted by each ultrasonic transducer to control the cavitation in the aqueous solution to control the volume and rate of hydrogen gas generated by the system, wherein the memory of the main controller stores executable instructions which, when executed by the processor, cause the main controller to coordinate the electrolysis reaction and the control of each transducer driver to manage the efficiency of operation of the system by:

1) Controlling the power received by the anode and the cathode to control the rate of electrolysis in response to the hydrogen gas pressure signal; and 2) Controlling coordinated operation of the plurality of transducer drivers in response to the hydrogen gas pressure signal, wherein each of the plurality of transducer drivers controls the frequency and power of the drive signal driving a respective one of the ultrasonic transducers to adjust the frequency and intensity of ultrasonic waves emitted by each ultrasonic transducer to control the cavitation in the aqueous solution, and wherein the transducer drivers control the ultrasonic transducers individually to emit ultrasonic waves to not reduce ultrasound wave transmission from one or more of the other ultrasonic transducers positioned around each other and around a respective one of the cathode and the anode, to control the volume and rate of hydrogen gas generated by the system.

11. The system of claim 10, wherein the transducer driver drives the ultrasonic transducers at a frequency of 20 KHz to 40 KHz.

12. The system of claim 10, wherein each first ultrasonic transducer is positioned at a distance from the exterior surface of the cathode which equates to one wavelength of the ultrasonic waves emitted by the ultrasonic transducer.

13. The system of claim 10, wherein each first ultrasonic transducer is positioned at a distance from the exterior surface of the cathode which equates to a plurality of wavelengths of the ultrasonic waves emitted by the ultrasonic transducer.

14. The system of claim 10, wherein each second ultrasonic transducer is positioned at a distance from the exterior surface of the anode which equates to one wavelength of the ultrasonic waves emitted by the ultrasonic transducer.

15. The system of claim 10, wherein each second ultrasonic transducer is positioned at a distance from the exterior surface of the anode which equates to a plurality of wavelengths of the ultrasonic waves emitted by the ultrasonic transducer.

16. The system of claim 11, wherein each first ultrasonic transducer is oriented to emit ultrasonic waves in a direction that is transverse to a longitudinal length of the cathode.

17. The system of claim 10, wherein each second ultrasonic transducer is oriented to emit ultrasonic waves in a direction that is transverse to a longitudinal length of the anode.

18. The system of claim 10, wherein the system comprises:

an oxygen gas collector positioned at least partly within the reaction vessel to collect oxygen gas produced within the reaction vessel; and an oxygen gas pressure sensor which senses the pressure of oxygen gas within the oxygen gas collector, the oxygen gas pressure sensor being electrically coupled to the main controller to provide an oxygen gas pressure signal to the main controller in a feedback loop.

* * * * *